United States Patent [19]

Taipale et al.

[11] Patent Number: 4,682,288

[45] Date of Patent: Jul. 21, 1987

[54] ELECTRONIC CONTROL FOR TOTALING DENOMINATIONS OF SEVERAL COUNTRIES

[75] Inventors: Dale L. Taipale, Delafield; John G. Brome, Waukesha, both of Wis.

[73] Assignee: Brandt, Inc., Watertown, Wis.

[21] Appl. No.: 935,625

[22] Filed: Nov. 24, 1986

Related U.S. Application Data

[63] Continuation of Ser. No. 899,761, Aug. 21, 1986, abandoned, which is a continuation of Ser. No. 596,439, Apr. 3, 1984, abandoned.

[51] Int. Cl.$^4$ .......................... G07G 7/48; G07G 1/12; G07D 9/00; G06M 9/00
[52] U.S. Cl. ................................... 364/406; 364/405; 377/7; 453/32
[58] Field of Search .............. 364/405, 406, 408, 464; 377/6, 7, 8, 13, 14; 133/1 R, 3 R, 4 R, 8 R; 209/534

[56] References Cited

U.S. PATENT DOCUMENTS

| 4,007,358 | 2/1977 | Iguchi et al. | 377/7 |
|---|---|---|---|
| 4,041,280 | 8/1977 | Ohsako et al. | 377/7 |
| 4,109,139 | 8/1978 | McMillian et al. | 377/7 |
| 4,347,860 | 8/1982 | Hayashi et al. | 133/1 R |
| 4,365,700 | 12/1982 | Arlmoto et al. | 133/4 R |
| 4,369,442 | 1/1983 | Werth et al. | 377/7 |
| 4,376,479 | 3/1983 | Sugimoto et al. | 377/7 |
| 4,429,407 | 1/1984 | Furuya | 377/7 |
| 4,491,140 | 1/1985 | Eglise et al. | 133/8 R |
| 4,513,762 | 4/1985 | Yokomori et al. | 133/3 R |
| 4,532,641 | 7/1985 | Nishimura | 364/405 X |

FOREIGN PATENT DOCUMENTS

| 0090894 | 12/1983 | European Pat. Off. | 133/8 R |
|---|---|---|---|
| 2077968A | 12/1981 | United Kingdom | 377/7 |

OTHER PUBLICATIONS

*A Coin Counting System*, Electronic Engineering, May 1962, p. 311.
Jetsort* Model CA-750 Coin Sorter/Counter Operating Instructions, Cummins-Allison Corp., Mount Prospect, IL, Mar., 1983.
Model 970 Coin Sorter & Counter Brochure, Brandt, Inc. 1983.
Model 958 Coin Sorter/Counter Operator's Manual, Brandt, Inc. 1982.

*Primary Examiner*—Jerry Smith
*Assistant Examiner*—Jon D. Grossman
*Attorney, Agent, or Firm*—Quarles & Brady

[57] ABSTRACT

An electronic totalizer countrol for a coin sorter allows the user to assign and change fractional and whole-number coin values for denominations sorted at ten coin sorting stations in the sorter. The totalizer has a liquid crystal display (LCD) that integrates several cursors with the usual digits for displaying totals. A keyboard includes a BAG COUNT key operable to select a particular coin sorting station as indicated by one of the cursors. The keyboard also has DISPLAY keys operable to display monetary totals that has been accumulated by counting signals generated at the coin stations and adding a user-entered coin value for each signal to the total for the respective denomination. Coin data is stored in display data structures in a coin station data table for advantageous operation of the LCD.

12 Claims, 12 Drawing Figures

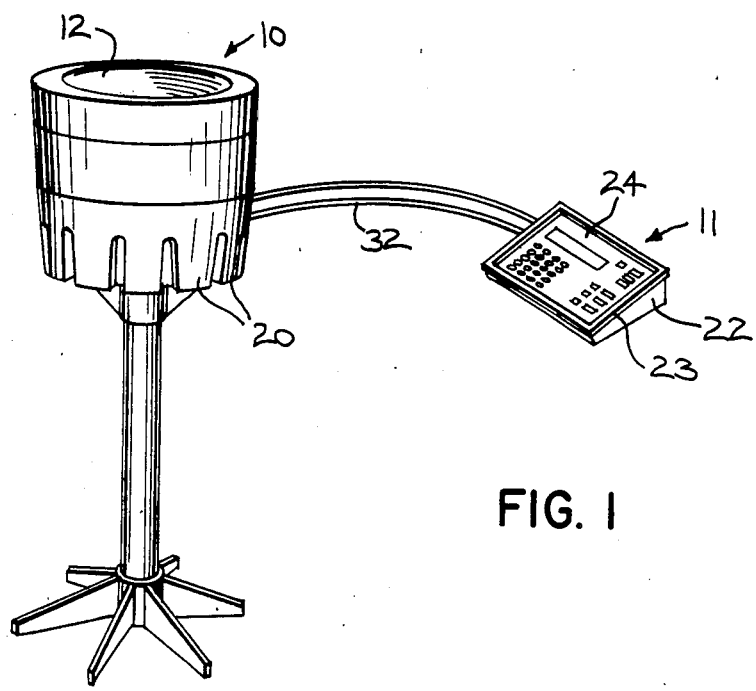
FIG. 1
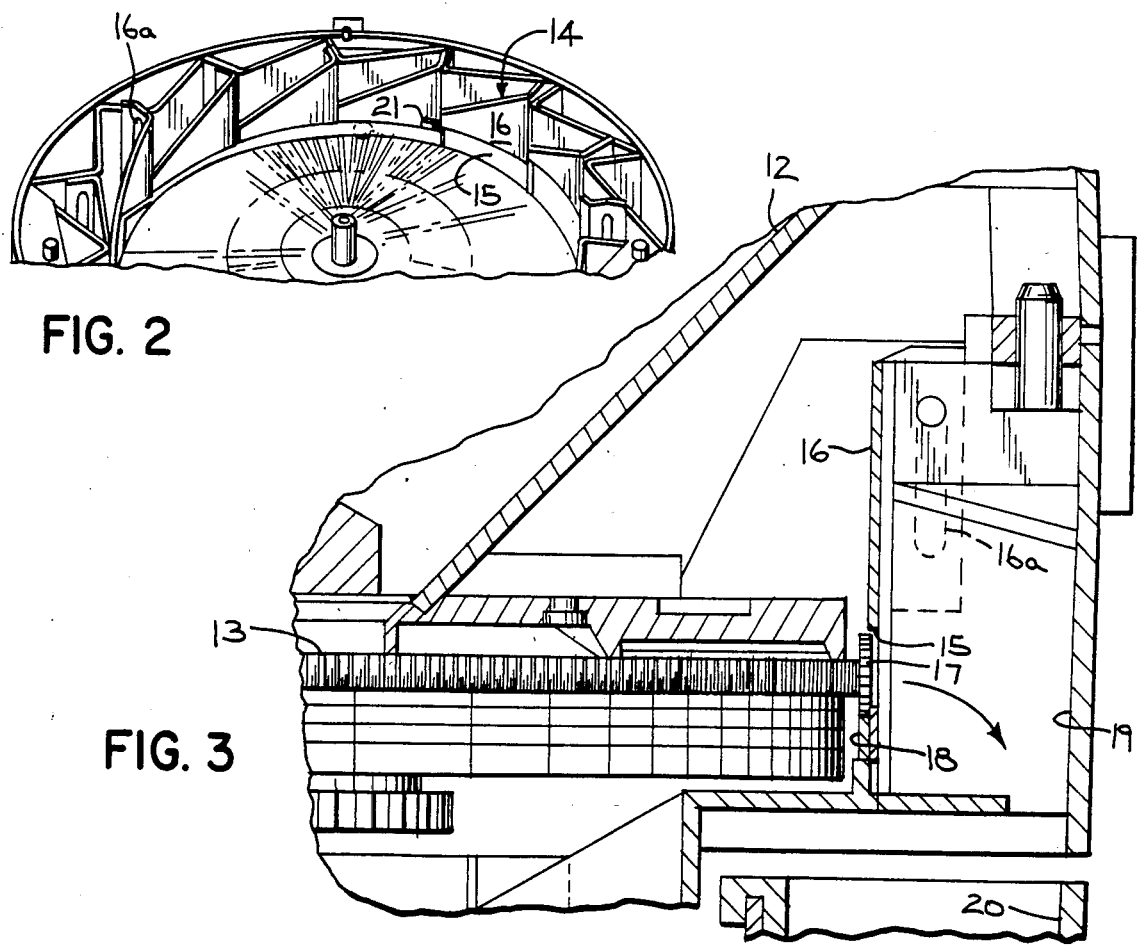
FIG. 2
FIG. 3

ELECTRONIC CONTROL FOR TOTALING DENOMINATIONS OF SEVERAL COUNTRIES

This application is a continuation, of application Ser. No. 899,761, filed Aug. 21, 1986, which is a continuation of Ser. No. 596,439 filed on Apr. 3, 1984 both now abandoned.

BACKGROUND OF THE INVENTION

The invention relates to coin totalizer controls for controlling the operation of one or more coin sorter machines and for providing totals for the coins sorted by such machines.

The known prior coin sorting and counting equipment has been limited to counting and providing totals for denominations in a single national monetary system—U.S. coinage, for example. In such instances, neither the coin sorters nor the totalizer could process denominations from another country such as West Germany (the Federal Republic of Germany), for example.

There are several problems in providing sorting and counting equipment suitable for handling coins in different national monetary systems. First, the coins of the various countries are of different sizes and weights. Each size generally requires a separate sorting slot and an associated sensor for detecting coins passing through the slot. Second, coins are of different relative values to a base unit in other national monetary systems. For example, the U.S. penny is the equivalent of 0.01 of a U.S. dollar, but in West Germany, a coin such as the two-pfennig denomination is the equivalent of 0.02 of the German deutsche mark (DM), and is thus not related to the base unit of currency by the same decimal fraction.

Totalizers have some type of display for showing the accumulated monetary values of coins processed by a coin sorter. These have usually included a numeric display with some number of digits. Lighting elements have been added to the control to indicate the function being performed by the totalizer. Thus, if the totalizer shows a monetary value for nickels on its numeric display, an LED positioned elsewhere on the control has been illuminated next to a label for nickels. In the known totalizers it has not been possible to reassign such an LED to indicate a different denomination. The labels for the denominations have been fixed rather than interchangeable and the totalizers have been wired to operate each LED for a single assigned function.

The problem of physical adaptability to different sizes of coins is resolved by a coin sorter described in a copending application of Taipale et al, entitled "Coin Handling and Sorting", which has been filed concurrently herewith. This coin sorter provides slots that can be adjusted to different sizes of coins and also provides a greater number of slots than the number of denominations in the typical national monetary system. Even with such a sorter, however, prior totalizers would be unable to recognize denominations in more than one national monetary system. Such totalizers would also be unable to accumulate total values for various denominations in more than one monetary system. For example, if 571 dimes are counted, the total in the U.S. monetary system is $57.10. A totalizer accumulates this total by counting the number of coins while adding a value of 0.10 to the monetary total for each dime counted. But, a prior machine for counting U.S. coinage has not been controllable so as to assign a value of 0.02 to a particular denomination. Therefore, such machines could not be used to accumulate values for denominations such as the two-pfennig denomination mentioned above.

Some manufacturers have responded to this problem by adding read-only memories that are coded with the coin values of a selected national monetary system. This, however, has still resulted in an apparatus dedicated to counting coins in a single national monetary system. Also, the insertion or changing of these memories is a manufacturing or service operation and thus, the machine is not readily operable by a user for handling denominations outside a single national monetary system.

SUMMARY OF THE INVENTION

The invention relates to a totalizer that counts coins and displays monetary values based on denominational values entered by a user. This allows handling of denominations for more than one national monetary system, because individual values for the respective denominations can be assigned and changed by the user.

The totalizer includes a user-operable input device for entering the values for respective denominations of a selected national monetary system and for entering commands to display accumulated monetary totals for those denominations. An arithmetic portion of the totalizer is connected to detect signals from a coin-sensing signal generator and to calculate monetary totals for the respective denominations based on the individual values entered by the user. A display is provided for viewing a monetary total for one of the respective denominations.

The user-operable input device, the arithmetic portion of the totalizer and the display are interfaced with a communication portion of the totalizer. This portion receives the values of the respective denominations from the user-operable input device; it communicates these values to the arithmetic portion; and it receives accumulated monetary values therefrom. The communication portion is then responsive to a command entered through the user-operable input device to couple the accumulated monetary value for one of the respective denominations to the display.

With the invention the user can enter a fractional value such as 0.02 for a particular coin sorting slot or station, and after coins of this denomination have been processed, the user can direct the display to show the accumulated monetary value.

As a further enhancement the displays of the prior art have been improved by integrating the display of numerical digits with a cursor that appears to move—to a position where it points to a number corresponding to the coin station where the selected denomination is being sorted. For added identification, a removable legend can be inserted above the display to show the denominational values relative to some basic monetary unit such as a U.S. dollar or the West German DM.

In the preferred embodiment, the manual input device is a membrane-switch keyboard panel, the arithmetic portion of the totalizer is a peripheral processor module, the communication portion of the totalizer is a main processor module and the display is a liquid crystal display (LCD) with both numeric and cursor elements.

The display is of the direct drive type in which data is latched to provide a steady signal to the display elements. This is in contrast to various multiplexing or scanning-type displays in which data is transmitted sequentially to the display elements, but at a rapid rate so that blinking of the elements is not observed.

A further aspect of the invention is the storing and communication of individual coin values, accumulated monetary values, accumulated coin counts and bag count limits in a standardized data structure. Information from the respective coin counting stations is routed to respective areas of memory where it is stored in the standardized data structure. When a particular parameter is to be displayed for a particular coin counting station or denomination, the individual data structure holding that information can be recalled from memory to drive the display.

Various objects and advantages of the invention will become apparent from the following description and from the drawings and appendices, which form a part hereof and which are referred to in the description. The drawings, appendices and description disclose a preferred embodiment—by way of an example of the invention. Such embodiment does not, however, represent the full scope of the invention, which has been reserved for the claims that follow the description.

BRIEF DESCRIPTION OF THE DRAWINGS

FIG. 1 is a perspective view of a coin sorter and an electronic totalizer control of the present invention;

FIG. 2 is a detailed view of a portion of the coin sorter seen in FIG. 1;

FIG. 3 is a detailed view of another portion of a coin sorter in FIG. 1;

LIST OF APPENDICES

AppendixA—IC Components

Figure 4:
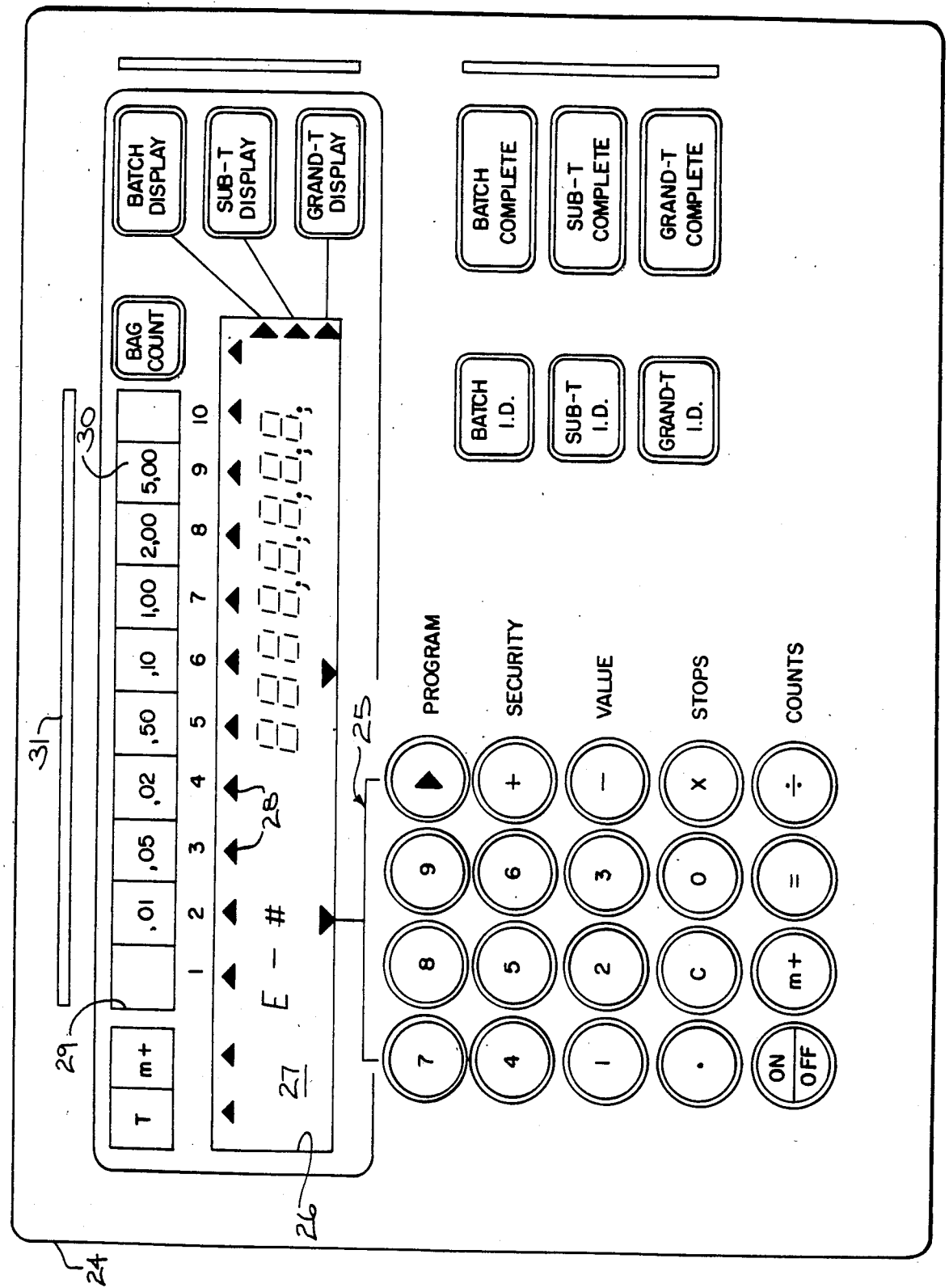
FIG. 4 is a plan view of a membrane-switch keyboard panel and of the display that are incorporated in the totalizer control seen in FIG. 1.

Appendix B—Map of Firmware for Main Processor

Appendix C—Map of Firmware for Peripheral Processor

Appendix D—Map of Read/Write Memory Associated with Main Processor.

Appendix E—Map of Coin Station Data Table Associated with Main Processor

Appendix F—Map of 8-Word Block of Data in Coin Station Data Tables

Appendix G—Map of Keyboard Input Data (Keyboard Monitor Routine)

Appendix H—Map of Display Data (Display Routine)

Appendix I—Map of Read/Write Memory Associated with Peripheral Processor

Appendix J—Map of Coin Station Data Table Associated with Peripheral Processor

Appendix K—Firmware Listings-Main Program Memory

Appendix L—Firmware Listings-Peripheral Program Memory

Appendices A-J follow the Description of the Preferred Embodiment while Appendices K and L are provided in a separate cover under 37 C.F.R. § 1.96 and are incorporated herein by reference.

DESCRIPTION OF THE PREFERRED EMBODIMENT

The invention is embodied in coin sorting and counting equipment shown in FIG. 1, which includes a motor-driven coin sorter machine 10 and an electronic totalizer control 11. The coin sorter is open at the top so that batches of coins can be dumped or poured into a hopper 12. The coins are funneled to the bottom of the hopper 12, as seen in FIG. 3, where they are picked up by a rotating mechanism 13, which spins the coins outwardly in a spiral pattern, towards a barrier 14 with multiple sections 16 as seen in FIG. 2. Along the bottom of the barrier 14, slots 15 of different sizes are formed. As the coins move outwardly from the axis of the rotating mechanism 13 and approach the barrier 14, the coins 17 are placed on edge, in a single file, as seen in FIG. 3. The coins proceed along the barrier 14 on rails 18 until reaching a slot 15 large enough to receive a particular sized coin 17. At this point the coin 17 is kicked off the rail 18, through the slot 15 and down through a passageway 19 into a coin drawer 20 or a coin bag (not shown). The size of the slots 15 in FIGS. 2 and 3 can be adjusted by raising or lowering the barrier sections 16. These sections 16 have elongated slots 16a seen in FIG. 2, which permit this adjustment.

The coin sorter 10 of FIG. 1 is provided with a set of ten coin drawers 20 designed to conform to its cylindrical configuration. Each drawer 20 can be replaced by a bag of the type traditionally used in banks. The drawers 20 or bags remain stationary as the internal coin sorting mechanism 13 rotates. The coin sorter 10 of FIG. 1 is in a pedestal configuration, however, it could also be included in a movable cabinet with the totalizer 11 being carried on a top counter. For further details concerning the coin sorter, reference is made to a copending application of Taipale et al, entitled "Coin Handling and Sorting", which has been filed concurrently herewith.

Along the slotted barrier 14 in FIG. 2 are sensors 21 which are placed at varying heights corresponding to different sizes of coins. Each sensor 21 is placed forward of a respective slot 15 that receives a particular size of coin, so that the coin will be intercepted before it reaches the slot. Each sensor 21, slot 15, passageway 19 and coin drawer 20 provide a "coin station", where coins of one denomination are sorted, counted and collected. There are ten such stations in the sorter of FIG. 1.

The sensors 21 of FIG. 2 are energized with a low-level, positive DC voltage of approximately 5 DC volts which is applied to each sensor 21 through a resistive element (not shown). When a coin 17 of appropriate size contacts the sensor 21, it makes an electrical connection between the sensor 21 and one of the rails 18 of the coin sorter 10. Since the rails 18 are grounded, the coin 17 will connect the sensor 21 to ground. A communication cable 32 in FIG. 1 includes individual sensing lines (not shown) which connect the sensors 21 in the coin sorter 10 to the totalizer control 11. When a coin 17 is not present at a sensor 21, its sensing line is at the 5-volt DC voltage, and this logic "high" signal is sensed by the totalizer. When a coin 17 comes in contact with a sensor 21, the signal line is switched to ground or a logic "low" level and this signal is communicated to the totalizer.

The totalizer 11 of FIG. 1 is contained in a housing having a base portion 22 and a bezel portion 23. A membrane-switch keyboard panel 24 is framed and held in place by the bezel portion 23. The keyboard panel 24 is seen with the bezel removed in FIG. 4. A five row-by-four column matrix 25 including keys labeled "0"–"9" is positioned towards the lower left-hand corner. The five-by-four matrix 25 also includes a decimal point (.) key and a clear entry (C) key. The keys in the fourth column to the right include a PROGRAM key and four dual-function keys below it. When the PROGRAM key is operated in a key sequence, the keys below it are used to enter SECURITY, COIN VALUE, BAG STOP and BAG COUNT commands. If the PROGRAM key has not been operated in the key sequence, the four keys are used for executing the arithmetic functions of adding (+), subtracting (−), multiplying (×) and dividing (÷). Across the bottom row of the five-by-four matrix 25 are a coin sorter ON/OFF button, a memory entry (M+) button for entering monetary values other than those presently being accumulated by the coin sorter 10, and an equals sign (=) key, which is pushed last in most key sequences to complete a command sequence.

Above the five-by-four matrix 25 is an opening 26 in the membrane-switch panel 14 through which a liquid crystal display (LCD) 27 is viewed. The display 27 can show three symbols, E, −, and #. The "E" symbol is used to identify error messages. The "−" identifies negative numbers, and the "#" designates a unit count in contrast to a fractional monetary value. To the right of these symbols up to eight alphanumeric digits are displayed with a decimal point (represented either as a period or a comma) being available after any of the five least significant digits. Along the upper edge and along the right edge of the LCD 27 are a plurality of cursor elements 28. These are aligned with numbers "1"–"10" on the face of the panel 24 and correspond to ten coin counting and collection stations. Due to the sequential actuation of the cursor elements 28, one cursor appears to be moving horizontally across the top, and other cursor appears to be moving vertically along the right edge of the LCD 27. Two other cursor elements 28 are positioned at specific locations along the bottom edge of the LCD 27. The LCD 27 has been provided according to the specification herein by Hamlin, Inc., Lake Mills, Wis.

Above the display are two permanently affixed symbols for a total value ("T") and a memory value ("M+") and a window 29 for viewing ten individual coin values carried on a removable legend 30. The coin value legend 30 is formed by a strip of lettered or printed material which is inserted through a slit 31 in the membrane 24 into a pocket viewed through the window 29. In the present example, fractional values of deutsche marks (DM) have been aligned with coin station designators "2"–"9". The 1-pfenning denomination will be collected at "COIN STATION 2", while the 5-DM coin will be collected at "COIN STATION 9".

Towards the right side of the membrane panel 24 are various special function keys. At the top and just to the right of the coin legend 30 is a special function key labeled "BAG COUNT". When this key is operated, there are two results. First, one cursor element 28 is deactuated, and cursor element 28 to its right is actuated, to make the cursor appear to move from one coin station to the next. By depressing the BAG COUNT key a number of times, the user can quickly move the cursor along to select one of the ten coin stations. The opertion of the BAG COUNT key is also a command to the totalizer to display the number of coins that have been counted and collected in the drawer 20 or bag at that particular station.

At the right end of the LCD 27 are three other special function keys: a BATCH DISPLAY key, a subtotal display (SUB-T DISPLAY) key and a grand total display (GRAND-T DISPLAY) key. By depressing the BATCH DISPLAY a key number of times, the user can move the cursor from one station to the next and display a batch value representing the monetary value of a single denomination collected at that station. The BATCH DISPLAY key can also be operated to actuate the cursor element 28 under the "T" symbol and to display the total monetary value of all denominations processed by the coin sorter 10 in a single batch. Thus, for example, if a collection of nickels, dimes and quarters were included in a batch taken from a particular vending machine, the monetary total for these three denominations will be displayed by the totalizer 11. When the BATCH DISPLAY key is operated, the uppermost cursor element 28 along the right edge of the display 27 is illuminated to identify the amount as a batch value.

The SUB-T DISPLAY key is operated to display a total monetary value for all denominations processed in one or more batches of coins. This function is not available on a station by station basis, so the horizontally moving cursor must be positioned beneath the symbol "T". When the SUB-T DISPLAY key is operated, the middle cursor element 28 along the right edge of the display 27 is illuminated.

The GRAND-T DISPLAY key is operated to display monetary totals for multiple batches of coins. A grand total may pertain to all coin stations (cursor under the "T" symbol), or to a selected coin station according to the position of the horizontally traveling cursor. When the GRAND-T DISPLAY key is operated, the bottom cursor element is illuminated along the right edge of the display 27. The actuation and deactuation of the three cursor elements 28 along the right edge of the display gives the appearance of a second cursor which moves in a vertical direction.

Below the DISPLAY keys are other special function keys referred to as the BATCH COMPLETE key, the subtotal complete (SUB-T COMPLETE) key, and the grand total complete (GRAND-T COMPLETE) key. These keys are operated after a batch of coins has been sorted to mark the end of the batch or the accumulation of a subtotal or grand total. The distinction between a subtotal and a grand total is that a subtotal of several batches may be cleared from memory, whereas a grand total may only be cleared when the user enters a particular security code.

To the left of the "COMPLETE" keys are a "BATCH I.D." key, a "SUB-T I.D." key and a "GRAND-T I.D." key for entering numbers to identify a batch, a subtotal and a grand total, respectively.

The BAG COUNT key is used in sequences with the PROGRAM key to assign a coin value to a particular coin processing station, and also to display coin values for the respective stations. To assign a coin value to a particular coin station, keys would be operated in a sequence shown in the following TABLE 1.

TABLE 1

Key Sequence for Entering Coin Value (a) push BAG COUNT to illuminate cursor element under appropriate coin processing station;
(b) push PROGRAM key
(c) push VALUE key
(d) push numeric keys 0-9 and decimal point key as needed, up to eight digits,
(e) push "=" key When the PROGRAM key is operated, the cursor element 28 along the lower edge of the display 27, and above the legend "PROGRAM" is illuminated. When the keys in the five-by-four key matrix 25 are operated, the cursor element 28 towards the lower left corner of the display 27 is actuated.

Using the key sequence in TABLE 1, the coin values shown in the legend 30 in FIG. 4 can be assigned to coin stations "2"-"8". The coin denominations in the West German monetary system include the 1-, 2-, 5-, 10- and 50-pfennig denominations, as well as the 1-, 2- and 5- deutsche mark (DM) denominations. The coin values entered are fractional values relative to the DM, and are as follows: 0,01; 0,05; 0,02; 0,50; 0,10; 1,00; 2,00 and 5,00. The West German monetary system also includes a 10-DM coin. (The comma is used to represent a decimal point as is the custom in West Germany.)

In France, the coin denominations available for processing are 1-, 2-, 5-, 10- and 20- and 50-centime denominations and the 1-, 2- and 10-franc denominations where one franc=100 centimes.

In Great Britain, the coin denominations available for processing are the ½- 1-, 2-, 5-, 10- and 50-pence denominations, where one pound Sterling=100 pence.

In Mexico, the coin denominations available for processing are the 1-, 5-, 10-, 20-, 25- and 50-centavo denominations, and the 1-, 5- and 10-peso denominations, where one peso=100 centavos.

These examples are given to show the advantage of the invention in permitting fractional coin values to be assigned and changed. The 0.055, 0.02 and 0.20 fractional values in these other countries do not find counterparts in the U.S. monetary system, nor are 5.00 and 10.00 values in circulation in the United States.

When it is desired to display a previously entered coin value for a particular station, the key sequence in the following TABLE 2 is executed. Once the coin value is displayed, a new value can be assigned by executing the sequence in TABLE 1 above.

TABLE 2

Key Sequence for Displaying Coin Value (a) push BAG COUNT to select appropriate coin processing station
(b) push PROGRAM key
(c) push VALUE key
(d) push "=" key In similar fashion by substituting operation of the STOPS key for the VALUE key in Tables 1 and 2, BAG STOPS can be entered and displayed. By substituting operation of the COUNTS key for the VALUE key in Table 1 a BAG COUNT can be entered.

Figure 5:
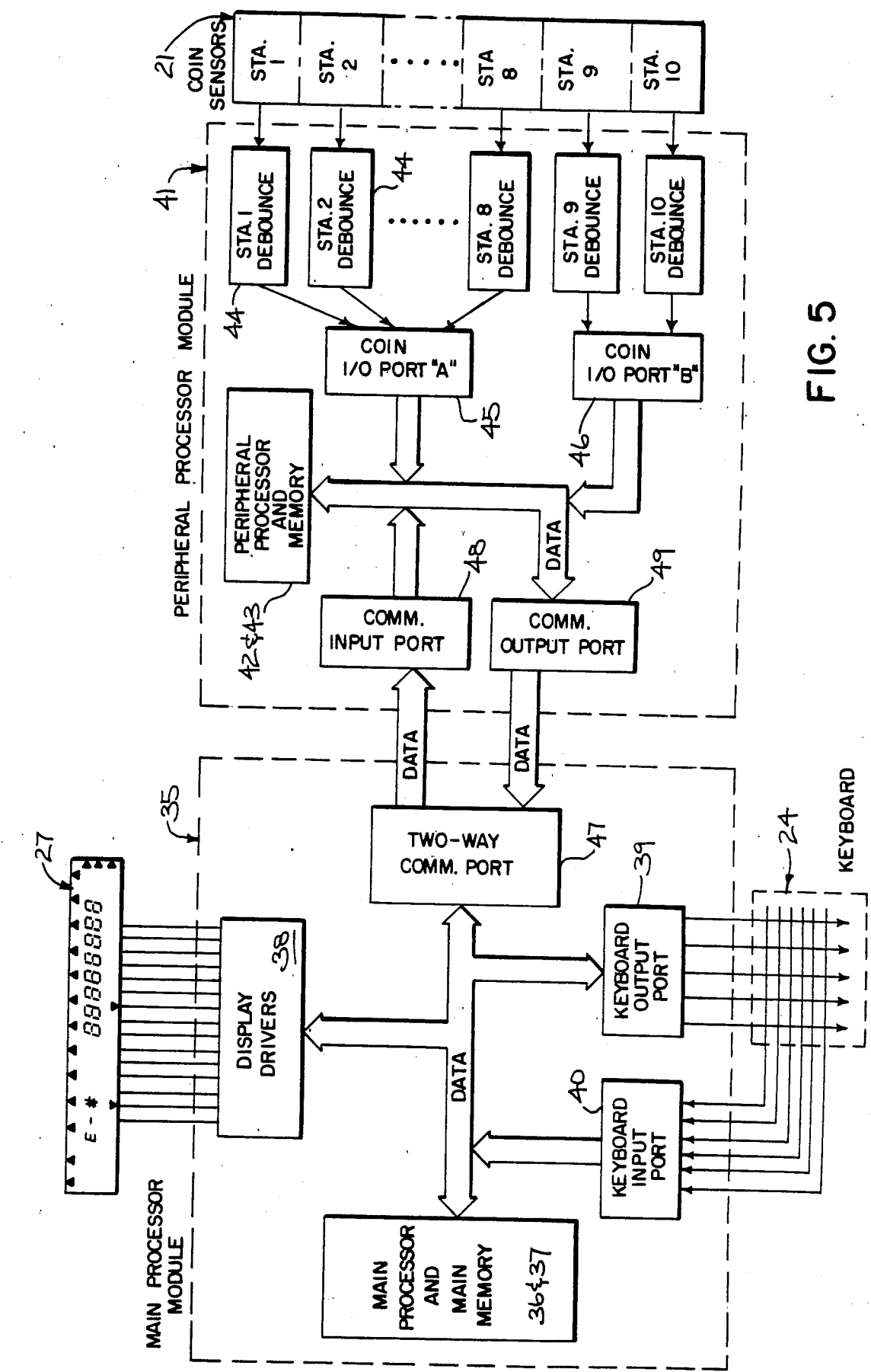
FIG. 5 is a system block diagram of the totalizer control of FIG. 1.

Inside the controller housing seen in FIG. 1 are the electronics for counting coins, performing calculations and interfacing the diplay 27 and the keyboard 24. As seen in FIG. 5 this hardware includes a main processor module 35 which interfaces the display 27 and the keyboard 24. The main processor 36 and its associated memory 37 provide data to a set of display drivers 38 for operating the individual digits, symbols and cursor elements of the display 27. The main processor 36 also scans the keyboard 24 by enabling columns in the key matrix through a keyboard output port 39 and by reading in key data from the rows of the key matrix through a keyboard input port 40.

Over to the far right of FIG. 5 are the coin sensors 21 for COIN STATIONS 1-10. These are interfaced to the main processor module 35 by a peripheral processor module 41. This module 41 includes its own processor 42 and associated memory 43 for reading the coin counting signals through a group of debounce circuits 44 and a pair of coin I/O ports 45,46. The main processor 36 communicates with the peripheral processor 42 through a two-way communication port 47 on the main processor module 35 and communication input and output ports 48,49 on the peripheral processor module 41.

The peripheral processor 42 accumulates coin count signals received from the coin sensors 21 and it also accumulates monetary values for the denominations associated with the respective coin stations based on coin values which it receives from the main processor module 35. The main processor and memory 36,37 receive COIN VALUE entries through the keyboard input port 39 and later download them to the peripheral processor and memory 42,43 where they are used in accumulating BATCH VALUES for the respective coin stations. These BATCH VALUES are then communicated from the peripheral processor and its memory 42,43 to the main processor and its memory 36,37 where they are available for display upon the entry of BATCH DISPLAY commands through the keyboard 24.

Figure 6:
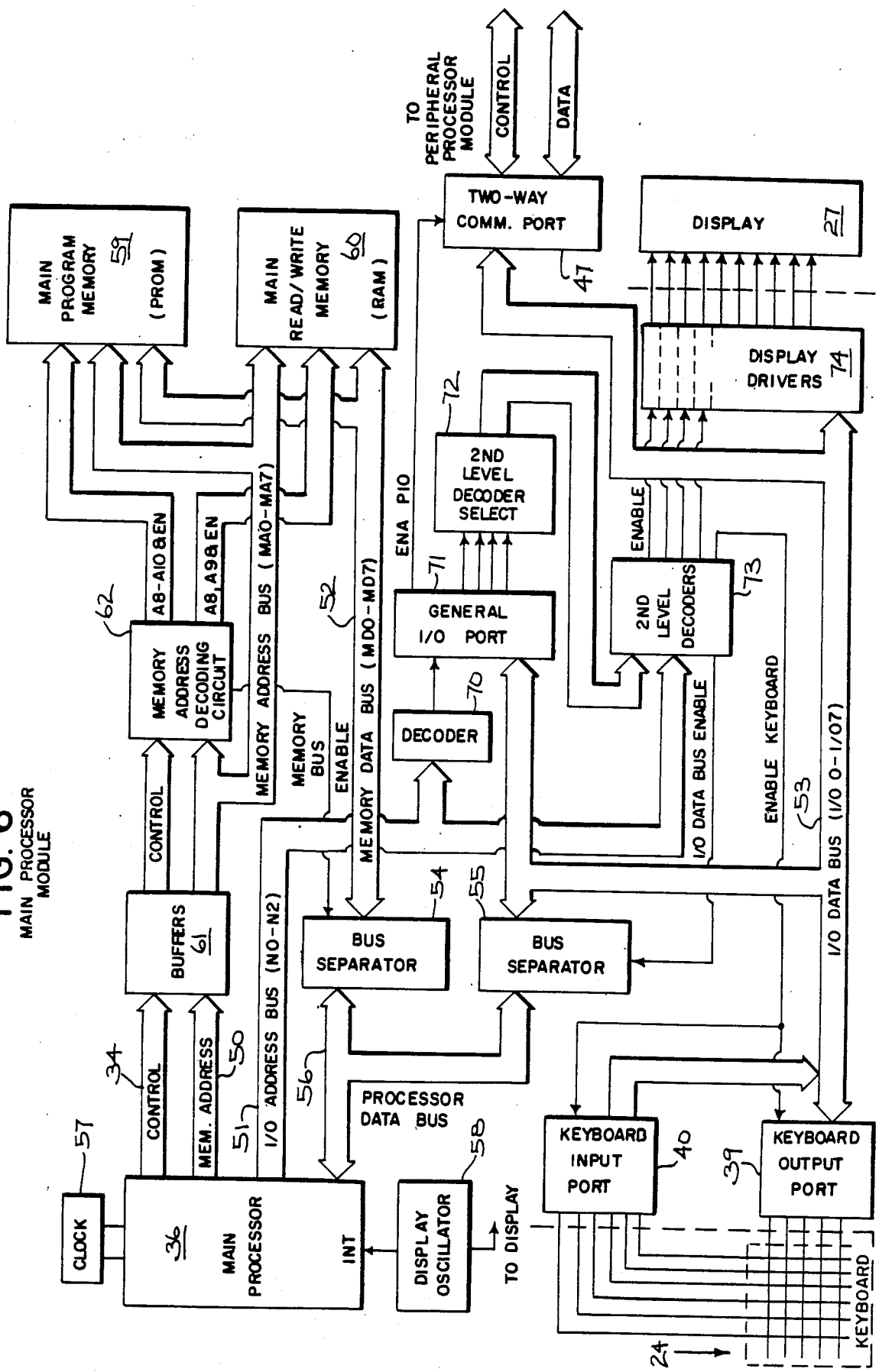
FIG. 6 is a block diagram of the main processor module of FIG. 5.

The details of the hardware on the main processor module 35 are seen in FIG. 6. The main processor 36 is a CDP1802 microprocessor manufactured by RCA. The integrated circuits on the main processor module 35, including this microprocessor 36, CMOS-technology circuits. Complete information on this microprocessor is available in literature from RCA, and of particular assistance is an RCA publication entitled "User Manual for the CDP1802 COSMAC Microprocessor." In the present embodiment four system timing signals, TPA, TPB, MWR(L) and MRD(L) are coupled to other parts of the module through a control bus 34 seen in FIG. 6. Where no symbol is used in relation to a hardware signal it is a high-true signal. The symbol "(L)" is used to signify low-true signal. This microprocessor uses separate memory and I/O address buses 50,51, the memory address bus 50 including lines MA0-MA7 and the I/O address bus 51 including lines N0-N2. In this embodiment the microprocessor also uses separate memory and I/O data buses 52,53 which are coupled through bus separators 54,55 an a processor data bus 56 to the processor 36.

The main processor 36 in FIG. 6 is driven by a conventional clock circuit 57 that includes a 2-MHz crystal oscillator. A display oscillator circuit 58, provided by a free-running astable multivibrator, is connected to one of the external flag inputs (INT) available on the microprocessor 36. This oscillator circuit 58 generates a signal every eighteen milliseconds. The main processor 36 responds to this maskable interrupt signal with certain instruction sequences to debounce keyboard inputs and time other events. The display oscillator 58 also generates timing signals needed for operation of the liquid crystal display (LCD) 27.

Memory on the main processor module 35 includes a main program memory 59 of programmable read-only (PROM) chips for storing 8k bytes of program information. This memory is addressable in an address range from 0000(hexadecimal) to 1FFF (hexadecimal). A main read/write memory 60, formed by two random access memory (RAM) circuits, stores up to 2k bytes of data and is addressable at addresses from 2000 (hexadecimal) to 27FF (hexadecimal). When the main processor 36 couples an address to either of the memories, 56,60 it first generates a high byte of address, and then generates a low byte of address, so that a sixteen-bit address can be transmitted through the 8-bit memory address bus 50. The memory address bus is coupled to the memories 59,60 through buffers 61 and a memory address decoding circuit 62. When the high byte of address is generated, the microprocessor 36 generates the TPA control signal to latch the high address byte in the memory address decoding circuit 62. This byte is decoded to generate certain high address signals A8, A9, A10 and certain chip enable (EN) signals to the respective portions of the two memories 59,60. The main processor 36 then transmits the low byte of address through the buffers 61 to the address inputs of the respective memories 59,60. When the high address byte is transmitted it generates a signal on a MEMORY BUS ENABLE line to the bus separator 54 which couples the memory data bus 52 to the processor data bus 56 for purposes of reading and writing information between the processor 36 and the memories 59,60.

Figure 7:
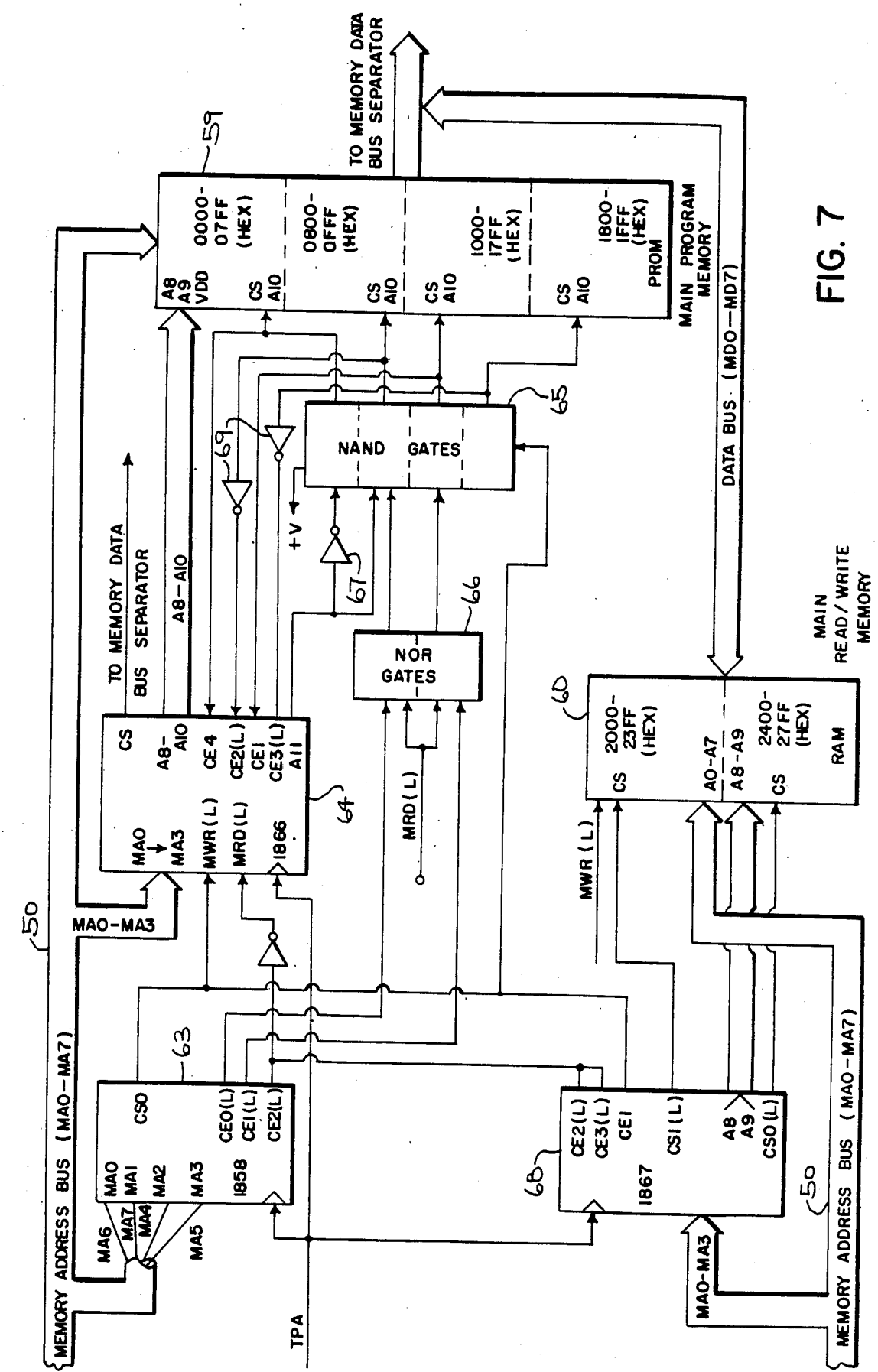
FIG. 7 is an electrical schematic diagram of the memory address decoding circuit of FIG. 6.

The memory address decoding circuit 62 is seen in more detail in FIG. 7. There it can be seen when the high byte of address is generated on the memory address bus 50, signals on lines MA4-MA7 are transmitted to the address inputs MA0-MA3 on an "1858" memory interface circuit 63. This circuit 63 is a four-bit latch/decoder which has been developed along with many of the other CMOS-technology chips seen on the main processor module 35 for use with the CDP1802 microprocessor. These and the other ICs on both the main processor module 35 and the peripheral processor 41 module are identified in Appendix A. For complete descriptions, diagrams and specifications for the various circuits to be described on the main processor module 35 and the microprocessor module 41, reference is made to RCA catalogs and data books for RCA CMOS products and RCA 1800-series products.

It should be noted regarding FIG. 7 that the address lines MA4-MA7 have not been connected in ascending order to inputs MA0-MA3, and that the "1858" receives the TPA timing signal from the main processor 36. A signal from the chip select output (CS0) on the "1858" enables four NAND gates 65 each of which enables a respective portion of the main program memory 59. Two of these four-input NAND gates 65 are enabled through one of a pair of NOR gates 66 and two other of these NAND gates are enabled through the other of the NOR gates 66. Each pair of NAND gates 65 is further distinguished by signals from the All output on an "1866" memory interface circuit 64, which is coupled through an inverter 67 to one of each pair of NAND gates 65 and is coupled directly to the other. For convenience of the illustration, the connections of the inverted and noninverted All signals have only been shown for one pair of the NAND gates 65. A fourth input on each NAND gate 65 is pulled high to the DC supply voltage (+V).

Besides enabling the four portions of the program memory 59, the memory chip select signals from the NAND gates 65 are fed back to inputs on an "1866" memory interface circuit 64, the lines to the CE3 and CE2(L) inputs being connected through inverters 69. Lines MA0-MA3 of the memory address bus 50 are coupled to the "1866" circuit, which is also a specialized four-bit latch/decoder available from RCA. The "1866" provides address signals on lines A8-A10 to all portions of the main program memory 59 and it also generates a signal from its CS output to the memory data bus separator 54 in FIG. 6.

The lower three bits of the high byte of address and the TPA signal are also coupled to an "1867" memory interface circuit 68 in FIG. 7, which depending upon signals received from the "1858" and the address will enable half-portions of the main read/write memory 60 through lines connecting to CS inputs on these respective portions. The main processor 36 controls the reading of data from the main program memory 59 through the MRD(L) control line and the NOR gates 66 and it controls the reading and writing of data to and from the main read/write memory 60 through the MWR(L) line connected to inputs on the RAM memory circuits.

Referring back to FIG. 6, the handling of I/O addresses and data will now be described. When the main processor 36 executes instructions to enable an I/O port, signals are coupled on lines N0–N2 of the I/O address bus 51 to a first level decoder 70. Using a three line-to-eight line decoder 70 a number of I/O ports can be controlled in a single level I/O system. The modules 35,41 here use a two-level I/O system in which the I/O address signals are decoded by a first such decoder 70 to enable a general I/O port 71. A word of data is then transmitted to this general I/O port 71 and four of its bits are coupled to a second level decoder select circuit 72 to select one of a series of second level decoders 73. The second level I/O ports include the display drivers 74, the keyboard input and output ports 40,39 and the two-way communication port 47.

Figure 8:
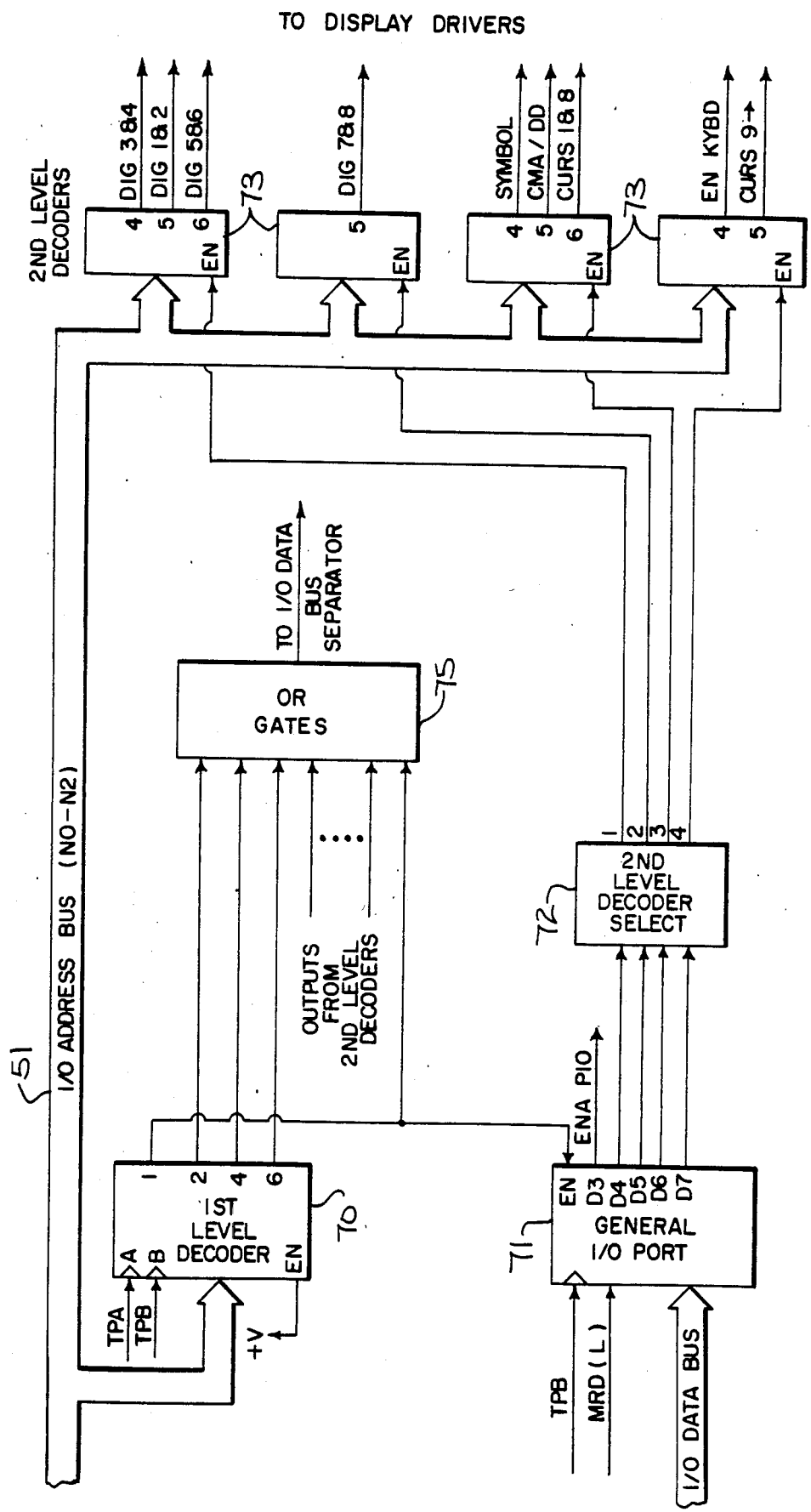
FIG. 8 is an electrical schematic diagram of the I/O decoding circuitry seen in FIG. 6.

The details of I/O decoding are seen in FIG. 8, where the I/O address bus 51 is coupled to the first level decoder 70. The TPA and TPB control signals are coupled to clock inputs "A" and "B" to mark a time when the outputs are enabled. The chip enable (CE) input is pulled high so that the circuit 70 is always enabled for receiving the clock signals. When an I/O address is generated to enable "output port 1", an enable signal is coupled from the "1" output on the first level decoder 70 to the general I/O port 71. I/O addresses also generate signals from the "2", "4", and "6" outputs of the first level decoder 70 to a group of OR gates 75 to enable the I/O data bus separator 55 seen in FIG. 5.

When using a two-level I/O system, two output instructions are executed by the processor 36 to move data to a final destination such as the display drivers 74 in FIG. 6, which are also output ports for data. The output instructions may be in a sequence like the following, which is taken from the Display Routine in the 10th Section of Appendix K.

OUT 1
OUT 4

-continued

```
OUT 1
OUT 6
OUT 1
OUT 5
```

A pointer register in the processor 36 is initialized so that the instruction OUT 1 will output a word of data from the read/write memory 60 to "output port 1" in the first level of I/O ports. "Output port 1" corresponds to the port enabled fom the "1" output of the 1st level decoder 70 in FIG. 8. This port is the general I/O port 71. The word of data that is sent to the general I/O port 71 determines which of its outputs D3–D7 will transmit active signals. Output D3 is active in response to a word "08" (hexadecimal) to enable the two-way communication port 47 in FIG. 5 through the ENA PIO line. Output D4 is active in response to a word "10" (hexadecimal) to generate an active signal at the "1" output of the second level decoder select circuit 72 to select the first one of the second level decoders 73. Thus, if the first OUT 1 instruction listed above is executed to move the word "10" (hex) to the general I/O port 71, the next OUT 4 instruction will generate signals to the first of the decoders 73 to activate its "4" output. This will enable the display drivers 74 for driving "DIGITS 3 & 4" of the display 27. By transmitting different enable words with the various OUT 1 instructions, the second level decoders 73 can be selected, so that when the "OUT 4", "OUT 5" and "OUT 6" instructions are executed, they will select port 4, 5, or 6 controlled by a selected second level decoder 73.

It can be seen in FIG. 8 that these "4", "5" and "6" ports at the second level include nine ports for driving the digits, the symbols, the decimal points and the cursor elements 28 of the display 27 and a port for enabling the keyboard ports 39 and 40. Besides enabling the display drivers 74, the enable signals from the second level decoders 73 are also coupled back through the OR gates 75 to enable the I/O data bus separator 55 in FIG. 5 so that data can be coupled to the selected I/O port at the second level.

Figure 9:
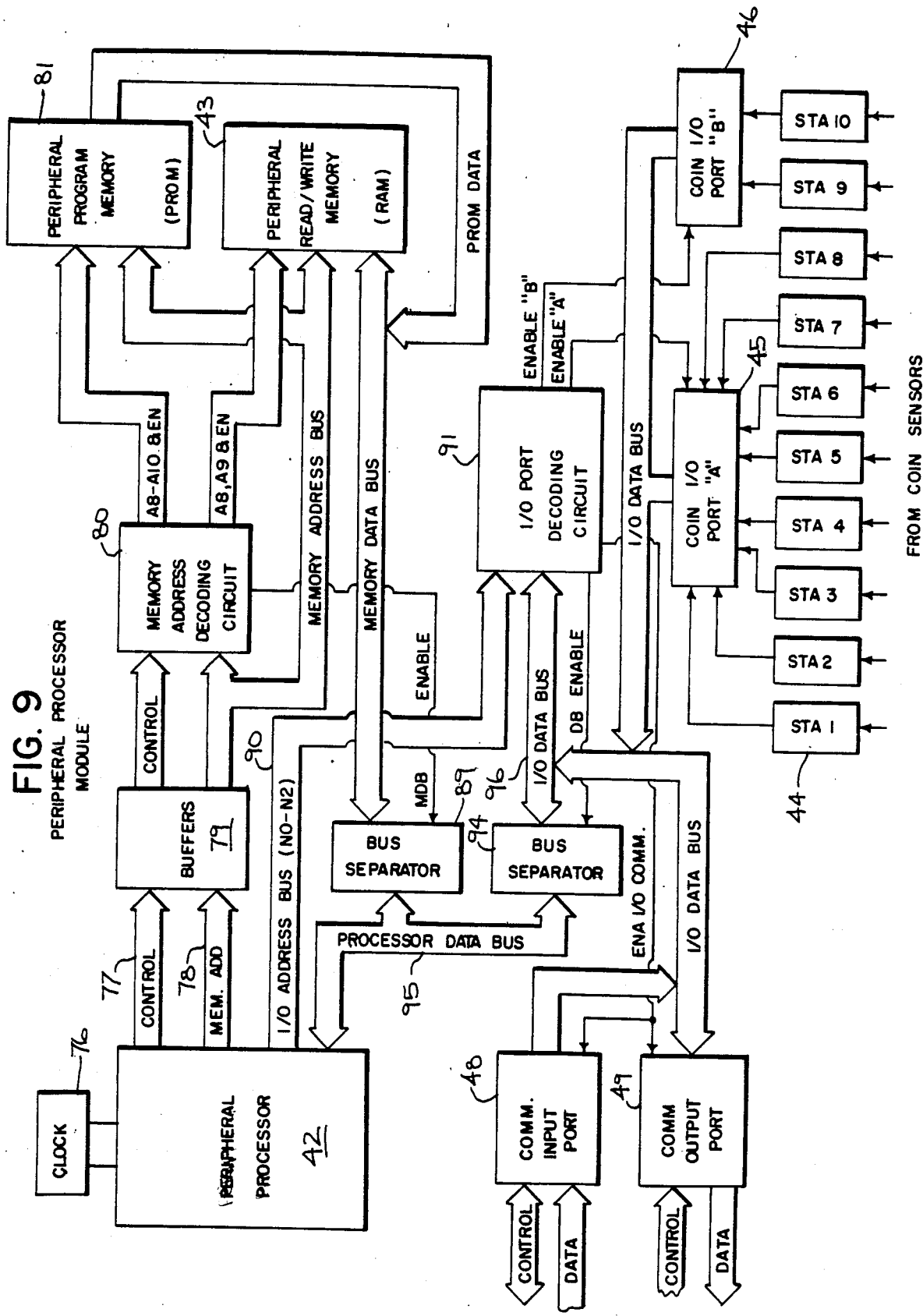
FIG. 9 is a block diagram of the peripheral processor module of FIG. 5.

Referring next to FIG. 9, the peripheral processor module 41 includes the peripheral processor 42, which is a second CDP1802 microprocessor. This microprocessor is also driven by a clock circuit 76 including a crystal oscillator for generating clock pulses at a 2-MHz frequency. Control lines 77 for the TPA, TPB, MRD(L) and MWR(L) signals and a memory address bus with lines A0–A7 couple the processor 42 to memory through buffers 79. The memory address bus 78 couples a high byte of address to the memory address decoding circuit 80 and a low byte of address to memory with the memory data bus separator 89 being enabled from the decoding circuit 80 on the MDB ENABLE line.

The peripheral read/write memory 43 is comprised of random-access memory (RAM) circuits that are addressed in a range from 1000 (hexadecimal) to 13FF (hexadecimal). In decimal terms this range of addresses is from 4k to 5k and provides 1k bytes of data storage.

The peripheral program memory 81 is addressed in a range from 0000 (hexadecimal) to 07FF (hexadecimal), which can also be expressed as an address range from 0–2k. The program memory 81 stores 2k bytes of program information used by the peripheral processor 42.

Figure 10:
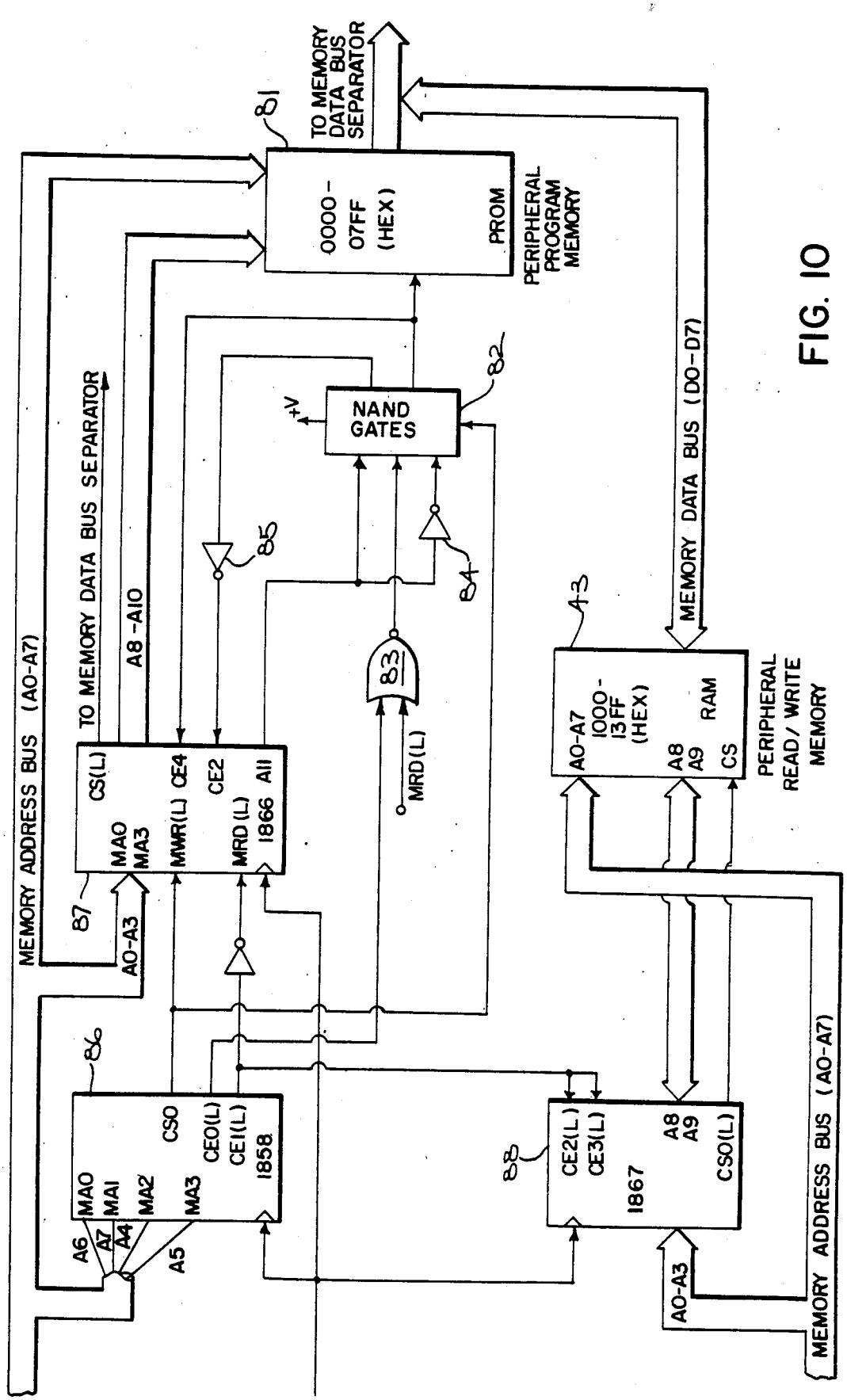
FIG. 10 is an electrical schematic diagram of the memory address decoding circuit of FIG. 9.

The memory address decoding circuit 80 is seen in detail in FIG. 10 and includes an "1858" memory interface circuit 86, and "1866" memory interface circuit 87 and an "1867" memory interface circuit 88 similar to the memory address decoding circuit 62 for the main processor module 35 that as seen in FIG. 7. The "1858" receives the high four bits A4–A7 of the high byte of address and enables either the "1866" or the NOR gate 83, from its CE0(L) and CE1(L) outputs. The "1866" generates a signal from its CS(L) output to enable the memory data bus separator 89. The "1867" enables the read/write memory 43 with a signal from its CS0(L) output to chip select (CS) inputs on the RAM circuits.

Because only one PROM circuit is enabled, only two NAND gates 82 and one NOR gate 83 are necessary for coupling the chip select (CS0) line from the "1858", the MRD(L) line from the peripheral processor 42 and the A11 output from the "1866". Similar to the decoding circuit described earlier, the four-input NAND gates 82 both receive the chip select output (CS0) signal from the "1858", a logic high signal from the DC supply (+V) and an output signal from the NOR gate 83. The NAND gates 82 are selected by a signal from the A11 output on the 1866 circuit that is coupled to one of the gates 82 through an inverter 84 and directly to the other of the gates 82. The outputs of the NAND gates 82 are connected to the CE4 and CE2 inputs on the "1866", one of the NAND gates 82 being connected to the CE2 input through an inverter 85.

Referring again to FIG. 9, the peripheral processor 42 is also connected through an I/O address bus 90 with lines N0–N2 to an I/O port decoding circuit 91. This circuit enables the communication input port 48 and the communication output port 49 through an enable I/O communication (ENA I/O COMM.) line. It also enables the coin I/O ports 45,46 through the ENABLE "A" and ENABLE "B" lines seen in FIG. 9. It also enables the I/O data bus separator 94 through a DB ENABLE line so that output data can be coupled from the peripheral processor 42 and the processor data bus 95 to the I/O data bus 96 and so that coin sensing data can be read from the coin I/O ports 45,46. Coin sensing signals are coupled through coin debounce circuits 44 for COIN STATIONS 1-10 as seen in FIG. 9. The coin debounce circuits 44 for COIN STATIONS 1-8 are connected to coin I/O port "A" while the coin debounce circuits 44 for COIN STATIONS 9 and 10 are connected to coin I/O port "B".

Figure 11:
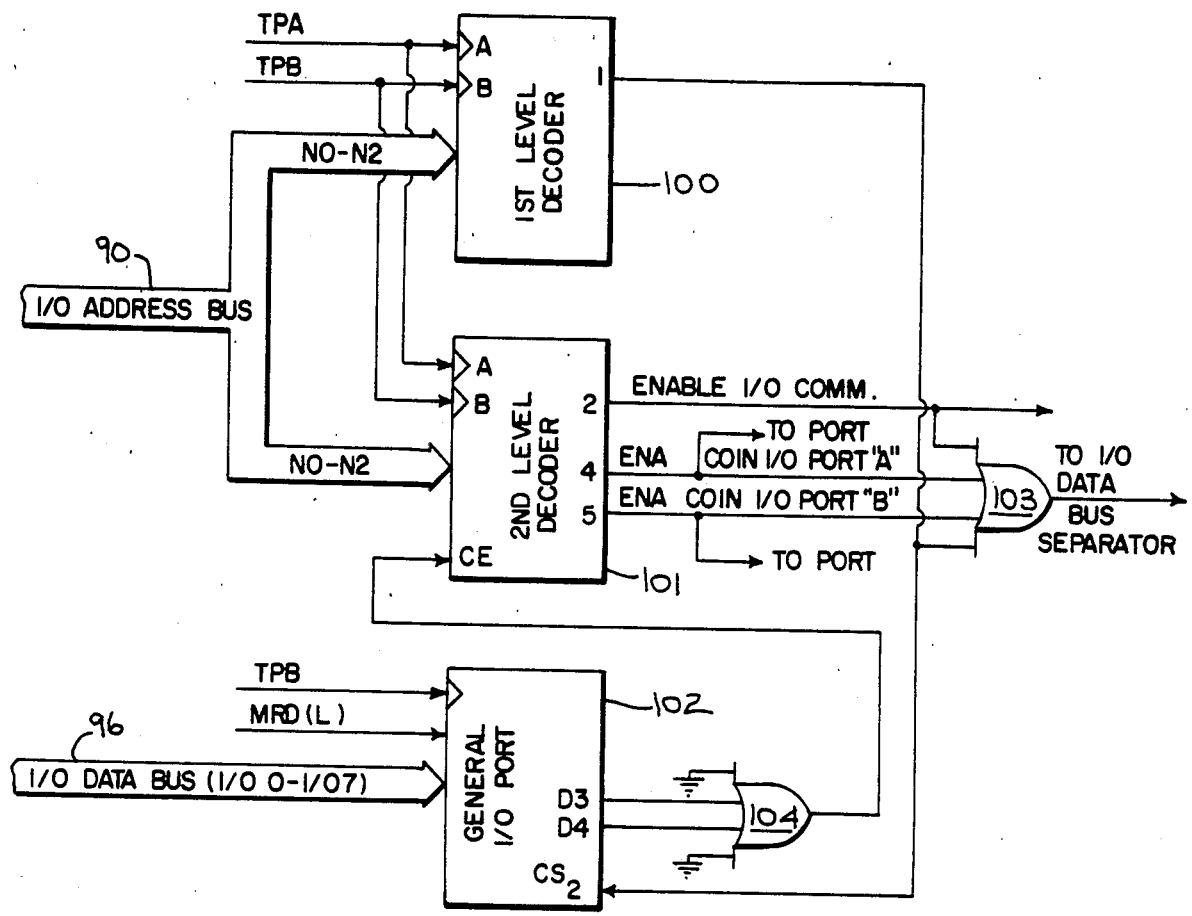
FIG. 11 is an electrical schematic diagram of the I/O port decoding circuitry of FIG. 9.

The I/O port decoding circuit 91 is seen in more detail in FIG. 11 where the I/O address bus 90 is coupled to a first level decoder 100 and a second level decoder 101 along with the TPA and TPB control lines. When a first output instruction (OUT 1) is generated by the processor 42 the N-line signals are received by the first level decoder 100 because the second level decoder 101 has not yet been enabled. The "OUT 1" instruction generates a signal at the "1" output to enable the general I/O port 102 at its CS2 input and to enable the I/O data bus separator 94 in FIG. 9 through the four-input OR gate 103 seen in FIG. 10. Data is received on the I/O data bus 96 and latched when the TPB signal is received by the general I/O port 102. The data transmitted by the "OUT 1" instruction generates signals from outputs D3 and D4 of the I/O port 102 to a second OR gate 104 to enable the second level decoder 101. A second I/O instruction can then be executed so that signals on lines N0–N2 will be decoded by the second level decoder 101 to enable I/O communication through the second level "port 2" or to enable the coin I/O ports, which are second level ports "4" and "5". When any of these is enabled, a signal is also coupled through the OR gate 103 to enable the I/O data bus separator 94 so that data can be coupled to or from the I/O communication ports 48,49 or so that coin sensing data can be read from the coin I/O ports 45,46.

Figure 12:
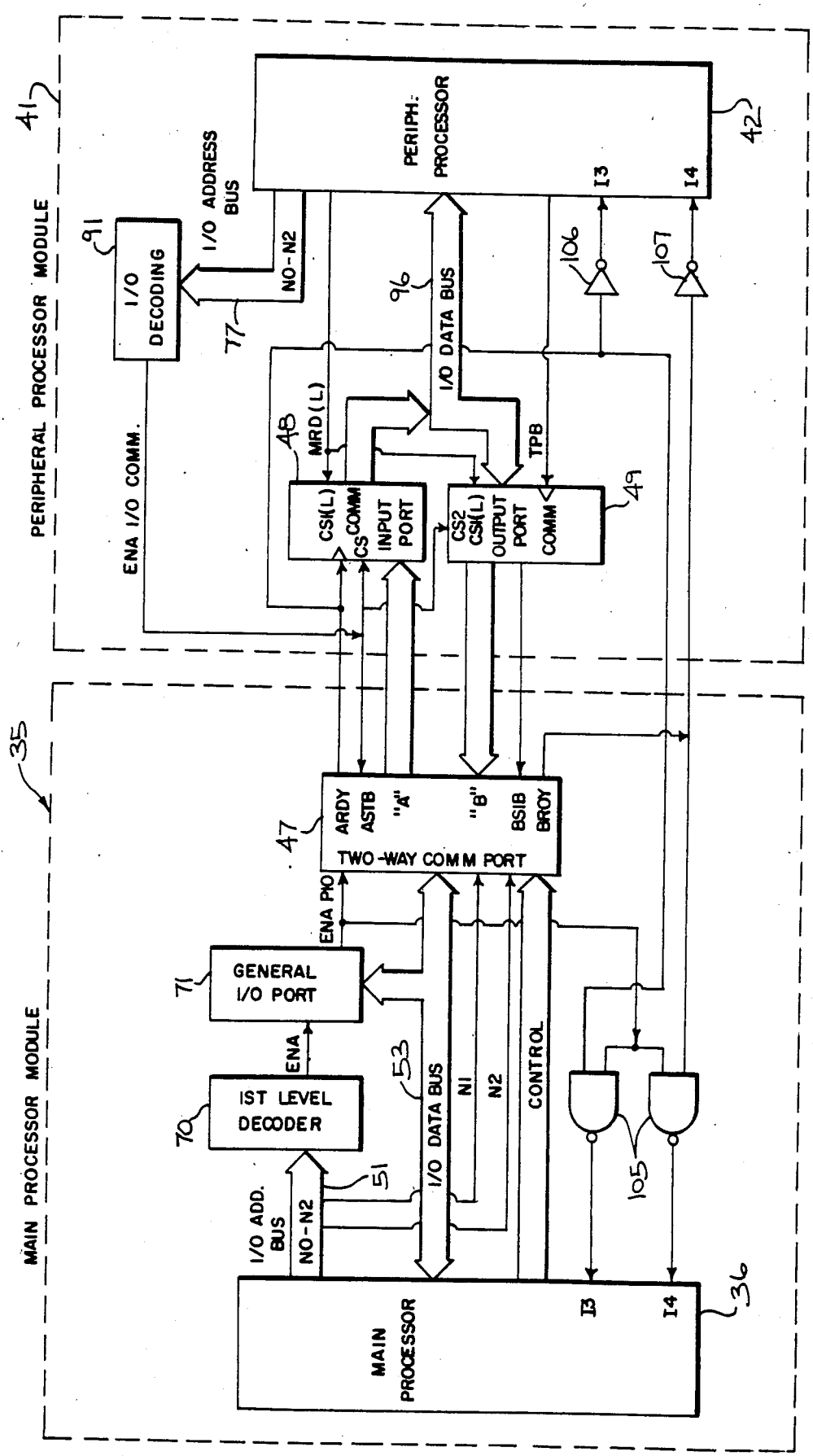
FIG. 12 is a block diagram of the communication circuitry on the main processor and peripheral processor modules of FIG. 5.

Referring next to FIG. 12, the main processor module 35 and the peripheral processor module 41 communicate with each other through their respective communication ports 47–49. The two-way communication port 47 on the main processor module 35 is programmable for operation in various modes.

The port 47 is a CDP1851 I/O port manufactured by RCA and a specification for its operation is provided in literature available from RCA and its distributors. The port 47 is enabled in this embodiment through the first level decoder 70, the general I/O port 71 and the ENA PIO line. The ENA PIO line is also connected to enable two NAND gates 105 coupling signals to interrupt inputs I3 and I4 on the main processor 36. The N1 and N2 lines in the I/O address bus 51 are coupled to two register address inputs on the two-way communication port 47 to select either port "A" or port "B" or one of the control/status registers in in the circuit 47. Both data words and words of control information are coupled from the main processor 36 to the two-way communication port 47.

The port 47 uses handshaking signals ARDY, ASTB, BRDY and BSTB to transfer data between the two modules 35,41. When data is loaded into port "A" for transfer to the communication input port 48 on the other module, an ARDY signal is generated to a clock input on the input port 48 and through an inverter 100 to an interrupt input I3 on the peripheral processor 42. This informs the peripheral processor 42 that data in the "A" port is ready for transfer. The ARDY signal is also coupled through one of the NAND gates 105 to the interrupt input I3 on the main processor 36. When the peripheral processor 42 executes a data communication routine, it will execute an instruction to enable the communication ports 48,49 through its I/O decoding circuit 91 and the ENA I/O COMM. line. This will cause data to be transferred to the communication input port 48 and a signal that the data has been taken will be generated to the ASTB input on the two-way port 47.

The peripheral processor 52 clocks data on its I/O data bus 96 into the output port 49 using the TPB timing signal. When data is transferred from the communication output port 49, a BSTB signal is coupled to port "B" on the two-way communication port 47 to indicate that data has been transferred. When the main processor 36 reads the data, it will generate a signal on the BRDY line from the two-way communication port 47. The BRDY signal will be transmitted through an inverter 107 to the I4 interrupt input on the peripheral processor 42 to signal that Port "B" is empty. The BRDY line will also generate an interrupt through one of the NAND gates 105 to the I4 interrupt input on the main processor 36.

Now that the hardware on the respective modules 35,41 has been described, a further understanding of the operation of the totalizer 11 can be otained from a consideration of the program instructions for directing operation of the respective processors 36,42. These instructions are relatively fixed in the PROM program memories 59,81 and are thus referred to as firmware. Appendix B contains a map of the firmware routines such as "TIMER" and "KEYBOARD MONITOR" which are executed by the main processor 36 and stored in the main program memory 59 seen in FIG. 6. Individual instructions for each routine are listed in Appendix K. Similarly, the firmware routines stored in the program memory 81 in FIG. 9 direct operation of the peripheral processor 42. These routines are identified generally in Appendix C, and specific instructions for each routine are contained in Appendix L. The addresses shown in Appendix B and C are starting addresses in hexadecimal (hex) notation. The routines may or may not fill the entire area up to the starting address of the next routine as long as the processors 36,42 continue incrementing their program counter to reach the instructions in the next routine, as for example, by executing "no operation" (NOP) instructions.

Referring next to Appendix D, the most significant data in memory is stored in the COIN STATION DATA TABLE from addresses 2000 (hex) to 21CF (hex). A duplicate of this data table is stored from address 21D0 (hex) to 239F (hex) for access by a supervisory computer or for operating a printer.

Referring next to Appendix E, the COIN STATION DATA TABLE stores parameter data for COIN STATIONS 1–10 in blocks of eight bytes or eight words each. The terms "words" and "bytes" both mean an eight-bit group of data in this instance, however, in other applications the term "word" is used for groups of data with different numbers of bits. Here, for example, the COIN VALUE data for STATION 1 occupies eight bytes of memory with addresses from 2000 (hex) to 2007 (hex). This pattern for COIN VALUE data is repeated for STATIONS 2–9 and down to STATION 10 where an eight-byte block of data for the coin value of STATION 10 is stored at addresses 2048–204F (hex).

Next, a group of ten eight-byte blocks of data are used to store BAG STOP data for the COIN STATIONS 1–10. The BAG STOP data for STATION 1 is located at addresses 20A0–20A7 (hex) and BAG STOP data for STATIONS 2–10 continues down to the block for STATION 10 at addresses 2098–209F (hex). A "bag stop" is a count or limit which defines the number of coins in one bag. Following the BAG STOP data are ten eight-byte blocks of data for BATCH VALUE, again corresponding to COIN STATIONS 1–10. There are also ten eight-word blocks of data for the GRAND VALUES accumulated for COIN STATIONS 1–10 and there are ten eight-word blocks of data for "BAG COUNTS" for COIN STATIONS 1–10. A "bag count" is the number of coins counted, but is not to exceed the bag stop limit. For each COIN STATION there is a block of COIN VALUE data, a block of BAG STOP data, a block of BATCH VALUE data, a block of GRAND VALUE data and a block of BAG COUNT data.

Each of the eight-byte blocks of data is stored in a standardized data structure which has been mapped in Appendix F. As seen there, the block of data is arranged to hold eight nibbles (four bits each) of binary-coded data (BCD) in "Words 4–7". Each nibble provides the data for one of the eight digits of the liquid crystal display 27. In "Words 0–3" are individual bits of data corresponding to the various other elements that can be illuminated in the integrated display 27. There are bits for each of the cursor elements 28 as well as for the decimal points and commas associated with the last five digits.

When data in the COIN STATION DATA TABLE such as BATCH VALUE data is displayed, the main processor 36 executes the DATA TRANSFER routine starting at 13D0 (hex) in Appendix B to transfer a block of data from the COIN STATION DATA TABLE in Appendix D to an area for DISPLAY DATA at addresses 27F0-27FF. When the data is transferred to the DISPLAY DATA area it is arranged as seen in Appendix H. "Word 0" data in Appendix F is moved to address 27F1 (hex) seen in Appendix H. "Word 1" data in Appendix F is moved to address 27F3 (hex) seen in Appendix H. Similarly all eight words in a block of data as shown in Appendix F are moved to the odd-numbered lines in the sixteen-byte area for DISPLAY DATA seen in Appendix H.

When the main processor 36 executes the DISPLAY ROUTINE starting at address 1540 (hex) in Appendix B, it will load the enable words seen in the even-numbered lines from 27F0-27FE (hex) in Appendix H. These are words that will be transmitted to the general I/P port 71 in FIG. 8 to select one of the second level decoders 73. The word "30 (hex)", for example, will out-enable the third decoder 73 in FIG. 8 so that data can be sent to the drivers for displaying the SYMBOLS, the CURSORS FOR COIN STATIONS 1-8 and the COMMA/DECIMAL POINT elements. In this way the main processor 36 uses the data stored in the data structures in the COIN STATION DATA TABLE to drive the display 27.

Referring again to Appendix E it will be seen that besides the BATCH VALUE data for the COIN STATIONS 1-10 the main memory also stores a BATCH TOTAL VALUE at address 20F8-20FF (hex), a SUBTOTAL VALUE at addresses 2100-2107 (hex) and a GRAND TOTAL VALUE at addresses 2160-2167 (hex) as well as MEMORY VALUES and I.D. data. All of this data is stored in data structures as shown in Appendix F.

Referring next to Appendix I, the read/write memory 43 associated with the peripheral processor 42 also stores a COIN STATION DATA TABLE as well as providing a scratchpad area at addresses 1350-13FF (hex). This COIN STATION DATA TABLE is somewhat more limited as seen in Appendix J. It does include eight-word blocks of data for BATCH VALUES, COIN VALUES, BAG STOPS and BAG COUNTS at each COIN STATION. It does not, however, provide an area for storing GRAND VALUES as the peripheral processor module 41 is "batch-oriented". Each of the eight-byte blocks in Appendix J conforms to the data structure of Appendix F and corresponds to a counterpart in the main read/write memory 37.

Referring again to Appendix B, when power is supplied to the main processor 36 in FIG. 5, it executes the INITIALIZATION routine starting at 0000 (hex) to clear the COIN STATION DATA TABLE in the main read/write memory 37. When there is a "0" in the COIN VALUE data block for a particular COIN STATION, the station is seen as "off" by the totalizer 11. When a coin value for a denomination is entered by executing the key sequence in Table 1 discussed earlier, it will result in data being entered in the appropriate COIN VALUE block in the data table. When this block of data is transferred to the COIN STATION DATA TABLE in the peripheral read/write memory 43 and detected by the peripheral processor 42, the coin station is activated from the viewpoint of the totalizer 11.

Referring again to Appendix B the TIMER routine starting at 0300 (hex) is executed when the processor 36 responds to the maskable interrupt signal it receives every eighteen milliseconds. This routine interfaces the hardware signal to other firmware routines to debounce keyboard inputs and to assure a periodic exchange of data between the COIN STATION DATA TABLE on the main processor module 35 and the COIN STATION DATA TABLE on the peripheral processor module 41.

Following the TIMER routine in Appendix B is the KEYBOARD MONITOR routine beginning at address 0340 (hex). The KEYBOARD MONITOR routine utilizes a block of KEYBOARD INPUT DATA stored at addresses 2710-271F (hex) as seen in Appendix D. The organization of this data is seen in more detail in Appendix G, and is similar to the DISPLAY DATA in alternating data received from the keyboard with enable words used to activate the keyboard input and output ports 39, 40. In executing the KEYBOARD MONITOR routine, the main processor 36 transmits enable words stored at addresses 2711 and 2712 (hex). The first enable word (40hex) selects the keyboard output port 39 through output 4 on the fourth decoder 73 in FIG. 8. The second enable word (80 hex) at address 2712 (hex) in Appendix G is a data word that, when loaded into the keyboard output port 39, enables the five columns in the key matrix 24. Next, an input instruction is executed. This instruction uses the word at address 2713 (hex) in Appendix G to enable the input port to read six bits of data from six rows that intersect the columns in the key matrix 24. This "column 1" data is then stored at address 2714 (hex) in Appendix G. The column enable word is changed to enable the other columns through the output port 39, and the next enable word (40 hex) is transmitted to the input port 40, where row data is then read for column 2. By repeating this sequence, keyboard data for the five columns is read into memory at address 2714, 2716, 2718, 271A and 271C (hex) as seen in Appendix G.

The STATUS routine is a key sorting routine in which keyboard input data is analyzed to determine which keys have been operated and in what sequence. When a key sequence corresponding to a user command is entered, the main processor 36, operating under the control of the STATUS routine, will set individual bits in a CONTROL WORD stored at 2708 (hex) in the main read/write memory 37 as represented in Appendix D. The CONTROL WORD contains flag bits that call for execution of KEYBOARD MONITOR routine the DATA COMMUNICATION routine, the ERROR routine, DATA TRANSFER routine, and the DISPLAY routine seen in Appendix B. Depending upon the command that is detected, one or more of these bits is set. As the main processor 36 proceeds through these routines in the order seen in Appendix B, it will either execute or skip the above five routines according to which bits of the control word are set.

For example, when COIN VALUES are entered by pushing the "=" key, the STATUS routine sets the control bit for execution of the DATA COMMUNICATION routine. When this routine is reached and executed, the main processor 36 downloads the new COIN VALUE to the peripheral processor module 41. If the COIN VALUE at a particular coin station is changed from "0" to some fractional denomination such as "0.10", this will be seen by the processor modules 35,41 as activating the coin station.

Referring to FIGS. 5, 6 and 9 the main processor 36 responds to the various commands entered through the keyboard 24 to send single blocks of COIN VALUE data, single blocks of BAG STOP data, ten-word blocks of COIN VALUE data or ten-word blocks of BAG STOP data to the COIN STATION DATA TABLE in the peripheral read/write memory 43. The main processor 36 can also signal the peripheral processor 42 through the programmable two-way communication port 47 to send BAG COUNT data and BATCH VALUE data for updating the COIN STATION DATA TABLE in the main read/write memory 37. From there, the data can be used to drive the liquid crystal display 27 in response to display commands entered through the keyboard 24.

When new COIN VALUES and BAG STOPS are entered through the keyboard, they are moved from the KEYBOARD & STATUS AREA at addresses 2720–274F (hex) in Appendix B to an 8-WORD TEMPORARY STORAGE area at addresses 2700–2707 (hex) through execution of the STATUS routine.

New COIN VALUE data is stored in this area until a command is completed, so that data in the COIN STATION DATA TABLE will not be erased prematurely. The DISPLAY routine is executed as the keys are examined to move new COIN VALUE data to the DISPLAY DATA area so that new COIN VALUE data can be displayed as it is being entered. When the data is entered, which occurs when an "=" key is operated, the STATUS routine sets a bit in the CONTROL WORD to execute the DATA TRANSFER routine seen in Appendix B. The DATA TRANSFER routine is then executed to move the data from the TEMPORARY STORAGE AREA to the COIN STATION DATA TABLE. The STATUS routine monitors the operation of the BAG COUNT key to maintain a pointer to the appropriate block of data in the COIN STATION DATA TABLE.

The DATA TRANSFER routine is a general purpose routine for moving an eight-word block of data from one area of read/write memory to another. The DATA TRANSFER routine is also used to move data such as BATCH VALUES, GRAND VALUES, and BAG COUNTS from the COIN STATION DATA TABLE to the DISPLAY AREA. Since this data is not entered through the keyboard 24, it can be moved directly to the DISPLAY DATA area, rather than through the TEMPORARY STORAGE area.

When power is supplied to the peripheral processor 42 in FIG. 9, it begins executing the instructions in the INITIALIZATION & COIN POLL portion of its firmware. This portion is represented generally in Appendix C and the individual instructions are listed in appendix L. During initialization the processor 42 executes instructions to check for hardware faults in the memories 43,81 and in the coin I/O ports 45,46. It also initilizes its own registers and certain words in the scratchpad area of its associated read/write memory 43. If no hardware faults are detected, the processor enters the COIN POLL portion of its firmware in which data is read from the coin I/O ports 45,46. This is binary-coded data, which must be checked for "debounce" of the coin sensors 21 and then converted to the BCD data used by the data structures of the COIN STATION DATA TABLES.

The processor "debounces" the coin data by reading the coin I/O ports 45,46 at least twice to detect a high-/low transition, before accepting the coin data for further processing. If a coin is detected at one instant, its movement beyond the sensor must also be detected before the coin sensing data is processed further. Otherwise, a coin could linger at a sensor 21 and cause it to be counted twice. The coin station debounce circuits 44 are multivibrator circuits operated in a retriggerable 1-shot mode. When a coin sensing signals is detected at the input of a coin debounce circuit 44, its output will change state for three milliseconds. At the end of this time, the multivibrator "times out" and its output returns to its original state. If a coin lingers at a sensor 21 it will retrigger the debounce circuit for an additional three-millisecond intervals until its departure.

During the COIN POLL sequence, the peripheral processor checks its interrupt inputs I3 and I4 to see if the main processor 36 is signalling for communication. When that occurs, the peripheral processor will jump to a DATA COMMUNICATION routine represented in Appendix C. The individual instructions for this routine are listed in Appendix L.

Assuming that an interrupt signal has not been received by the peripheral processor 42, it will then update the BAG COUNT and the BATCH VALUE data in its COIN STATION DATA TABLE. It also checks the BAG COUNTS against the BAG STOPS, and if a BAG STOP is reached, a bit will be set to cause the main processor 36 to stop the motor that drives the coin sorter 10. The BAG COUNTS for the respective coin stations are updated by adding the number of coin count signals for each station to the respective data blocks in the COIN STATION DATA TABLE. This requires conversion of the BCD data to binary data for the addition, and the conversion of the sum back to BCD data. These operations are performed through execution of an ADD routine represented in Appendix C and listed in Appendix L. BATCH VALUES are also updated using the ADD routine. For each coin, such as a dime, a COIN VALUE of 0.10 which has been stored in the DATA TABLE is added to the BATCH VALUE for each new coin count that has been added to the BAG COUNT total.

There are eight types of information communicated between the main processor 36 and the peripheral processor 42. Two of these are the start motor and stop motor commands. The main processor 36 can also signal the peripheral processor 42 to send BAG COUNTS and BATCH VALUES. The main processor can also signal the peripheral processor that the batch is complete, in which case the peripheral processor 42 will clear the BATCH VALUES and BAG COUNTS from its coin station data table. The main processor 36 can also signal the peripheral processor 42 that it is sending COIN VALUES and BAG STOPS for individual stations, or for all ten stations.

When executing its DATA COMMUNICATION routine the main processor 36 can enter a block transfer mode where eight words of data will be sequentially transmitted or received from the peripheral processor 42. The peripheral processor 42, on the other hand, transfers but a single word each cycle of its DATA COMMUNICATION routine due to the rapid scan rate of the I/O ports 45,46 that is needed to count coins.

Those skilled in the art will appreciate that this is but one example of an embodiment for carrying out the essentials of the invention, and that certain details could be varied without departing from the teaching herein. Therefore, to apprise the public of that which is essential to the invention, the following claims are made.

Appendix A
IC COMPONENTS

| Circuit | Ref. No. | Description |
|---|---|---|
| Main Processor Module | | |
| Main Processor | 36 | CDP1802 microprocessor* |
| Display Oscillator | 58 | CD4047B multivibrator circuit |
| Address and Control Buffers | 61 | Two CD4050B hex noninverting buffers |
| Main Program Memory | 59 | Four 2716 2k x 8-bit programmable read-only memories manufactured by Intel Corp. |
| Main Read/Write Memory | 60 | Four MWS5114 1k x 4-bit static random access memories |
| Bus Separators | 54,55 | Two CDP1856 and two CDP1857 4-bit buffers/bus separators |
| 1st Level Decoder | 70 | CDP1853 3 line-to-8 line decoder |
| General I/O Port | 71 | One CDP1852 8-bit input/output port |
| 2nd Level Decoder Select Circuit | 72 | One CD4028B BCD-to-decimal (4 line-to-10 line) decoder |
| 2nd Level Decoders | 73 | Four CDP1853 3 line-to-8 line decoders |
| Display Drivers | 74 | Eight CD4054B latch/4-segment display drivers and eight CD4056B 4-bit latch/7-segment display drivers |
| Keyboard Input Port and Keyboard Output Port | 39,40 | Two CDP1852 8-bit I/O ports |
| Two-Way Communication Port | 47 | CDP1851 Programmable I/O port |
| "1858" | 63 | CDP1858 4-bit latch/decoder |
| "1866" | 64 | CDP1866 4-bit latch/decoder |
| "1867" | 68 | CDP1867 4-bit latch/decoder |
| Inverters | 67,69 | CD4069B hex inverters |
| NOR gates | 66 | CD4001B quad 2-input NOR gates |
| NAND gates | 65 | Two CD4012B dual 4-input NAND gates |
| OR gates | 75 | Two CD4078B 8-input OR gates and one CD4071B quad 2-input OR gates |
| NAND gates | 105 | CD4011B 2-input NAND gates |
| Peripheral Processor Module | | |
| Periph. Processor | 42 | CDP1802 microprocessor |
| Address and Control Buffers | 79 | Two CD4050B hex non-inverting buffers |
| Periph. Program Memory | 81 | One 2716 2k x 8-bit programmable read-only memory manufactured by Intel Corp. |
| Peripheral Read/Write Memory | 43 | Two MWS 5114 1k x 4-bit static random access memories |
| Bus Separators | 89,94 | Two CDP1856 and two CDP1857 4-bit buffer/bus separators |
| Comm. Input Port and Comm. Output | 48,49 | Two CDP1852 8-bit I/O ports |
| Coin I/O Ports | 45,46 | Two CDP1852 8-bit I/O ports |
| Coin Debounce Circuits | 44 | Ten CD4047B multivibrator circuits |
| "1858" | 86 | CDP1858 4-bit latch/decoder |
| "1866" | 87 | CDP1866 4-bit latch/decode |
| "1867" | 88 | CDP1867 4-bit latch/decoder |
| Inverters | 84, 85, 106, 107 | CD4069B hex inverters |
| NAND gates | 82 | CD4012B dual 4-input NAND gates |
| NOR gate | 83 | CD4001B quad 2-input NOR gate |
| 1st Level Decoder & 2nd Level Decoder | 100, 101 | Two CDP1853 3 line-to-8 line decoders |
| General I/O Port | 102 | CDP1852 8-bit I/O port |
| OR gates | 103, 104 | CD4072B dual 4-input OR gates |

*All circuits available from RCA unless a different manufacturer is specified

Appendix B
MAP OF FIRMWARE FOR MAIN PROCESSOR

| STARTING ADDRESS (HEX) | |
|---|---|
| 0000 | INITIALIZATION |
| 0300 | TIMER |
| 0340 | KEYBOARD MONITOR |
| 0400 | STATUS |
| 1000 | COMPLETE |
| 10A0 | ADD |
| 1170 | DATA COMMUNICATION |
| 1350 | ERROR |
| 13D0 | DATA TRANSFER |
| 1540 | DISPLAY |

Appendix C
MAP OF FIRMWARE FOR PERIPHERAL PROCESSOR

| STARTING ADDRESS (HEX) | |
|---|---|
| 0000 | INITIALIZATION & COIN POLL |
| 0400 | ADD |
| 0600 | DATA COMMUNICATION |

Appendix D
MAP OF READ/WRITE MEMORY ASSOCIATED WITH MAIN PROCESSOR

| ADDRESS (HEX) | |
|---|---|
| 2000 | COIN STATION DATA TABLE |
| 21CF | |
| 21D0 | COIN STATION DATA TABLE (FOR PRINTER OR COMPUTER ACCESS) |
| 239F | |

Appendix D

| Address | Content |
|---|---|
| 2700 – 2707 | 8-WORD TEMPORARY STORAGE (DATA TRANSFER ROUTINE) |
| 2708 – 270A | CONTROL WORD (STATUS ROUTINE) |
| 270B – 270F | POINTERS & COUNTER (DATA TRANSFER ROUTINE) |
| 2710 – 271F | KEYBOARD INPUT DATA (KEYBOARD MONITOR ROUTINE) |
| 2720 – 274F | KEYBOARD & STATUS DATA (STATUS ROUTINE) |
| 27F0 – 27FF | DISPLAY DATA (DISPLAY ROUTINE) |

Appendix E
MAP OF COIN STATION DATA TABLE ASSOCIATED WITH MAIN PROCESSOR

| ADDRESS (HEX) | Content |
|---|---|
| 2000 – 2007 | STATION 1 COIN VALUE (8 BYTES) |
| . . . | . . . |
| 2048 – 204F | STATION 10 COIN VALUE (8 BYTES) |
| 2050 – 2057 | STATION 1 BAG STOP (8 BYTES) |
| . . . | . . . |
| 2098 – 209F | STATION 10 BAG STOP (8 BYTES) |
| 20A0 – 20A7 | STATION 1 BATCH VALUE (8 BYTES) |
| . . . | . . . |
| 20E8 – 20EF | STATION 10 BATCH VALUE (8 BYTES) |
| 20F0 – 20F7  M+ | MEMORY VALUE (8 BYTES) |
| 20F8 – 20FF  T | BATCH TOTAL VALUE (8 BYTES) |
| 2100 – 2107  SUB T | SUBTOTAL VALUE (8 BYTES) |
| 2108 – 210F | STATION 1 GRAND VALUE (8 BYTES) |
| . . . | . . . |
| 2150 – 2157 | STATION 10 GRAND VALUE (8 BYTES) |
| 2158 – 215F  M+ | MEMORY VALUE (8 BYTES) |
| 2160 – 2167  T | GRAND TOTAL VALUE (8 BYTES) |
| 2168 – 216F | STATION 1 BAG COUNT (8 BYTES) |
| . . . | . . . |
| 21B0 – 21B7 | STATION 10 BAG COUNT (8 BYTES) |
| 21B8 – 21BF | BATCH I.D. |
| 21C0 – 21C7 | SUB T I.D. |
| 21C8 – 21CF | GRAND I.D. |

Appendix F
COIN STATION DATA TABLE
EIGHT-WORD BLOCK OF DATA

| BIT | 0 | 1 | 2 | 3 | 4 | 5 | 6 | 7 |
|---|---|---|---|---|---|---|---|---|
| WORD 0 | M+ CURSOR | T CURSOR | | KEYPAD CURSOR | PROGRAM CURSOR | # | — | E |
| WORD 1 | C.S. 8 CURSOR | C.S. 7 CURSOR | C.S. 6 CURSOR | C.S. 5 CURSOR | C.S. 4 CURSOR | C.S. 3 CURSOR | C.S. 2 CURSOR | C.S. 1 CURSOR |
| WORD 2 | 5TH DIGIT COMMA | 5TH DIGIT DEC. PT | GRAND - T CURSOR | SUB-T CURSOR | BATCH CURSOR | | C.S. 10 CURSOR | C.S. 9 CURSOR |
| WORD 3 | 1ST DIGIT COMMA | 1ST DIGIT DEC. PT. | 2ND DIGIT COMMA | 2ND DIGIT DEC. PT. | 3RD DIGIT COMMA | 3RD DIGIT DEC. PT. | 4TH DIGIT COMMA | 4TH DIGIT DEC. PT. |
| WORD 4 | | 2ND DISPLAY DIGIT (BCD) | | | | 1ST DISPLAY DIGIT (BCD) | | |
| WORD 5 | | 4TH DISPLAY DIGIT (BCD) | | | | 3RD DISPLAY DIGIT (BCD) | | |
| WORD 6 | | 6TH DISPLAY DIGIT (BCD) | | | | 5TH DISPLAY DIGIT (BCD) | | |
| WORD 7 | | 8TH DISPLAY DIGIT | | | | 7TH DISPLAY DIGIT | | |

-continued

Appendix F

COIN STATION DATA TABLE
EIGHT-WORD BLOCK OF DATA

| BIT | 0 | 1 | 2 | 3 | 4 | 5 | 6 | 7 |
|---|---|---|---|---|---|---|---|---|
| | (BCD) | | | | (BCD) | | | |

Appendix G
MAP OF KEYBOARD INPUT DATA
(KEYBOARD MONITOR ROUTINE)

| ADDRESS (HEX) | |
|---|---|
| 2710 | LOOP COUNTER PRESET |
| 2711 | 40 (HEX) ENABLE - KEYBOARD OUTPUT PORT |
| 2712 | 80 (HEX) KYBD. COL. OUTPUT PORT |
| 2713 | 40 (HEX) ENABLE - KYBD. COL. 1 INPUT |
| 2714 | DATA FROM KYBD. COL. 1 |
| 2715 | 40 (HEX) ENABLE - KYBD. COL. 2 INPUT |
| 2716 | DATA FROM KYBD. COL. 2 |
| 2717 | 40 (HEX) ENABLE - KYBD. COL. 3 INPUT |
| 2718 | DATA FROM KYBD. COL. 3 |
| 2719 | 40 (HEX) ENABLE - KYBD. COL. 4 INPUT |
| 271A | DATA FROM KYBD. COL. 4 |
| 271B | 40 (HEX) ENABLE - KYBD. COL. 5 INPUT |
| 271C | DATA FROM KYBD. COL. 5 |
| 271D | NO. KEYS PUSHED |
| 271E | LOOP COUNTER |
| 271F | |

Appendix G
MAP OF DISPLAY DATA
(DISPLAY ROUTINE)

| ADDRESS (HEX) | |
|---|---|
| 27F0 | 30 (HEX) ENABLE WORD FOR PORT |
| 27F1 | DATA FOR DISPLAY SYMBOLS |
| 27F2 | 30 (HEX) ENABLE WORD FOR PORT |
| 27F3 | DATA FOR C.S. 1-C.S. 8 CURSORS |
| 27F4 | 40 (HEX) ENABLE WORD FOR PORT |
| 27F5 | DATA FOR OTHER CURSORS |
| 27F6 | 30 (HEX) ENABLE WORD FOR PORT |
| 27F7 | DATA FOR COMMA/DEC. PT. |
| 27F8 | 10 (HEX) ENABLE WORD FOR PORT |
| 27F9 | DATA FOR 1ST & 2ND DISPLAY DIGITS |
| 27FA | 10 (HEX) ENABLE WORD FOR PORT |
| 27FB | DATA FOR 3RD & 4TH DISPLAY DIGITS |
| 27FC | 10 (HEX) ENABLE WORD FOR PORT |
| 27FD | DATA FOR 5TH & 6TH DISPLAY DIGITS |
| 27FE | 20 (HEX) ENABLE WORD FOR PORT |
| 27FF | DATA FOR 7TH & 8TH DISPLAY DIGITS |

Appendix I
MAP OF READ/WRITE MEMORY
ASSOCIATED WITH PERIPHERAL PROCESSOR

| ADDRESS (HEX) | |
|---|---|
| 1000 | COIN STATION DATA TABLE |
| 1350 | |
| 13FF | SCRATCHPAD AREA |

Appendix J
MAP OF COIN STATION DATA TABLE
ASSOCIATED WITH PHERIPHERAL MAIN PROCESSOR

| ADDRESS (HEX) | |
|---|---|
| 1000–1007 | STATION 1 BATCH VALUE (8 BYTES) |
| ⋮ | ⋮ |
| 1048–104F | STATION 10 BATCH VALUE (8 BYTES) |
| 1050–1057 | M+ MEMORY VALUE (8 BYTES) |
| 1058–105F | T BATCH TOTAL VALUE (8 BYTES) |
| 1100–1107 | STATION 1 COIN VALUE (8 BYTES) |
| ⋮ | ⋮ |
| 1148–114F | STATION 10 COIN VALUE (8 BYTES) |
| 1200–1207 | STATION 1 BAG STOP (8 BYTES) |
| ⋮ | ⋮ |
| 1248–124F | STATION 10 BAG STOP (8 BYTES) |
| 1300–1307 | STATION 1 BAG COUNT (8 BYTES) |
| ⋮ | ⋮ |
| 1348–134F | STATION 10 BAG COUNT (8 BYTES) |

Appendix K
FIRMWARE LISTINGS - MAIN PROGRAM MEMORY
©1984 Brandt, Inc.

```
;
;
;
;
;
;                 SECTION     SEC1
;
;
;
;
;
;                 1ST SECTION    INITIALIZATION
;
;
;
;                 MARCH 28, 1984         INIT
;
;
;
;
PC         EQU      R0
           GLOBAL   TIMER
           GLOBAL   ERR
;
           ORG      000H          ;BEGIN PROGRAM AT 0
           LDI      20H
           PHI      R2
           LDI      00H
           PLO      R2            ;R2 = 200H = INITIAL PORT READ STORAGE
           SEX      PC            ;SET PIO TO PORT A = OUTPUT B = INPUT
           OUT      1,08H         ;SET UP CODE
           OUT      2,4BH         ;SET A OUTPUT B INPUT
           SEX      R2
           INP      6             ;DUMMY READ TO SET UP EF4 FLAG
           LDI      00H
           PHI      R1            ;START AT BEGINNING OF ROM
           PLO      R1
           STR      R2            ;SET R2 = 00 = INITIAL CHECK SUM
           SEX      R1
READD      LDN      R2            ;GET CHECK SUM
           ADD                    ;ADD R1 ADDRESS TO CHECK SUM
           STR      R2            ;SAVE NEW SUM
           INC      R1
           GHI      R1            ;CHECK IF DONE ADDING TO 800H
           XRI      18H
           BNZ      READD         ;NO, GO BACK FOR BYTES TO 7FFH
           LDN      R2            ;GET CHECK SUM TOTAL
           BZ       STRTPASS      ;NO ROM ERROR, CHECK RAM
           LDI      04H
           PLO      RF            ;SAVE ERROR CODE IN RF LO
STRTPASS   LDI      20H
           PHI      R1
           LDI      01H
           PLO      R1            ;R1 = 2001H = START OF RAM CHECK
           STR      R2            ;R2 = 2000H = 01H FOR RAM TEST CODE
           PLO      R4            ;SAVE INITIAL VALUE IN R4 LO
GETDTA     LDN      R2
           STR      R1
           INC      R1            ;POINT TO NEXT RAM ADDRESS
           SHL                    ;CHANGE CODE FOR NEXT RAM ADDRESS
           BNZ      STR4          ;SHIFTED 8 TIMES? NO
           LDI      01H           ;YES, RELOAD RAM TEST CODE
STR4       STR      R2            ;SAVE NEW CODE
           GHI      R1            ;TEST IF DONE TESTING W 1ST CODE
           XRI      28H           ;TESTED TO 27FFH?
           BNZ      GETDTA        ;NO
TESTDTA    LDI      20H
           PHI      R1
           LDI      01H
           PLO      R1            ;SET R1 = 2001H = START OF RAM READ
           GLO      R4            ;GET TEST CODE
           STR      R2            ;SAVE 01H IN R2 FOR RAM TEST CODE
           SEX      R1
```

```
NEXTRD    LDN     R2
          XOR             ;COMPARE READ BACK DATA
          BZ      RAMOK   ;RAM OK GO ON
          GLO     RF
          ORI     08H
          PLO     RF      ;SAVE RAM ERROR IN RF LO
RAMOK     INC     R1
          LDN     R2
          SHL             ;CHANGE TEST CODE FOR NEXT RAM BYTE
          BNZ     SVDATA
          LDI     01H     ;DONE 8 BYTES, RESET TEST CODE
SVDATA    STR     R2
DATAOK    GHI     R1
          XRI     28H     ;TESTED TO 27FFH?
          BNZ     NEXTRD  ;NO
          GLO     R4      ;GET OLD TEST CODE
          SHL             ;SET TEST CODE TO NEXT VALUE
          PLO     R4      ;SAVE NEW CODE
          STR     R2
          LDI     20H
          PHI     R1      ;ZERO RAM FROM 2000H
          LDI     01H
          PLO     R1      ;START AT 2001H
          LDN     R2      ;GET BIT TEST CODE
          BNZ     GETDTA  ;NOT DONE 8 TIMES
          LDI     00H
          STR     R2      ;R2 = 2000H = 00H FOR CLEAR
ZEROFL    LDN     R2
          STR     R1      ;STORE 00 IN R1 ADDRESS
          INC     R1
          GHI     R1
          XRI     28H     ;TESTED TO 27FFH?
          BNZ     ZEROFL  ;NO
FILLFF    LDI     05H
          PLO     R3
          PLO     R1
          LDI     20H
          PHI     R1      ;R1 = 2005H = START OF DATA TO GET OFFH
          LDI     27H
          PHI     R3      ;R3 = 2705H = OFFH = DATA TO STORE
          LDI     03H
          PLO     R2      ;R2 = 3 DATA BYTES TO GET OFFH
          LDI     0FFH
          STR     R3      ;SAVE OFFH FOR DATA TO BE LOADED INTO RAM
RESTORE   LDN     R3      ;GET OFFH TO STORE
          STR     R1      ;STORE IN RAM ADDRESS
          INC     R1
          DEC     R2      ;DONE 3 BYTES?
          GLO     R2
          BNZ     RESTORE ;NO, GO BACK FOR NEXT BYTE
          LDI     03H     ;REST LOOP CTR
          PLO     R2
          GLO     R1      ;RAM ADDRESS
          XRI     0D0H    ;CHECK IF DONE W/RAM
          BZ      CHKHI   ;YES, CHECK IF HI ADDRESS = 21H
AD5       GLO     R1
          ADI     05H     ;ADD TO RAM ADDRESS FOR NEXT ADDRESS
          PLO     R1
          XRI     00H     ;END OF 2000H ADDRESSES
          BNZ     RESTORE ;NO
          LDI     21H
          PHI     R1
          BR      RESTORE ;GO ON W/2100H RAM ADDRESSES
CHKHI     GHI     R1
          XRI     21H     ;RAM ADDRESS 2100H
          BNZ     AD5     ;NO GO TO NEXT 2000H ADDRESS
          LDI     00H
          STR     R3      ;RESET RAM AT R3
          LDI     27H
          PHI     R3      ;SET R3 = 2701H = 01 = STATION CODE
          LDI     20H
          PHI     R1
          LDI     01H
          PLO     R1      ;SET R1 = 2001H = SET ADDRESS FOR STATION NO.
```

```
                PLO     R3
                STR     R3              ;SET R3 = 01 FOR STATION NO.
STATNO          LDN     R3
                STR     R1              ;SET 1ST COIN = 1ST CURSOR
                SHL                     ;MOVE CURSOR NO. TO NEXT STATION
                STR     R3              ;SAVE NEW CURSOR NO.
                GLO     R1              ;CHECK ADDRESS
                ADI     08H             ;GO TO NEXT RAM ADDRESS
                PLO     R1
                LDN     R3              ;TEST IF DONE W/8 COINS
                BZ      LAST2           ;YES, DO COIN 9, 10
                BR      STATNO          ;GO BACK FOR NEXT COIN
LAST2           LDI     01H
                STR     R3              ;RESET CURSOR NO.
                INC     R1
                STR     R1              ;SET CURSOR NO 9
                SHL
                STR     R3
                GLO     R1
                ADI     08H             ;GO TO 10TH COIN
                PLO     R1
                LDN     R3              ;GET CURSOR CODE FOR 10TH COIN STATION
                STR     R1
                GLO     R1              ;GO  BACK TO NEXT COIN
                ADI     07H
                PLO     R1              ;SET ADDRESS FOR NEXT COIN
                LDI     01H             ;SET CURSOR CODE
                STR     R3
                GLO     R1
                XRI     59H             ;END OF GRAND TOTAL?
                BNZ     CKZOUT          ;NO
                LDI     69H
                PLO     R1              ;SET R1 = 2169H = PRTL COUNTS
                BR      STATNO
CKZOUT          GLO     R1
                XRI     0F1H            ;END OF BATCH COINS?
                BZ      ZOUT            ;YES
                GLO     R1
                XRI     0B9H            ;END OF ALL COINS?
                BZ      ALLDN           ;YES, CHECK IF DONE
                BR      STATNO
ZOUT            LDI     21H
                PHI     R1              ;SET R1 = 2100S
                LDI     09H             ;SET INITIAL ADDRESS OF 2100S
                PLO     R1
                LDI     01H             ;SET CURSOR CODE
                STR     R3
                BR      STATNO          ;GO BACK FOR 2100S COINS
ALLDN           GHI     R1
                XRI     20H             ;20S?
                BZ      STATNO          ;YES
                LDI     20H
                PHI     R1
                LDI     0F0H
                PLO     R1              ;SET R1 = 20F0H= M+
                LDI     80H
                STR     R1              ;SET M+ CURSOR
                INC     R1
                INC     R1
                LDI     08H
                STR     R1              ;SET BATCH CURSOR FOR M+
                LDI     0F8H
                PLO     R1
                LDI     40H             ;SET CODE FOR "T"
                STR     R1
                INC     R1
                INC     R1
                LDI     08H
                STR     R1              ;SET BATCH TOTAL FOR "T" AND "BATCH"
                LDI     21H
                PHI     R1
                GLO     R1
                ADI     08H             ;SET UP ADDRESS FOR SUB TOTAL
                PLO     R1
```

```
            LDI     10H         ;SET "SUB"
            STR     R1
            DEC     R1
            DEC     R1
            LDI     40H         ;SET "T"
            STR     R1          ;R1 = "SUB" AND "T"
            GLO     R1
            ADI     60H
            PLO     R1          ;SET R1 = GRAND TOTAL
            LDI     40H
            STR     R1          ;SET "T" CURSOR
            INC     R1
            INC     R1
            LDI     20H
            STR     R1          ;SET "GRAND" CURSOR
            LDI     58H
            PLO     R1
            LDI     80H         ;SET M+ CURSOR
            STR     R1
            INC     R1
            INC     R1
            LDI     20H         ;SET GRAND CURSOR
            STR     R1
            LDI     0AH         ;INITIAL ADDRESS OF GRAND COIN TOTALS
            PLO     R1
STGND       LDI     20H         ;SET CURSOR FOR GRAND COIN
            STR     R1
            GLO     R1
            ADI     08H         ;GO TO NEXT COIN
            PLO     R1
            XRI     4AH         ;DONE W/GRAND COIN (8 COINS)
            BNZ     STGND       ;NO
            LDN     R1
            ORI     20H
            STR     R1          ;SET GRAND AND COIN 9
            GLO     R1
            ADI     08H         ;GO TO COIN 10
            PLO     R1
            LDN     R1
            ORI     20H
            STR     R1          ;SET GRAND AND COIN 10
            LDI     06AH
            PLO     R1
STPRTL      LDI     04H         ;SET CURSOR FOR PARTIAL ALSO FOR THESE COINS
            STR     R1
            GLO     R1
            ADI     08H         ;GO TO NEXT COIN ADDRESS
            PLO     R1
            XRI     0AAH        ;DONE?
            BNZ     STPRTL      ;NO
            LDN     R1
            ORI     04H         ;SET PARTIAL CURSOR
            STR     R1
            GLO     R1
            ADI     08H         ;GO TO COIN 10
            PLO     R1
            LDN     R1
            ORI     04H         ;PARTIAL AND COIN 10 CURSORS
            STR     R1
            LDI     20H
            PHI     R1
            LDI     0A2H
            PLO     R1          ;SET R1 = BATCH COIN ADDRESSES
STBTCH      LDI     08H         ;SET CURSOR FOR BATCH ALSO
            STR     R1
            GLO     R1
            ADI     08H         ;NEXT BATCH COIN ADDRESS
            PLO     R1
            XRI     0E2H        ;DONE W/BATCH COIN?
            BNZ     STBTCH      ;NO
            LDN     R1
            ORI     08H         ;SET BATCH AND COIN 9
            STR     R1
            GLO     R1
```

```
                ADI     08H         ;GO TO COIN 10
                PLO     R1
                LDN     R1
                ORI     08H         ;SET BATCH AND COIN 10
                STR     R1
                LDI     00H         ;RESET RAM AT R3
                STR     R3
                LDI     3CH
                PLO     R1
                LDI     27H
                PHI     R1          ;SET R1 = 273C = STATION 1-8 ACTIVE?
                PHI     R2
                LDI     0FFH
                STR     R1          ;YES, INITIAL 1-8 ARE ACTIVE
                INC     R1
                LDI     0FH
                STR     R1          ;YES, 9, 10 ARE ALSO ACTIVE
                LDI     30H
                PLO     R1
                LDI     02H         ;SET BATCH DISPLAY MODE
                STR     R1
                LDI     47H
                PLO     R2          ;SET R2 = 2747H = ERROR CODE REG
                SEX     PC
                OUT     1,40H       ;SET UP CODE
                SEX     R2
                INP     4           ;READ DEVICE PORT
                PLO     R4          ;SAVE PORT INFO
                XRI     03H         ;BATCH DISPLAY INSTALLED?
                BZ      BCHTOT      ;YES
                GLO     R4          ;GET PORT INFO
                XRI     01H         ;BAG COUNT DISPLAY?
                BZ      BAGDSP      ;YES
                GLO     R4
                XRI     02H         ;PRINTER?
                BNZ     NEXT1       ;NO, GO
                LDI     80H         ;SET CODE FOR PRINTER
                STR     R2
                BR      NEXT1
BCHTOT          LDI     0C0H
                STR     R2
                BR      NEXT1
BAGDSP          LDI     40H
                STR     R2
NEXT1           LDI     27H
                PHI     RB
                LDI     4EH
                PLO     RB          ;SET RB = 274EH = ERROR REG
                GLO     RF          ;GET ERROR FROM MASTER ROM/RAM
                STR     RB          ;SAVE IN 274EH
NXTPASS         B4      NXTPASS     ;CHECK IF SLAVE SENT ANYTHING
RDPRT           LDI     27H
                PHI     R4
                LDI     91H
                PLO     R4
                SEX     PC
                OUT     1,08H       ;ENABLE PORT
                SEX     R4
                INP     6           ;READ SLAVE INPUT
                XRI     0B3H        ;NO ERRORS?
                LBZ     SLAVOK      ;NO ERRORS
                LDN     R4
                XRI     0B0H        ;ROM MEMORY ERROR?
                LBZ     SLVMEM      ;YES
                LDN     R4
                XRI     0B1H        ;SLAVE RAM ERROR
                LBZ     SLVRAM      ;YES
                LDN     R4
                XRI     0B2H        ;INPUT COIN ERROR?
                BNZ     NXTPASS     ;NO, CHECK FOR NO ERRORS
                LDN     RB
                ORI     20H         ;INPUT ERROR CODE
                STR     RB          ;SAVE ALL ERROR CODES IN 274E
                XRI     20H         ;ANY OTHER
```

```
            LBR      SLAVOK
SLVMEM      LDN      RB
            ORI      01H             ;ADD SLAVE ROM ERROR CODE
            STR      RB              ;ERROR CODE ROM ERROR
            LBR      NXTPASS
SLVRAM      LDN      RB
            ORI      02H             ;ADD SLAVE RAM ERROR CODE
            STR      RB
            LBR      NXTPASS
IOERR       LDN      RB
            ORI      10H             ;ADD MASTER I/O ERROR CODE
            STR      RB
SLAVOK      LDI      27H
            PHI      RF
            LDI      0D9H
            PLO      RF              ;SET RF = 270D9H = INPUT STORAGE
            LDI      47H
            PLO      R4
            LDI      27H
            PHI      R4              ;SET R4 = 2747H = MASTER ERROR WORD
            SEX      PC
            OUT      1,30H           ;READ PORT FOR ERROR CODE
            SEX      RF
            INP      7
            SHL                      ;TEST CODE
            STR      RF              ;SAVE SHIFTED INFO
            BDF      FULLBAG
CKBAT       LDN      RF              ;GET PORT INFO
            SHL
            SHL                      ;TEST NEXT CODE
            STR      RF              ;SAVE DATA
            LBNF     BATDEAD
CKPT        LDN      RF
            SHL
            LBNF     SYSOK           ;0 = DEC PT FOR DISPLAY
            LDN      R4
            ORI      08H             ;SET COMMA AND MOTOR
            STR      R4              ;SET CODE FOR COMMA AND MOTOR OFF
            LBR      SYSOK           ;GO ON
FULLBAG     LDN      R4              ;BAG FULL ERROR
            ORI      01H             ;SET FULL BAG CODE
            STR      R4
            LDN      RB
            ORI      80H
            STR      RB
            BR       CKBAT
BATDEAD     LDN      R4
            ANI      0FBH            ;SET BATTERY DEAD CODE
            STR      R4              ;BATTERY DEAD
            LDN      RB
            ORI      40H
            STR      RB
            BR       CKPT
SYSOK       LDI      27H
            PHI      R4
            LDI      40H
            PLO      R4
            LDI      20H
            STR      R4              ;R4 = 20 = BATCH TOTAL DISPLAY ADDRESS
            INC      R4
            LDI      0F8H            ;20F8H = BATCH TOTAL ADDRESS
            STR      R4
            LDI      50H
            PLO      R4              ;R4 = 2750H = READ ADDRESS DATA XFR
            LDI      0F8H            ;BATCH TOTAL
            STR      R4
            INC      R4
            LDI      20H
            STR      R4              ;HI ADDRESS OF BATCH TOTAL READ ADDRESS
            LDI      58H
            PLO      R4              ;R4 = WRITE ADDRESS FOR DATA XFR
            LDI      0F1H
            STR      R4              ;LO ADDRESS OF DISPLAY ADDRESS
            INC      R4
```

```
LDI     27H
STR     R4          ;HI  ADDRESS OF DISP ADDDRESS
LDI     60H
PLO     R4          ;R4 = 2760H = NO OF WORDS TO XFR
LDI     08H
STR     R4          ;8 WORDS TO XFR
LDI     0AH
PLO     R4          ;R4 = 270AH = CONTROL WORD FOR TYPE OF XFR
LDI     01H
STR     R4          ;ALTERNATE XFR
LDI     08H
PLO     R4          ;R4 = 2708H = PROGRAM CONTROL WORD
LDI     0DH         ;SET DATA XFR, DISPLAY, AND KEYSCAN BITS
STR     R4
SEX     R4
LDI     0D7H        ;ADDRESS DISPLAY ERROR LOCATIONS
PLO     R4
LDI     0FFH
STXD
STXD
STXD
LDI     00H         ;SET NUMERIC DATA = 00 FF FF FF
STXD
STXD
STXD
STXD                ;ALSO SET CURSOR AND D.P. = 00
LDI     01H
STXD                ;SET ERROR CURSOR
LDI     0FEH        ;ADDRESS DISPLAY WORDS
PLO     R4
LDI     20H
STXD
DEC     R4
LDI     10H
STXD
DEC     R4
STXD
DEC     R4
STXD                ;SET UP DISPLAY CODE TO
DEC     R4
LDI     30H         ;30 30 40 30 10 10 10 20
STXD
DEC     R4
LDI     40H
STXD
DEC     R4
LDI     30H
STXD
DEC     R4
STXD
SEX     R4
LDI     29H
PLO     R4
LDI     0FCH
STXD
LDI     00H
STXD
STXD
LDI     04H
STXD
LDI     0CH
STR     R4
LDI     61H
PLO     R4
LDI     00H
STR     R4
LDI     0E7H
PLO     R4
LDI     0FFH
STXD
STXD
STXD
STXD
```

```
              LDI     00H
              STXD
              STXD
              STXD
              LDI     08H
              STR     R4
              LDN     RB              ;GET ERROR REG
              BZ      EXOUT           ;NO ERRORS THEN EXIT ROUTINE
              LDI     27H
              PHI     R4
              LDI     08H
              PLO     R4
              LDI     10H
              STR     R4              ;SET 2708 = ERROR ENABLE
              LDI     0D8H
              PLO     R4              ;SET R4 = 27D8H = POINTER FOR ERROR CHECKING
              LDI     01H             ;INITIALIZE POINTER
              STR     R4
              LBR     ERR             ;GO TO ERROR ROUTINE
EXOUT         LBR     TIMER           ;GO TO NEXT ROUTINE
              END
                      SECTION  SEC2
;
;
;
;                     SOFTWARE TIMER    4 LOCATIONS
;
;                     MARCH 21, 1984         TIMER
;
;                     RE = TEMPORARY POINTER = 276CH - 276EH
;                     RF = ADDRESSES OF 4 SOFTWARE TIMERS = 2768H - 276BH
;                          276CH = NEW OSCILLATOR DATA, 276DH = OLD OSC DATA
;                          276EH = CHANGED DATA FROM HI/LO OR VICE VERSA
;
              GLOBAL  KEYSCAN
              ORG     300H            ;PROGRAM LOCATED AT 300H
TIMER         LDI     6CH
              PLO     RE
              LDI     27H
              PHI     RE              ;SET RE = 276CH = NEW DATA
              PHI     RF              ;SET RF HI = 27H FOR TIMER ADDRESSES
              LDI     01H             ;SET CODE FOR OSC ON
              B3      XTION           ;FLAG SET = OSC ON
              LDI     00H             ;SET CODE FOR OSC OFF
XTION         STR     RE              ;SAVE CODE FOR ON/OFF
              INC     RE
              SEX     RE              ;GET OLD DATA
              XOR                     ;XOR NEW W/OLD DATA FOR CHANGES
              INC     RE
              STR     RE              ;SAVE CHANGED BITS AT 276EH
              DEC     RE
              DEC     RE              ;ADDRESS NEW DATA
              LDN     RE              ;GET NEW DATA
              INC     RE              ;ADDRESS OLD DATA
              STR     RE              ;SAVE NEW DATA AS OLD DATA FOR NEXT PASS
              XRI     0FFH            ;COMPLEMENT NEW DATA
              INC     RE              ;GET CHANGED BIT
              AND                     ;AND CHANGE W/NEW FOR HI/LO TRANSITION
              BZ      NOTIME          ;NO HI/LO DO NOT ALTER TIMER
              LDI     68H             ;ADDRESS 1ST TIMER
              PLO     RF
XBR           LDN     RF              ;GET OLD TIMER DATA
              BZ      NOCOUNT         ;ALREADY ZERO BYPASS THIS TIMER
              ADI     0FFH            ;DECREMENT BY ONE COUNT
              STR     RF              ;SAVE NEW TIMER COUNT
NOCOUNT       INC     RF              ;ADDRESS NEXT TIMER
              GLO     RF
              XRI     6CH             ;DONE ALL 4 TIMERS
              BNZ     XBR             ;NO, GO BACK FOR NEXT TIMER
NOTIME        LBR     KEYSCAN         ;GO TO NEXT SUB-ROUTINE
              END

;
                                      ;2708=CONTROL WORD TO ENABLE/DISABLE SUBR.
                                      ;2710=TEMP. STORAGE FOR LOOP COUNTER.
```

```
                                              ;2711=OUTPUT PORT ENABLE DATA WORD.
                                              ;2712=KYBD COLUMN ENABLE WORD.
                                              ;2713=INPUT PORT ENABLE DATA WORD.
                                              ;2714=TEMP. STORAGE FOR COLUMN 1 INPUT.
                                              ;2715=INPUT PORT ENABLE DATA WORD.
                                              ;2716=TEMP. STORAGE FOR COLUMN 2 INPUT.
                                              ;2717=INPUT PORT ENABLE DATA WORD.
                                              ;2718=TEMP. STORAGE FOR COLUMN 3 INPUT.
                                              ;2719=INPUT PORT ENABLE DATA WORD.
                                              ;271A=TEMP. STORAGE FOR COLUMN 4 INPUT.
3RD SECTION - KEYBOARD MONITOR                ;271B=INPUT PORT ENABLE DATA WORD.
                                              ;271C=TEMP. STORAGE FOR COLUMN 5 INPUT.
                                              ;
                                              ;
                                              ;VERSION 1.
                                              ;
;         KEYSCAN          MARCH 24, 1984
;
;
;
          GLOBAL    STATUS
          ORG       340H            ;PROGRAM LOCATED AT 340H
          LDI       27H             ;LOAD 27 INTO REG. D.
          PHI       R1              ;PUT 27 IN HIGH ADDR. OF R1.
          PHI       R2              ;PUT 27 IN HIGH ADDR. OF R2.
          LDI       08H             ;LOAD 08 INTO REG. D.
          PLO       R1              ;PUT 08 IN LOW ADDR. OF R1
          SEX       R1
          LDI       08H
          AND                       ;TEST IF KEYSCAN ENABLED
          BZ        EX97            ;EXIT TO END OF SUBR.
          LDI       10H             ;LOAD 10 INTO REG. D.
          PLO       R1              ;PUT 10 IN LOW ADDR. OF R1.
          LDI       05H             ;LOAD 05 INTO REG. D.
          STR       R1              ;STORE 05 INTO MEM. LOC. 2710.
          LDI       11H             ;LOAD 11 IN TO REG. D.
          PLO       R1              ;PUT 11 INTO LOW ADDR. OF R1(OUTPUT).
          LDI       13H             ;LOAD 13 INTO REG. D.
          PLO       R2              ;PUT 13 INTO LOW ADDR. OF R2(INPUT).
          LDI       40H             ;LOAD 40 INTO REG. D.
          STR       R1              ;STORE D(40) INTO R1(2711).
          INC       R1              ;INCREMENT 2711 TO 2712.
          LDI       80H             ;LOAD 80(HEX) INTO REG. D.
          STR       R1              ;STORE 80(HEX) INTO 2712.
          DEC       R1              ;DECREMENT R1 TO 2711.
          DEC       R1              ;DECREMENT R1 TO 2710.
LOOP27    LDN       R1              ;LOAD CONTENTS OF R1(2710) INTO REG. D.
          BZ        EX96            ;EXIT TO END OF SUBR IF D = 0
          INC       R1              ;INCREMENT R1 TO 2711.
          OUT       1               ;OUTPUT 2711 TO DATA BUS, INC. TO 2712.
          OUT       4               ;OUTPUT 2712 TO DATA BUS, INC. TO 2713.
          LDI       40H             ;LOAD 40 INTO REG. D.
          STR       R2              ;STORE 40 INTO R2.
          SEX       R2              ;SET X=N=2.
          OUT       1               ;OUTPUT R2(40) TO DATA BUS, INC. R2.
          INP       4               ;INPUT KEYBOARD DATA INTO REG. D.
          ANI       0FCH            ;MASK OF BITS 0,1 OF KEY INPUT PORT
          STR       R2              ;STORE D INTO R2.
          INC       R2              ;INCREMENT R2.
          DEC       R1              ;DECREMENT R1 TO 2712.
          LDN       R1              ;LOAD R1(2712) INTO REG. D.
          SHR                       ;SHIFT D TO RIGHT 1 BIT POSITION.
          STR       R1              ;STORE R1 INTO 2712.
          DEC       R1              ;DECREMENT R1 TO 2711.
          DEC       R1              ;DECREMENT R1 TO 2710.
          SEX       R1              ;SET X=N=1.
          LDI       01H             ;LOAD 01 INTO REG. D.
          SD                        ;SUBTRACT D(01) FROM 2710 CONTENTS.
          STR       R1              ;STORE RESULT INTO 2710.
          BR        LOOP27          ;BRANCH TO BEGINNING OF LOOP27.
EX96      LDI       08H
          PLO       R1
          LDN       R1              ;GET PROGRAM WORD
```

```
            ANI     0F7H        ;RESET KEYSCAN ENABLE BIT
            STR     R1          ;SAVE OTHER PROGRAM WORD CONTENTS
EX97        LBR     STATUS      ;GO TO NEXT ROUTINE (STATUS)
            END                 ;END OF SUBR.
                        4TH SECTION - STATUS

GLOBAL  ERR
            ORG     400H        ;PROGRAM LOCATED AT 400H
            LDI     27H         ;INITIAL R1,2,3,4,5,6,7
            PHI     R1
            PHI     R2
            PHI     R3
            PHI     R4
            PHI     R5
            PHI     R6
            PHI     R7
            LDI     6BH
            PLO     R2
            LDI     20H
            PLO     R4
            LDN     R2
            LBNZ    EX13
            LDI     1DH
            PLO     R1
            LDI     1EH
            PLO     R2
            LDI     00H
            STR     R1
            LDI     05H
            STR     R2
            LDI     14H
            PLO     R3
            LDI     4AH
            PLO     R7
LOOP10      LDN     R2          ;EXAM. 5 KEYBRD INPUT WRDS
            BZ      EX10
            LDN     R3
            STR     R4
            BNZ     EX11
            INC     R3
            INC     R3
            INC     R4
            LDN     R2
            SMI     01H
            STR     R2
            BR      LOOP10
EX11        LDN     R1          ;DET. # OF KEY ENTRIES
            ADI     01H
            STR     R1
            INC     R3
            INC     R3
            INC     R4
            LDN     R2
            SMI     01H
            STR     R2
            BR      LOOP10
EX10        LDI     4DH         ;DETERMINE STATUS OF KEY CLOSURE/OPNG
            PLO     R2
            LDN     R2
            ANI     80H
            BZ      EX95
            LDN     R2
            ANI     03FH
            STR     R2
            LDN     R2
            ORI     40H
            STR     R2
            BR      EX98
EX95        LDN     R2
            ANI     40H
            LBZ     EX12
            LDN     R1
            LBNZ    EX98
```

```
              LDN    R2
              ANI    3FH
              STR    R2
EX98          LDI    6BH
              PLO    R2
              LDI    02H               ;DEBOUNCE KEY OPENING
              STR    R2
LOOP11        LDI    08H
              PLO    R1
              LDN    R1
              ORI    01H
              LBR    EX122             ;BRANCH TO 122, REQUEST BT AND BC BLOCKS
EX12          LDI    01H               ;DET. IF # KEYS >1
              SD
              BNZ    LOOP11
              LDI    20H               ;INIT. R4, & R5
              PLO    R4
              LDI    25H
              PLO    R5
LOOP12        LDN    R4                ;FINAL WORD CONT. KEYBRD ENTRY
              BNZ    EX14
              INC    R4
              INC    R5
              BR     LOOP12
EX14          SEX    R4                ;AND KEY ENTR W/BIT MASK BR IFD = 0
              LDN    R5
              AND
              BZ     LOOP11            ;BR IFD = 0
              LDI    4DH               ;DEBOUNCE PB CLOSURE
              PLO    R2
              LDN    R2
              ORI    80H
              STR    R2
              LDI    6BH
              PLO    R2
              LDI    02H
              STR    R2
              LDI    43H               ;SET/CLEAR BEEPER
              PLO    R2
              SEX    R2
              LDI    01H
              STR    R1
              DEC    R2
              LDI    40H
              STR    R2
              OUT    1
              OUT    7
              INC    R2
              LDI    01H
              SD
              DEC    R2
              OUT    1
              OUT    7
              LDI    24H               ;DET. WHICH COL. OF KEY INPTS ENTR WS MADE
              PLO    R4
              LDN    R4
              LBNZ   EX15              ;B-T,S-T,G-T,B.I.D.,S.I.D.,G.I.D.
              DEC    R4
              LDN    R4
              LBNZ   EX16              ;PRGM.,+,-,MULT.,DIV.,G-C
              DEC    R4
              LDN    R4
              LBNZ   EX17              ;9,6,3,0,=,S-C
              DEC    R4
              LDN    R4
              LBNZ   EX18              ;8,5,2,C,M+,B-C
              DEC    R4                ;7,4,1,D.P.,MOTOR,BC
              LDN    R4                ;TEST FOR BAG COUNT PB
              SEX    R4
              LDI    04H
              AND
              LBZ    EX19              ;BRANCH TO EX19 IF B.C. NOT PUSHED
              LDI    32H               ;SET BAG COUNT PB MEM. BIT
              PLO    R3
```

```
            LDN     R3
            ORI     01H
            STR     R3
            DEC     R3          ;BAG COUNT DISPL MODE?
            DEC     R3
            LDN     R3
            ANI     01H
            LBNZ    EX20        ;BR EX20 IF IN BC MODE
            LDI     01H         ;SET ONLY BAG COUNTS MODE
            STR     R3
            INC     R3
            LDI     00H
            STR     R3
            LDI     41H         ;RESET DIS ADD CTR TO BEG OF BC MEM BLK
            PLO     R6
LOOP28      LDI     68H
            STR     R6
            DEC     R6
            LDI     21H
            STR     R6
            LBR     EX21        ;BRANCH TO 21
EX20        LDI     45H         ;TEST TO SEE IF AT LAST BC MEM BLOCK
            PLO     R2
            LDI     0B0H
            STR     R2
            SEX     R2
            LDI     41H
            PLO     R6
            LDN     R6
            SD
            BNZ     EX22        ;BRANCH TO EX 22 IF NOT AT LAST BC BLK
            LBR     LOOP28
EX22        LDN     R6          ;INCREMENT TO NEXT BC BLOCK
            SEX     R6
            LDI     08H
            ADD
            STR     R6
EX21        LDI     0AH         ;ENABLE DATA XFER FOR ALT WRITE FORMT
            PLO     R2
            LDI     01H
            STR     R2
            LDI     50H         ;PUT "READ" ADDR IN DATA XFER (LW ORDR)
            PLO     R2
            LDI     41H
            PLO     R6
            LDN     R6
            STR     R2
            INC     R2          ;PUT "READ" ADDR IN DT(HIGH ORDER)
            DEC     R6
            LDN     R6
            STR     R2
            LDI     58H         ;PUT "WRITE" ADDR IN DT
            PLO     R2
            LDI     27H
            PHI     R2
            LDI     0F1H
            STR     R2
            INC     R2
            LDI     27H
            STR     R2
            LDI     60H
            PLO     R2
            LDI     08H         ;DEFINE # WDS TO BE XFERRED
            STR     R2
            LDI     08H
            PLO     R2
            SEX     R2
            LDI     0DH         ;ENABLE KS,DT, AND DE
            OR
            STR     R2
            LDI     29H         ;WRITE BIT MARKS INTO 2725-2729
            PLO     R2
            LDI     0FCH
            STXD
```

```
              LDI      80H
              STXD
              LDI      00H
              STXD
              LDI      04H
              STXD
              LDI      0CH
              STR      R2
              LBR      EX13          ;BRANCH TO 13
EX15          LDN      R4            ;TEST FOR BATCH - T PB
              SEX      R4
              LDI      80H
              AND
              LBZ      EX25          ;BRANCH IF NOT B.T.
              LDI      34H           ;SET BATCH T PB MEM ONLY
              PLO      R3
              SEX      R3
              LDI      00H
              STXD
              STXD
              LDI      02H
              STXD
              DEC      R3            ;BATCH T DIPL MODE?
              LDI      02H
              AND
              BNZ      EX26          ;BRANCH TO EX26 IF IN BT MODE
              LDI      02H           ;SET ONLY BT MODE
              STR      R3
              INC      R3
              LDI      00H
              STR      R3
LOOP16        LDI      41H           ;RESET ADDR. CTR. TO BT BLOCK START ADDR.
              PLO      R6
              LDI      0F8H
              STR      R6
              DEC      R6
              LDI      20H
              STR      R6
              LBR      EX27          ;BRANCH TO 27
EX26          LDI      3CH           ;TEST TO SEE IF AT STATION T
              PLO      R3
              LDI      45H
              PLO      R2
              LDI      0F8H
              STR      R2
              SEX      R2
              LDI      41H
              PLO      R6
              LDN      R6
              SD
              BN7      EX99          ;BRANCH TO 99 IF NOT AT STATION T
              LDI      0F0H          ;PUT M+ START ADDR. INTO ADDR. CTR.
              STR      R6
              LBR      EX27          ;BRANCH TO 27
EX99          LDI      0F0H          ;TEST TO SEE IF AT STATION M+
              STR      R2
              LDN      R6
              SD
              BNZ      EX28          ;BRANCH TO 28 IF NOT AT STATION M+
              LDI      0A0H          ;PUT STATION 1 START ADDR. INTO ADDR. CTR.
              STR      R6
              INC      R2
              LDI      02H
              STR      R2
              LBR      EX100         ;BRANCH TO 100 TO TEST IF STATION 1 IS ACT.
EX28          LDI      45H           ;TEST TO SEE IF AT STATION 10
              PLO      R2
              LDI      0E8H
              STR      R2
              SEX      R2
              LDI      41H
              PLO      R6
              LDN      R6
```

```
              SD
              BNZ       EX101         ;BRANCH TO 101 IF NOT AT STATION 10
              LBR       LOOP16        ;BRANCH TO LOOP16 IF AT STATION 10
EX101         LDN       R6            ;INCREMENT ADDR. CTR. TO NEXT MEM. BLOCK
              SEX       R6
              LDI       08H
              ADD
              STR       R6
EX100         LDI       46H           ;TEST TO SEE IF STATION IS ACTIVE
              PLO       R2
              SEX       R3
              LDN       R2
              SHL
              BDF       EX102
LOOP30        STR       R2
              AND
              LBZ       EX28          ;BRANCH TO 28 IF STATION NOT ACTIVE
              LBR       EX27          ;BRANCH TO STATION 27 IF STATION IS ACTIVE
EX102         LDI       30H           ;ENABLE TESTING STATIONS 7-10 FOR ACT. STATUS
              PLO       R3
              LDI       01H
              LBR       LOOP30        ;BRANCH TO LOOP 30
EX27          LDI       0AH           ;ENABLE DTA XFER FOR ALT WRITE FRMT
              PLO       R2
              LDI       01H
              STR       R2
              LDI       50H           ;PUT "READ" ADDR IN DATA XFER (LW ORDR)
              PLO       R2
              LDI       41H
              PLO       R6
              LDN       R6
              STR       R2
              INC       R2            ;PUT "READ"ADDR IN DT (HIGH ORDER)
              DEC       R6
              LDN       R6
              STR       R2
              LDI       58H           ;PUT "WRITE" ADDR IN DT
              PLO       R2
              LDI       27H
              PHI       R2
              LDI       0F1H
              STR       R2
              INC       R2
              LDI       27H
              STR       R2
              LDI       60H
              PLO       R2
              LDI       08H           ;DEFINE # WRDS TO BE XFERRED
              STR       R2
              LDI       08H
              PLO       R2
              SEX       R2
              LDI       09H           ;ENABLE KS AND DE
              OR
              STR       R2
              LDI       29H           ;WRITE BIT MASKR INTO 2725-2729
              PLO       R2
              LDI       0FCH
              STXD
              LDI       00H
              STXD
              LDI       00H
              STXD
              LDI       04H
              STXD
              LDI       0CH
              STR       R2
              LBR       EX13          ;CONTINUE
EX25          LDI       40H           ;TEST FOR SUB T PB
              AND
              LBZ       EX31          ;BRANCH IF NOT ST PB
              LDI       34H           ;SET SUB T PB ONLY
              PLO       R3
              SEX       R3
```

```
          LDI      00H
          STXD
          STXD
          LDI      04H
          STXD
          DEC      R3              ;SET SUB T MODE ONLY
          LDI      04H
          STR      R3
          INC      R3
          LDI      00H
          STR      R3
          LDI      41H             ;RESET ADDR CNTR TO SUB T MEM BLK
          PLO      R6
          LDI      00H
          STR      R6
          DEC      R6
          LDI      21H
          STR      R6
          LDI      0AH             ;ENABLE DATA XFER FOR ALT WRITE FRMT
          PLO      R2
          LDI      01H
          STR      R2
          LDI      50H             ;PUT "READ" ADDR IN DATA XFER (LW ORDR)
          PLO      R2
          LDI      41H
          PLO      R6
          LDN      R6
          STR      R2
          INC      R2              ;PUT "READ" ADDR IN DT (HIGH ORDER)
          DEC      R6
          LDN      R6
          STR      R2
          LDI      58H             ;PUT "WRITE" ADDR IN DT
          PLO      R2
          LDI      27H
          PHI      R2
          LDI      0F1H
          STR      R2
          INC      R2
          LDI      27H
          STR      R2
          LDI      60H
          PLO      R2
          LDI      08H             ;DEFINE # WDS TO BE XFERRED
          STR      R2
          LDI      08H
          PLO      R2
          SEX      R2
          LDI      09H             ;ENABLE DT AND DE
          OR
          STR      R2
          LDI      29H             ;WRITE BIT MARKS INTO 2725-2729
          PLO      R2
          LDI      0FCH
          STXD
          LDI      00H
          STXD
          LDI      00H
          STXD
          LDI      04H
          STXD
          LDI      0CH
          STR      R2
          LBR      FX13            ;CONTINUE
EX31      LDI      20H             ;TEST FOR GRAND T PB
          AND
          LBZ      EX32            ;BRANCH IF NOT GT PB
          LDI      34H             ;SET GT PB MEM ONLY
          PLO      R3
          SEX      R3
          LDI      00H
          STXD
          STXD
```

|        |       |        |                                              |
|--------|-------|--------|----------------------------------------------|
|        | LDI   | 08H    |                                              |
|        | STXD  |        |                                              |
|        | DEC   | R3     | ;GT DISPL MODE?                              |
|        | LDI   | 08H    |                                              |
|        | AND   |        |                                              |
|        | BNZ   | EX33   | ;BRANCH TO EX33 IF IN GT MODE                |
|        | LDI   | 08H    | ;SET ONLY GT MODE                            |
|        | STR   | R3     |                                              |
|        | INC   | R3     |                                              |
|        | LDI   | 00H    |                                              |
|        | STR   | R3     |                                              |
| LOOP15 | LDI   | 41H    | ;RESET ADDR. CTR. TO START OF GT BLOCK       |
|        | PLO   | R6     |                                              |
|        | LDI   | 60H    |                                              |
|        | STR   | R6     |                                              |
|        | DEC   | R6     |                                              |
|        | LDI   | 21H    |                                              |
|        | STR   | R6     |                                              |
|        | LBR   | EX34   | ;BRANCH TO 34 TO SET UP DT ROUTINE           |
| EX33   | LDI   | 3CH    | ;TEST TO SEE IF AT STATION T                 |
|        | PLO   | R3     |                                              |
|        | LDI   | 45H    |                                              |
|        | PLO   | R2     |                                              |
|        | LDI   | 60H    |                                              |
|        | STR   | R2     |                                              |
|        | SEX   | R2     |                                              |
|        | LDI   | 41H    |                                              |
|        | PLO   | R6     |                                              |
|        | LDN   | R6     |                                              |
|        | SD    |        |                                              |
|        | LBNZ  | EX103  | ;BRANCH TO 103 IF NOT AT STATION T           |
|        | LDI   | 58H    | ;PUT M+ START. ADDR. INTO ADDR. CTR.         |
|        | STR   | R6     |                                              |
|        | LBR   | EX34   | ;BRANCH TO 34 TO SET UP DT ROUTINE           |
| EX103  | LDI   | 58H    | ;TEST TO SEE IF AT STATION M+                |
|        | STR   | R2     |                                              |
|        | LDN   | R6     |                                              |
|        | SD    |        |                                              |
|        | LBNZ  | EX104  | ;BRANCH TO 104 IF NOT AT STATION M+          |
|        | LDI   | 08H    | ;PUT STATION 1 START. ADDR. INTO ADDR. CTR.  |
|        | STR   | R6     |                                              |
|        | INC   | R2     |                                              |
|        | LDI   | 02H    |                                              |
|        | STR   | R2     |                                              |
|        | LBR   | EX105  | ;BRANCH TO 105 TO TEST IF STATION 1 ACTIVE   |
| EX104  | LDI   | 45H    | ;TEST TO SEE IF AT STATION 10                |
|        | PLO   | R2     |                                              |
|        | LDI   | .50H   |                                              |
|        | STR   | R2     |                                              |
|        | SEX   | R2     |                                              |
|        | LDI   | 41H    |                                              |
|        | PLO   | R6     |                                              |
|        | LDN   | R6     |                                              |
|        | SD    |        |                                              |
|        | LBNZ  | EX106  | ;BRANCH TO 106 IF NOT AT STATION 10          |
|        | LBR   | LOOP15 | ;BRANCH TO LOOP15 IF AT STATION 10           |
| EX106  | LDN   | R6     | ;INCREMENT ADDR. CTR. TO NEXT MEM. BLOCK     |
|        | SEX   | R6     |                                              |
|        | LDI   | 08H    |                                              |
|        | ADD   |        |                                              |
|        | STR   | R6     |                                              |
| EX105  | LDI   | 46H    | ;TEST TO SEE IF STATION IS ACTIVE            |
|        | PLO   | R2     |                                              |
|        | SEX   | R3     |                                              |
|        | LDN   | R2     |                                              |
|        | SHL   |        |                                              |
|        | BDF   | EX107  |                                              |
| LOOP31 | STR   | R2     |                                              |
|        | AND   |        |                                              |
|        | LBZ   | EX104  | ;BRANCH TO 104 IF STATION NOT ACTIVE         |
|        | LBR   | EX34   | ;BRANCH TO 34 IF STATION IS ACTIVE           |
| EX107  | LDI   | 3DH    | ;ENABLE TESTING OF STA. 7-10 FOR ACT. STATUS |
|        | PLO   | R3     |                                              |

```
                LDI     01H
                LBR     LOOP31      ;BRANCH TO LOOP31 TO SEE IF NEXT STA. ACTIVE
EX34            LDI     0AH         ;ENABLE DATA XFER FOR ALT WRITE FORMAT
                PLO     R2
                LDI     01H
                STR     R2
                LDI     50H         ;PUT "READ" ADDR IN DATA XFER (LW ORDER)
                PLO     R2
                LDI     41H
                PLO     R6
                LDN     R6
                STR     R2
                INC     R2          ;PUT "READ" ADDR IN DT (HIGH ORDER)
                DEC     R6
                LDN     R6
                STR     R2
                LDI     58H         ;PUT "WRITE" ADDR IN DT
                PLO     R2
                LDI     27H
                PHI     R2
                LDI     0F1H
                STR     R2
                INC     R2
                LDI     27H
                STR     R2
                LDI     60H
                PLO     R2
                LDI     08H         ;DEFINE # WDS TO BE XFERRED
                STR     R2
                LDI     08H
                PLO     R2          ;ENABLE KS AND DE
                SEX     R2
                LDI     09H
                OR
                STR     R2
                LDI     29H         ;WRITE BIT MASKS INTO 2725-2729
                PLO     R2
                LDI     0FCH
                STXD
                LDI     00H
                STXD
                LDI     00H
                STXD
                LDI     04H
                STXD
                LDI     0CH
                STR     R2
                LBR     EX13        ;CONTINUE
EX14            LDN     R4          ;TEST TO SEE IF PRGM PB IS PUSHED
                SEX     R4
                LDI     80H
                AND
                LBZ     EX38        ;BRANCH TO EX38 IF PRGM PB NOT PUSHED
                LDI     47H         ;TEST TO SEE IF MOTOR IS ON
                PLO     R2
                SEX     R2
                LDI     10H
                AND
                LBNZ    EX39        ;BRANCH TO ERROR MESSAGE IF MOTOR ON
                LDI     34H         ;SET PRGRM PB AND BC PB ONLY
                PLO     R3
                SEX     R3
                LDI     80H
                STXD
                LDI     00H
                STXD
                LDI     01H
                STXD
                LDI     00H         ;SET BC DISPLAY MODE
                STXD
                LDI     01H
                STR     R3
                LDI     0AH         ;SET CTL. WD. OF DT FOR SEQ. AND ALT. FORMAT
```

```
        PLO     R2
        LDI     06H
        STR     R2
        LDI     53H         ;LOAD READ ADDR. OF 8X8 TS BLOCK
        PLO     R2
        SEX     R2
        LDI     27H
        STXD
        LDI     00H
        STXD
        LDI     40H         ;LOAD READ ADDR. OF BC BLOCK
        PLO     R6
        LDN     R6
        STXD
        INC     R6
        LDN     R6
        ADI     01H
        STR     R2
        LDI     5BH         ;LOAD "WRITE" ADDR OF DISPLAY
        PLO     R2
        LDI     27H
        STXD
        LDI     0F1H
        STXD
        LDI     27H         ;LOAD "WRITE" ADDR OF 8 X 8 TEMP ST
        STXD
        LDI     01H
        STR     R2
        LDI     62H         ;LOAD # WDS. TO BE XFRD. FROM 8X8 TS TO DISP.
        PLO     R2
        LDI     08H
        STXD
        DEC     R2          ;LOAD # WDS. TO BE XFRD. FROM BC BLK TO 8X8 TS
        LDI     07H
        STR     R2
        LDI     08H         ;ENABLE DE AND KS ROUTINES
        PLO     R2
        LDI     09H
        OR
        STR     R2
        LDI     29H         ;WRITE BIT MASK INTO 2725-2729
        PLO     R2
        LDI     27H
        PHI     R2
        LDI     00H
        STXD
        LDI     78H
        STXD
        LDI     00H
        STXD
        LDI     10H
        STXD
        LDI     00H
        STR     R2
        LBR     EX13        ;BRANCH TO 13
EX38    LDN     R4          ;TEST TO SEE IF + PB WAS PUSHED
        SEX     R4
        LDI     40H
        AND
        LB7     EX40        ;BRANCH TO 40 IF + NOT ENTERED
        LDI     34H         ;CLEAR ALL PB ENTRIES
        PLO     R3
        SEX     R3
        LDI     00H
        STXD
        STXD
        STXD
        LDI     20H         ;SET PRGRM SEC. MODE BIT ONLY
        STXD
        LDI     00H
        STR     R3
        LDI     04H         ;SET CTL. WD. OF DT FOR SEQ. AND ALT. FORMAT
        PLO     R2
        LDI     06H
```

```
        STR     R2
        LDI     53H         ;LOAD READ ADDR. OF SEC. DISP. MASK
        PLO     R2
        SEX     R2
        LDI     27H
        STXD
        LDI     0E0H
        STXD
        LDI     27H         ;LOAD "READ" ADDR OF SEC DISPL MASK INTO DT
        STXD
        LDI     0E0H
        STR     R2
        LDI     5BH         ;LOAD "WRITE" ADDR OF DISPL.
        PLO     R2
        LDI     27H
        STXD
        LDI     0F1H
        STXD
        LDI     27H         ;LOAD "WRITE" ADDR OF 8 X 8 TS
        STXD
        LDI     00H
        STR     R2
        LDI     62H         ;LOAD # WDS. TO BE XFRD. FROM SEC. MSK TO DISP.
        PLO     R2
        LDI     08H
        STXD
        DEC     R2          ;LD #WDS TO BE XFERD FRM SEC BFR TO 8 X 8 TS
        STR     R2
        LDI     08H         ;ENABLE DE AND KS ROUTINES
        PLO     R2
        LDI     09H
        OR
        STR     R2
        LDI     29H         ;WRITE BIT MASKS INTO 2725-2729
        PLO     R2
        LDI     27H
        PHI     R2
        LDI     00H
        STXD
        STXD
        LDI     0F8H
        STXD
        LDI     0F0H
        STXD
        STR     R2
        LDI     49H         ;PRESET MAX ENTRIES OF 0-9 AND DP
        PLO     R2
        LDI     05H
        STXD
        LDI     08H
        STR     R2
        LBR     EX13        ;BRANCH TO 13
FX40    LDN     R4          ;TEST TO SEE IF - PB WAS ENTERED
        SEX     R4
        LDI     20H
        AND
        LBZ     EX41        ;BRANCH TO 41 IF - NOT ENTERED
        LDI     31H         ;TEST TO SEE IF IN ID PRGM MODE
        PLO     R2
        LDN     R2
        ANI     08H
        LBZ     EX113       ;BRANCH TO 113 IF NOT IN ID PRGM MODE
        LDI     0FEH
        STR     R7
        LBR     LOOP17      ;BRANCH TO LOOP17 IF - ENTERED
EX113   LDI     34H         ;CLEAR ALL PB ENTRIES
        PLO     R3
        SEX     R3
        LDI     00H
        STXD
        STXD
        STXD                ;SET CV DISPLAY MODE ONLY
        STXD
        LDI     20H
```

```
        STR     R3
        LDI     0AH         ;SET CTL WD OF DT FOR SEQ. AND ALT. FORMAT
        PLO     R2
        LDI     06H
        STR     R2
        LDI     41H         ;CALCULATE STATION ADDRESS
        PLO     R6
        SEX     R6
        LDI     68H
        SD
        STXD
        LDI     20H
        STR     R6
        LDI     53H         ;LOAD "READ" ADDR OF 8X8 TS INTO DT
        PLO     R2
        SEX     R2
        LDI     27H
        STXD
        LDI     00H
        STXD
        LDN     R6          ;LOAD READ ADDR. OF CV BLK INTO DT
        STXD
        INC     R6
        LDN     R6
        ADI     01H
        STR     R2
        LDI     5BH         ;LOAD "WRITE" ADDR OF DIS INTO DT
        PLO     R2
        LDI     27H
        STXD
        LDI     0F1H
        STXD
        LDI     27H         ;LOAD WRITE ADDR.OF 8X8 TS INTO DT
        STXD
        LDI     01H
        STR     R2
        LDI     62H         ;LOAD # WDS TO BE XFRD FROM 8X8 TS TO DISPL.
        PLO     R2
        SEX     R2
        LDI     08H
        STXD
        DEC     R2          ;LOAD # WDS TO BE XFRD FROM MEM TO 8X8 TS
        LDI     07H
        STR     R2
        LDI     08H         ;ENABLE DT AND KS
        PLO     R2
        LDI     09H
        OR
        STR     R2
        LDI     29H         ;WRITE BIT MASKS INTO 2725-2729
        PLO     R2
        LDI     27H
        PHI     R2
        LDI     00H
        STXD
        STXD
        LDI     0F8H
        STXD
        LDI     0F0H
        STXD
        STR     R2
        LDI     49H         ;PRESET MAX ENTRIES OF 0-9, DP
        PLO     R2
        LDI     01H
        STXD
        LDI     08H
        STR     R2
        LBR     EX13        ;BRANCH TO 13
EX41    LDN     R4          ;TEST TO SEE IF X PB WAS ENTERED
        SEX     R4
        LDI     10H
        AND
        LBZ     EX42        ;BRANCH TO 42 IF X NOT ENTERED
        LDI     34H         ;CLEAR ALL PB ENTRIES
```

```
PLO     R3
SEX     R3
LDI     00H
STXD
STYD
STXD                    ;SET BS DISPLAY MODE ONLY
STXD
LDI     10H
STR     R3
LDI     0AH             ;SET CTL WD OF DT FOR MEM & DISPL XFER
PLO     R2
LDI     06H
STR     R2
LDI     41H             ;CALCULATE STATION ADDRESS
PLO     R6
SEX     R6
LDI     18H
SD
STXD
LDI     20H
STR     R6
LDI     53H             ;LOAD "READ" ADDR OF 8X8 TS BLK INTO DT
PLO     R2
SEX     R2
LDI     27H
STXD
LDI     00H
STXD
LDN     R6              ;LOAD READ ADDR. OF BS BLK INTO DT
STXD
INC     R6
LDN     R6
ADI     01H
STR     R2
LDI     05BH            ;LOAD "WRITE" ADDR OF DISPL INTO DT
PLO     R2
LDI     27H
STXD
LDI     0F1H
STXD
LDI     27H             ;LOAD "WRITE" ADDR OF 8 X 8 TEMP IN DT
STXD
LDI     01H
STR     R2
LDI     62H             ;LOAD # WDS TO BE XFRD FROM 8X8 TS TO DISPL.
PLO     R2
SEX     R2
LDI     08H
STXD
DEC     R2              ;LOAD # WDS TO BE XFRD FROM MEM TO 8X8 TS
LDI     07H
STR     R2
STR     R2
LDI     08H             ;ENABLE DE AND KS
PLO     R2
LDI     09H
OR
STR     R2
LDI     29H             ;WRITE BIT MASKS INTO 2725-2729
PLO     R2
LDI     27H
PHI     R2
LDI     00H
STXD
STXD
LDI     0F8H
STXD
LDI     0F0H
STXD
LDI     0E0H
STR     R2
LDI     48H             ;PRESET MAX ENTRIES OF 0-9
PLO     R2
LDI     08H
```

```
              STR     R2
              LBR     EX13         ;BRANCH TO 13
EX42          LDN     R4           ;TEST TO SEE IF DIV. PB WAS ENTERED
              SEX     R4
              LDI     08H
              AND
              LBZ     EX43         ;BRANCH TO EX43 IF DIV. PB NOT ENTERED
              LDI     34H          ;CLEAR ALL PB ENTRIES
              PLO     R3
              SEX     R3
              LDI     00H
              STXD
              STXD
              STXD                 ;SET BC DISPLAY MODE ONLY
              STXD
              LDI     01H
              STR     R3
              LDI     0AH          ;SET CTL. WD OF DT FOR SEQ. AND ALT. FORMAT
              PLO     R2
              LDI     06H
              STR     R2
              LDI     53H          ;LOAD "READ" ADDR OF 8X8 TS BLK INTO DT
              PLO     R2
              SEX     R2
              LDI     27H
              STXD
              LDI     00H
              STXD
              LDI     40H          ;LOAD READ ADDR. OF BC BLK INTO DT
              PLO     R6
              LDN     R6
              STXD
              INC     R6
              LDN     R6
              ADI     01H
              STR     R2
              LDI     5BH          ;LOAD "WRITE" ADDR OF DISPL INTO DT
              PLO     R2
              LDI     27H
              STXD
              LDI     0F1H
              STXD
              LDI     27H          ;LOAD "WRITE" ADDR OF 8 X 8 TEMP STORE IN DT
              STXD
              LDI     01H
              STR     R2
              LDI     62H          ;LOAD # WDS TO BE XFRD FROM 8X8 TS TO DISPL.
              PLO     R2
              SEX     R2
              LDI     08H
              STXD
              DEC     R2           ;LOAD # WDS TO BE XFRD FROM MEM TO 8X8 TS
              LDI     07H
              STR     R2
              LDI     08H          ;ENABLE DE AND KS
              PLO     R2
              LDI     09H
              OR
              STR     R2
              LDI     29H          ;WRITE BIT MASKS INTO 2725-2729
              PLO     R2
              LDI     27H
              PHI     R2
              LDI     00H
              STXD
              STXD
              LDI     0F8H
              STXD
              LDI     0F0H
              STXD
              LDI     0E0H
              STR     R2
              LDI     48H          ;PRESET MAX ENTRIES OF 0-9
              PLO     R2
```

```
                LDI     08H
                STR     R2
                LBR     EX13
EX18            LDN     R4              ;TEST TO SEE IF C PB WAS ENTERED
                SEX     R4
                LDI     10H
                AND
                LBZ     EX44            ;BRANCH TO 44 IF C NOT ENTERED
                LDI     08H             ;TEST TO SEE IF ERROR IS ACTIVE
                PLO     R2
                LDN     R2
                ANI     10H
                LBNZ    ERR             ;BRANCH TO ERROR ROUTINE
                LDI     31H             ;TEST TO SEE IF IN SECURITY MODE
                PLO     R3
                SEX     R3
                LDI     20H
                AND
                LBNZ    EX45            ;BRANCH TO 45 IF IN SECURITY MODE
                LDI     34H             ;CLEAR ALL PB ENTRIES
                PLO     R3
                LDI     00H
                STXD
                STXD
                STXD
                STXD                    ;SET BATCH T DISPL MODE BIT
                LDI     02H
                STR     R3
                LDI     27H             ;CLEAR KEYPAD BIT OF 8X8 TS
                PHI     R2
                LDI     00H
                PLO     R2
                LDI     08H
                STR     R2
                LBR     LOOP16          ;BRANCH TO LOOP 16
EX17            LDN     R4              ;TEST TO SEE IF "9" PB WAS ENTERED
                SEX     R4
                LDI     80H
                AND
                LBZ     EX46            ;BRANCH TO 46 IF 9 NOT ENTERED
                LDI     0F9H            ;FIRST ENTRY OF 0-9?
                STR     R7
LOOP17          LDI     34H
                PLO     R3
                SEX     R3
                LDI     60H
                AND
                LBNZ    EX47            ;BRANCH TO 47 IF NOT FIRST ENTRY OF 0-9
                LDI     40H             ;SET 0-9 PB MEM BIT
                STXD
                LDI     00H
                STXD
                STXD
EX57            DEC     R3              ;TEST IF IN CV DISPL MODE
                LDI     20H
                AND
                LBZ     EX48            ;BRANCH TO 48 IF NOT IN CV DISPL. MODE
                INC     R3              ;SET CV PRGRM MODE
                LDI     04H
                STXD
                LBR     EX49            ;BRANCH TO 49
EX48            LDI     10H             ;TEST IF IN BS DISPL MODE
                AND
                LBZ     EX50            ;BRANCH TO 50 IF NOT IN BS DISPL. MODE
                INC     R3              ;SET B.S. PROGRAM MODE
                LDI     02H
                STXD
                LBR     EX49            ;BRANCH TO 49
EX50            LDI     01H             ;TEST IF  IN BC DISPL. MODE
                AND
                LBZ     EX49            ;BRANCH TO 49 IF NOT IN BC DISPL. MODE
                INC     R3              ;SET B.C. PROGRAM MODE
                LDI     01H
                STXD
```

```
EX49    LDI     00H     ;CLEAR ALL OTHER MODES IN 2730
        STR     R3
        LDI     07H     ;LOAD DATA INTO 8X8 TS
        PLO     R2
        SEX     R2
        LDI     0FFH
        STXD
        STXD
        STXD
        LDN     R7
        STXD
        LDI     00H
        STXD
        LDI     3FH
        AND
        STXD
        DEC     R2
        LDI     18H
        STR     R2
        LDI     31H     ;TEST TO SEE IF SEC PRGM MODE
        PLO     R2
        LDI     20H
        AND
        LBNZ    EX51    ;BRANCH TO 51 IF IN SEC PRGM MODE
        LDI     0AH     ;SET CONTROL WD OF DT FOR ALT. FORMAT
        PLO     R2
        LDI     01H
        STR     R2
        LDI     53H     ;LOAD READ ADDR. OF 8X8 TS
        PLO     R2
        LDI     00H
        STXD
        STXD
        LDI     27H
        STXD
        LDI     00H
        STR     R2
        LDI     5BH     ;LOAD "WRITE" ADDR OF DISPL INTO DT
        PLO     R2
        LDI     00H
        STXD
        STXD
        LDI     27H
        STXD
        LDI     0F1H
        STR     R2
        LDI     60H     ;LOAD INTO DT THE # WDS TO BE XFRD
        PLO     R2
        LDI     08H
        STR     R2
        PLO     R2
        LDI     48H     ;SUBTRACT 1 COUNT FROM DIGIT COUNTER
        PLO     R2
        LDN     R2
        SMI     01H
        STR     R2
        LBR     EX111   ;BRANCH TO 111
EX51    LDI     0AH     ;SET CONTROL WRD OF DT FOR ALT. FORMAT
        PLO     R2
        LDI     01H     ;LOAD "READ" ADDR OF 8 X 8 SEC TS INTO DT
        STR     R2
        LDI     51H
        PLO     R2
        LDI     27H
        STXD
        LDI     0E0H    ;LOAD "WRITE" ADDR OF DISPL INTO DT
        STR     R2
        LDI     59H
        PLO     R2
        LDI     27H
        STXD
        LDI     0F1H
        STR     R2
```

|         |       |        |                                         |
|---------|-------|--------|-----------------------------------------|
|         | LDI   | 40H    | ;LOAD # WDS TO BE XFERRED INTO DT       |
|         | PLO   | R2     |                                         |
|         | LDI   | 08H    |                                         |
|         | STR   | R2     |                                         |
|         | PLO   | R2     |                                         |
|         | LBR   | EX111  | ;BRANCH TO 111                          |
| LOOP23  | LDI   | 29H    | ;WRITE BIT MASK INTO 2725-2729          |
|         | PLO   | R2     |                                         |
|         | LDI   | 00H    |                                         |
|         | STXD  |        |                                         |
|         | STXD  |        |                                         |
|         | LDI   | 08H    |                                         |
|         | STXD  |        |                                         |
|         | LDI   | 10H    |                                         |
|         | STXD  |        |                                         |
|         | STR   | R2     |                                         |
|         | LBR   | EX13   | ;BRANCH TO EX13                         |
| LOOP20  | LDI   | 29H    | ;WRITE BIT MASK INTO 2725-2729          |
|         | PLO   | R2     |                                         |
|         | LDI   | 00H    |                                         |
|         | STXD  |        |                                         |
|         | STXD  |        |                                         |
|         | LDI   | 0F8H   |                                         |
|         | STXD  |        |                                         |
|         | LDI   | 0F0H   |                                         |
|         | STXD  |        |                                         |
|         | LDI   | 0E0H   |                                         |
|         | STR   | R2     |                                         |
|         | LBR   | EX13   | ;BRANCH TO EX13                         |
| LOOP21  | LDI   | 29H    | ;WRITE BIT MASKS INTO 2725-2729         |
|         | PLO   | R2     |                                         |
|         | LDI   | 00H    |                                         |
|         | STXD  |        |                                         |
|         | STXD  |        |                                         |
|         | LDI   | 0F8H   |                                         |
|         | STXD  |        |                                         |
|         | LDI   | 0F0H   |                                         |
|         | STXD  |        |                                         |
|         | STR   | R2     |                                         |
|         | LBR   | EX13   | ;BRANCH TO EX13                         |
| LOOP24  | LDI   | 29H    | ;WRITE BIT MASKS INTO 2725-2729         |
|         | PLO   | R2     |                                         |
|         | LDI   | 00H    |                                         |
|         | STXD  |        |                                         |
|         | LDI   | 20H    |                                         |
|         | STXD  |        |                                         |
|         | LDI   | 0F8H   |                                         |
|         | STXD  |        |                                         |
|         | LDI   | 0F0H   |                                         |
|         | STXD  |        |                                         |
|         | STR   | R2     |                                         |
|         | LBR   | EX13   | ;BRANCH TO EX13                         |
| EX46    | LDN   | R4     | ;TEST TO SEE IF "6"PB WAS ENTERED       |
|         | SEX   | R4     |                                         |
|         | LDI   | 40H    |                                         |
|         | AND   |        |                                         |
|         | LBZ   | EX55   | ;BRANCH TO 55 IF 6 NOT ENTERED          |
|         | LDI   | 0F6H   |                                         |
|         | STR   | R7     |                                         |
|         | LBR   | LOOP17 | ;BRANCH TO LOOP IF "6" WAS ENTERED      |
| EX55    | LDN   | R4     | ;TEST TO SEE IF"3" PB WAS ENTERED       |
|         | SEX   | R4     |                                         |
|         | LDI   | 20H    |                                         |
|         | AND   |        |                                         |
|         | LBZ   | EX56   | ;BRANCH TO 56 IF 3 NOT ENETERED         |
|         | LDI   | 0F3H   |                                         |
|         | STR   | R7     |                                         |
|         | LBR   | LOOP17 | ;BRANCH TO LOOP17 IF 3 WAS ENTERED      |
| EX56    | LDN   | R4     | ;TEST TO SEE IF "0" PB WAS ENTERED      |
|         | SEX   | R4     |                                         |
|         | LDI   | 10H    |                                         |
|         | AND   |        |                                         |
|         | LBZ   | EX58   | ;BRANCH TO 58 IF 0 NOT ENTERED          |
|         | LDI   | 0F0H   |                                         |

```
               STR      R7
               LBR      LOOP17     ;BRANCH TO LOOP17 IF 0 WAS ENTERED
EX44           LDN      R4         ;TEST TO SEE IF "8" PB WAS ENTERED
               SEX      R4
               LDI      80H
               AND
               LBZ      EX59       ;BRANCH TO 59 IF 8 NOT ENTERED
               LDI      0F8H
               STR      R7
               LBR      LOOP17     ;BRANCH TO LOOP17 IF 8 WAS ENTERED
EX59           LDN      R4         ;TEST TO SEE IF "5" PB WAS ENTERED
               SEX      R4
               LDI      40H
               AND
               LBZ      EX60       ;BRANCH TO 60 IF 5 NOT ENTERED
               LDI      0F5H
               STR      R7
               LBR      LOOP17     ;BRANCH TO LOOP17 IF 5 WAS ENTERED
EX60           LDN      R4         ;TEST TO SEE IF "2" PB WAS ENTERED
               SEX      R4
               LDI      20H
               AND
               LBZ      EX61       ;BRANCH TO 61 IF 2 NOT ENTERED
               LDI      0F2H
               STR      R7
               LBR      LOOP17     ;BRANCH TO LOOP17 IF 2 WAS ENTERED
EX19           LDN      R4         ;TEST TO SEE IF "7" PB WAS ENTERED
               SEX      R4
               LDI      80H
               AND
               LBZ      EX62       ;BRANCH TO 62 IF 7 NOT ENTERED
               LDI      0F7H
               STR      R7
               LBR      LOOP17     ;BRANCH TO LOOP17 IF 7 WAS ENTERED
EX62           LDN      R4         ;TEST TO SEE IF "4" PB WAS ENTERED
               SEX      R4
               LDI      40H
               AND
               LBZ      EX63       ;BRANCH TO 63 IF 4 NOT ENTERED
               LDI      0F4H
               STR      R7
               LBR      LOOP17     ;BRANCH TO LOOP17 IF 4 WAS ENTERED
EX63           LDN      R4         ;TEST TO SEE IF "1" PB WAS ENTERED
               SEX      R4
               LDI      20H
               AND
               LBZ      EX64       ;BRANCH TO 64 IF 1 NOT ENTERED
               LDI      0F1H
               STR      R7
               LBR      LOOP17     ;BRANCH TO LOOP17 IF 1 WAS ENTERED
EX47           LDI      48H        ;TEST TO SEE IF ALL 8 DIGITS FILLED
               PLO      R2
               LDN      R2
               LBNZ     EX65       ;BRANCH TO 65 IF ALL DIGITS NOT FILLED
               INC      R2         ;TEST IF ALL 5 DPS HAVE BEEN FILLED
               LDN      R2
               LBNZ     EX66       ;BRANCH TO 66 IF ALL 5 DPS NOT FILLED
               LDI      08H        ;ENABLE KS ONLY IF DPS AND DIGITS FILLED
               PLO      R2
               SEX      R2
               OR
               STR      R2
LOOP19         LDI      29H        ;WRITE BIT MASKS INTO 2725-2729
               PLO      R2
               LDI      00H
               STXD
               STXD
               LDI      08H
               STXD
               LDI      10H
               STXD
               LDI      00H
               STR      R2
               LBR      EX13       ;BRANCH TO 13
```

| | | | |
|---|---|---|---|
| LOOP33 | LDI | 29H | ;WRITE MASKS INTO 2725-2729 |
| | PLO | R2 | |
| | LDI | 00H | |
| | STXD | | |
| | LDI | 20H | |
| | STXD | | |
| | LDI | 0F8H | |
| | STXD | | |
| | LDI | 0F0H | |
| | STXD | | |
| | LDI | 0E0H | |
| | STR | R2 | |
| | LBR | EX13 | ;BRANCH TO 13 |
| LOOP34 | LDI | 29H | ;WRITE MASKS INTO 2725-2729 |
| | PLO | R2 | |
| | LDI | 00H | |
| | STXD | | |
| | LDI | 20H | |
| | STXD | | |
| | LDI | 0F8H | |
| | STXD | | |
| | LDI | 0F0H | |
| | STXD | | |
| | STR | R2 | |
| | LBR | EX13 | ;BRANCH TO 13 |
| EX65 | LDN | R2 | ;SUBTRACT 1 COUNT FROM DIGIT COUNTER |
| | SEX | R2 | |
| | LDI | 01H | |
| | SD | | |
| | STR | R2 | |
| | LDI | 45H | ;SET SCRATCH LOOP COUNTER FOR 3 LOOPS |
| | PLO | R3 | |
| | LDI | 03H | |
| | STR | R3 | |
| | LDI | 31H | ;TEST TO SEE IF IN SEC MODE |
| | PLO | R2 | |
| | LDN | R2 | |
| | ANI | 20H | |
| | LBNZ | EX67 | ;BRANCH TO 67 IF IN SEC MODE |
| | LDI | 07H | ;SET R2 TO WD 7 OF 8X8 TS |
| | PLO | R2 | |
| | LBR | LOOP18 | ;BRANCH TO LOOP18 |
| EX67 | LDI | 0E7H | ;SET R2 TO WD 7 OF 8X8 SEC TEMP STORE |
| | PLO | R2 | |
| LOOP18 | LDN | R2 | ;SHIFT 10 DIGIT TO 10 X+1 LOCTN OF WD Y |
| | SEX | R2 | |
| | SHL | | |
| | SHL | | |
| | SHL | | |
| | SHL | | |
| | STXD | | |
| | RSHR | | |
| | LDN | R3 | |
| | LBZ | EX66 | ;BRANCH TO 66 IF ALL DIGITS SHIFTED |
| | LDN | R2 | ;SHFT 10(X+1) DIG OF WD Y(-1) TO 10(X) WD Y |
| | LDI | 0F0H | |
| | AND | | |
| | RSHR | | |
| | RSHR | | |
| | RSHR | | |
| | RSHR | | |
| | INC | R2 | |
| | OR | | |
| | STXD | | |
| | LDN | R3 | ;SUBTRACT 1 COUNT FROM LOOP COUNTER |
| | SEX | R3 | |
| | LDI | 01H | |
| | SD | | |
| | STR | R3 | |
| | LBR | LOOP18 | ;BRANCH TO LOOP18 |
| EX66 | LDN | R7 | ;PUT LATEST ENTRY 0-9,- INTO 10 DIG LOC. |
| | SEX | R7 | |
| | LDI | 0FH | |
| | AND | | |

```
            STR     R7
            INC     R2
            SEX     R2
            LDN     R7
            OR
            STR     R2
            DEC     R2          ;SHIFT DP/CMAS TO LEFT 2 BITS
            LDN     R2
            SHL
            SHL
            STXD
            RSHR
            LDI     0C0H
            AND
            RSHR
            RSHR
            RSHR
            RSHR
            RSHR
            RSHR
            INC     R2
            OR
            STXD
            LDI     3FH         ;CLEAR DP/CMA #5 OF WD 27X2
            AND
            STR     R2
            LDI     0AH         ;SET CONTROL WRD OF DT FOR ALT. FORMAT
            PLO     R2
            LDI     01H
            STR     R2
            LDI     53H         ;LOAD READ ADDR. OF 8X8 TS
            PLO     R2
            LDI     00H
            STXD
            STXD
            LDI     27H
            STXD
            LDI     00H
            STR     R2
            LDI     5BH         ;LOAD WRITE ADDR. OF DISPL.
            PLO     R2
            LDI     00H
            STXD
            STXD
            LDI     27H
            STXD
            LDI     0F1H
            STR     R2
            LDI     60H         ;LOAD # WDS. TO BE XFRD
            PLO     R2
            LDI     08H
            STR     R2
FX111       LDI     31H         ;TEST TO SEE IF SEC PRGM MODE
            PLO     R2
            LDI     20H
            AND
            LBNZ    EX52        ;BRANCH TO 52 IF IN SEC MODE
            LDI     0DH         ;ENABLE DT, DE, & KS
            PLO     R2
            LDI     0DH
            OR
            STR     R2
            LBR     FX53        ;BRANCH TO 53
FX52        LDI     08H         ;ENABLE KS
            PLO     R2
            OR
            STR     R2
EX53        LDI     31H         ;TEST TO SEE IF IN BC OR BS PRGM MODE
            PLO     R2
            LDN     R2
            ANI     03H
            LBZ     EX69        ;BRANCH TO 69 IF NOT IN BC OR BS PRGM MODE
            LDI     48H         ;TEST TO SEE IF ALL DIGITS FILLED
```

|       |       |        |                                               |
|-------|-------|--------|-----------------------------------------------|
|       | PLO   | R2     |                                               |
|       | LDN   | R2     |                                               |
|       | LBZ   | LOOP19 | ;BRANCH TO LOOP19 IF ALL DIGITS FILLED        |
|       | LBR   | LOOP20 | ;BRANCH TO LOOP20 IF DIGITS NOT FILLED        |
| EX69  | LDI   | 31H    | ;TEST TO SEE IF IN CV PRGM MODE               |
|       | PLO   | R2     |                                               |
|       | LDN   | R2     |                                               |
|       | ANI   | 04H    |                                               |
|       | LBZ   | EX71   | ;BRANCH TO 71 IF NOT IN CV PRGM MODE          |
|       | LDI   | 49H    | ;TEST TO SEE IF ALL DPS FILLED                |
|       | PLO   | R2     |                                               |
|       | LDN   | R2     |                                               |
|       | LBNZ  | EX110  | ;BRANCH TO 110 IF DPS NOT FILLED              |
|       | DEC   | R2     | ;TEST TO SEE IF ALL DIGITS FILLED             |
|       | LDN   | R2     |                                               |
|       | LBZ   | LOOP19 | ;BRANCH TO LOOP19 IF DPS AND DIGITS FILLED    |
|       | LBR   | LOOP20 | ;BRANCH TO LOOP20 IF DPS FLD/DIGITS NOT FLD   |
| EX110 | DEC   | R2     | ;TEST TO SEE IF ALL DIGITS FILLED             |
|       | LDN   | R2     |                                               |
|       | LBZ   | LOOP23 | ;BRANCH TO LOOP23 IF DPS NOT FLD/DIGITS FLD   |
|       | LBR   | LOOP21 | ;BRANCH TO LOOP21 IF DPS AND DIGITS NOT FLD   |
| EX71  | LDI   | 31H    | ;TEST TO SEE IF IN ID OR SEC PRGM MODE        |
|       | PLO   | R2     |                                               |
|       | LDN   | R2     |                                               |
|       | ANI   | 28H    |                                               |
|       | LBZ   | EX64   | ;BRANCH TO 64 IF NOT IN ID OR SEC PRGM MODE   |
|       | LDI   | 49H    | ;TEST TO SEE IF ALL DPS FILLED                |
|       | PLO   | R2     |                                               |
|       | LDN   | R2     |                                               |
|       | LBNZ  | EX114  | ;BRANCH TO 114 IF ALL DPS NOT FILLED          |
|       | DEC   | R2     | ;TEST TO SEE IF ALL DIGITS FILLED             |
|       | LDN   | R2     |                                               |
|       | LBZ   | LOOP19 | ;BRANCH TO LOOP19 IF DPS AND DIGITS FILLED    |
|       | LBR   | LOOP33 | ;BRANCH TO LOOP33 IF DPS FLD/DIGITS NOT FLD   |
| EX114 | DEC   | R2     | ;TEST TO SEE IF ALL DIGITS FILLED             |
|       | LDN   | R2     |                                               |
|       | LBZ   | LOOP23 | ;BRANCH TO LOOP23 IF DPS NOT FLD/DIGITS FLD   |
|       | LBR   | LOOP34 | ;BRANCH TO LOOP 34 IF DPS AND DIGITS NOT FLD  |
| EX64  | LDN   | R4     | ;TEST TO SEE IF DP BUTTON PUSHED              |
|       | SEX   | R4     |                                               |
|       | LDI   | 10H    |                                               |
|       | AND   |        |                                               |
|       | LBZ   | EX72   | ;BRANCH TO 72 IF DP NOT ENTERED               |
|       | LDI   | 34H    | ;TEST IF DP MEM SET                           |
|       | PLO   | R4     |                                               |
|       | LDN   | R4     |                                               |
|       | ANI   | 10H    |                                               |
|       | LBNZ  | EX112  | ;BRANCH TO 112 IF DP MEM SET                  |
|       | LDN   | R4     | ;SET DP MEM BIT                               |
|       | ORI   | 10H    |                                               |
|       | STR   | R4     |                                               |
|       | LDI   | 48H    | ;SET DIGIT COUNTER TO FOUR ENTRIES            |
|       | PLO   | R4     |                                               |
|       | LDI   | 04H    |                                               |
|       | STR   | R4     |                                               |
| EX112 | LDI   | 49H    | ;SUBTRACT 1 COUNT FROM DP COUNTER             |
|       | PLO   | R2     |                                               |
|       | SEX   | R2     |                                               |
|       | LDI   | 01H    |                                               |
|       | SD    |        |                                               |
|       | STXD  |        |                                               |
|       | DEC   | R2     | ;TEST TO SEE IF IN DP/COMMA MODE              |
|       | LDI   | 08H    |                                               |
|       | AND   |        |                                               |
|       | BNZ   | EX73   | ;BRANCH TO 73 IF IN COMMA MODE                |
|       | LDI   | 02H    | ;SET DP BIT IN 2702                           |
|       | PLO   | R2     |                                               |
|       | LDI   | 40H    |                                               |
|       | LBR   | EX74   | ;BRANCH TO 74                                 |
| EX73  | LDI   | 02H    | ;SET DP AND COMMA BITS IN 2702                |
|       | PLO   | R2     |                                               |
|       | LDI   | 0C0H   |                                               |
| EX74  | OR    |        |                                               |
|       | STR   | R2     |                                               |

```
              LDI     0AH         ;SET CONTROL WD OF DT FOR ALT FORMAT
              PLO     R2
              LDI     01H
              STR     R2
              LDI     53H         ;LOAD "READ" ADDR OF 8X8 TS INTO DT
              LDI     00H
              PLO     R2
              STXD
              STXD
              LDI     27H
              STXD
              LDI     00H
              STR     R2
              LDI     5BH         ;LOAD "WRITE" ADDR OF DISP INTO DT
              PLO     R2
              LDI     00H
              STXD
              STXD
              LDI     27H
              STXD
              LDI     0F1H
              STR     R2
              LDI     60H         ;LOAD # WDS TO BE XFERRED INTO DT
              PLO     R2
              LDI     08H
              STR     R2
              PLO     R2
              LDI     0DH         ;ENABLE DT, DE, & KS
              STR     R2
              LDI     48H         ;TEST IF ALL 0-9-ENTRIES HAVE BEEN MADE
              PLO     R2
              LDN     R2
              BZ      LOOP19      ;BRANCH TO LOOP 19 IF DIGITS FILLED
              BR      LOOP20      ;BRANCH TO LOOP 20 IF DIGITS NOT FILLED
EX32          LDN     R4          ;TEST TO SEE IF BID WAS ENTERED
              SEX     R4
              LDI     10H
              AND
              BZ      EX75        ;BRANCH TO 75 IF BID NOT ENTERED
              LDI     41H         ;SET ADDR CTR TO BID BLOCK
              PLO     R6
              LDI     0B8H
              STR     R6
              DEC     R6
              LDI     21H
              STR     R6
              LDI     34H         ;SET ID PRGM, CLEAR OTHER MODES
              PLO     R3
              SEX     R3
              LDI     02H
LOOP22        STXD
              LDI     00H
              STXD
              STXD
              LDI     08H
              STXD
              LDI     00H
              STR     R3
              LDI     0AH         ;SET CTL WD OF DT FOR MEM & DISP XFER
              PLO     R2
              LDI     06H
              STR     R2
              LDI     53H         ;LOAD READ ADDR. OF ID MEM BLK INTO DT
              PLO     R2
              SEX     R2
              LDN     R6
              STXD
              INC     R6
              LDN     R6
              STXD
              DEC     R6          ;LOAD "READ" ADD OF ID MEM BLK INTO DT
              LDN     R6
              STXD
```

```
        INC     R6
        LDN     R6
        STR     R2
        LDI     5BH         ;LOAD "WRITE" ADD OF DISP INTO DT
        PLO     R2
        LDI     27H
        STXD
        LDI     0F1H
        STXD
        LDI     27H         ;LOAD "WRITE" ADD AT 8X8 TS INTO DT
        STXD
        LDI     00H
        STR     R2
        LDI     34H         ;TEST TO SEE IF IN BID MODE
        PLO     R2
        LDI     02H
        AND
        LBZ     EX76        ;BRANCH TO 76 IF NOT IN BID MODE
        LDN     R6
        PLO     R2
        DEC     R6
        LDN     R6
        PHI     R2
        INC     R2
        INC     R2
        LDI     08H
        OR
        STXD
        LBR     EX77        ;BRANCH TO 77
EX76    LDI     34H         ;TEST TO SEE IF IN SID PRGM MODE
        PLO     R2
        LDI     04H
        AND
        LBZ     EX78        ;BRANCH TO 78 IF NOT IN SID MODE
        LDN     R6          ;SET "SUB" CURSOR OF SID MEM BLOCK
        PLO     R2
        DEC     R6
        LDN     R6
        PHI     R2
        INC     R2
        INC     R2
        LDI     10H
        OR
        STXD
        LBR     EX77        ;BRANCH TO 77
EX78    LDN     R6          ;SET "GRAND" CURSOR OF GID MEM BLK
        PLO     R2
        DEC     R6
        LDN     R6
        PHI     R2
        INC     R2
        INC     R2
        LDI     20H
        OR
        STXD
EX77    DEC     R2          ;SET "PROGRAM" CURSOR OF ID MEM BLOCK
        LDI     08H
        OR
        STR     R2
        LDI     62H         ;LOAD # WDS TO BE XFERRED FRMM MEM TO DIS
        PLO     R2
        LDI     27H
        PHI     R2
        LDI     08H
        STXD
        DEC     R2          ;LOAD # WDS TO BE XFRD FROM MEM TO 8X8 TS
        STR     R2
        PLO     R2          ;ENABLE DT, DE, & KS
        LDI     0DH
        OR
        STR     R2
        LDI     29H         ;WRITE BIT MASKS INTO 2725-2729
        PLO     R2
        LDI     00H
```

```
              STXD
              LDI     20H
              STXD
              LDI     0F0H
              STXD
              LDI     0F0H
              STXD
              LDI     0F0H
              STR     R2
              LDI     49H        ;PRESET MAX ENTRIES OF 0-9&-, DP
              PLO     R2
              LDI     05H
              STXD
              LDI     08H
              STR     R2
              LBR     EX13       ;BRANCH TO 13
EX75          LDN     R4         ;TEST TO SEE IF SID PB ENTERED
              SEX     R4
              LDI     08H
              AND
              LBZ     EX81       ;BRANCH TO 81 IF SID NOT ENTERED
              LDI     41H        ;SET ADDR CNTR TO SID MEM BLOCK
              PLO     R6
              LDI     0C0H
              STR     R6
              DEC     R6
              LDI     21H
              STR     R6
              LDI     34H        ;SET ID PRGM, CLEAR OTHER MODES
              PLO     R3
              SEX     R3
              LDI     04H
              LBR     LOOP22     ;BRANCH TO LOOP 22
EX81          LDI     41H        ;SET ADDR CNTR TO GID MEM BLOCK
              PLO     R6
              LDI     0C8H
              STR     R6
              DEC     R6
              LDI     21H
              STR     R6
              LDI     34H        ;SET ID PRGM, CLEAR OTHER MODES
              PLO     R3
              SEX     R3
              LDI     08H
              LBR     LOOP22
EX58          LDN     R4         ;TEST TO SEE IF = PB WAS PUSHED
              SEX     R4
              LDI     08H
              AND
              LBZ     EX82       ;BRANCH TO EX 82 IF = NOT ENTERED
              LDI     31H        ;TEST TO SEE IF IN CV PRGM MODE
              PLO     R2
              LDN     R2
              ANI     04H
              LBZ     EX115      ;BRANCH TO 115 IF NOT IN CV PRGM MODE
              LDI     08H        ;ENABLE MASTER/SLAVE COMMUNICATIONS
              PLO     R2
              LDN     R2
              ORI     02H
              STR     R2
              LDI     78H        ;SEND 1 CV BLOCK TO SLAVE
              PLO     R2
              LDN     R2
              ORI     20H
              STR     R2
LOOP35        LDI     40H        ;SEND BLOCK START. ADDR. TO SLAVE
              PLO     R6
              LDI     7BH
              PLO     R2
              SEX     R2
              LDN     R6
              STXD
              INC     R6
```

```
             LDN    R6
             STR    R2
             LDI    27H        ;TEST 2705-2707 FOR FF
             PHI    R5
             LDI    2CH
             PLO    R5
             LDI    03H
             STR    R5
             LDI    07H
             PLO    R2
LOOP38       LDN    R5
             LBZ    EX126      ;BRANCH TO 126 IF 2705-2707=FF
             LDN    R2
             XRI    0FFH
             LBNZ   ERR        ;BRANCH TO ERR IF 2705-2707 NOT = FF
             DEC    R2
             LDN    R5
             SMI    01H
             STR    R5
             LBR    LOOP38     ;BRANCH TO LOOP38
EX126        LDN    R2         ;TEST 2704 FOR F0
             XRI    0F0H
             LBNZ   ERR        ;BRANCH TO ERR IF 2704 NOT = F0
             LDI    01H        ;DEACTIVATE STATION
             PLO    R5
             LDN    R5
             LBZ    EX135      ;BRANCH TO 135 IF NOT AT STATIONS 1-8
             ANI    01H        ;TEST IF AT STATION 1
             LBZ    EX128      ;BRANCH TO 128 IF NOT AT STATION 1
             LDI    3CH        ;DEACTIVATE STATION 1
             PLO    R5
             LDN    R5
             ANI    0FEH
LOOP39       STR    R5
             LBR    EX88       ;BRANCH TO 88
EX128        LDN    R5         ;TEST IF AT STATION 2
             ANI    02H
             LBZ    EX129      ;BRANCH TO 129 IF NOT AT STATION 2
             LDI    3CH        ;DEACTIVATE STATION 2
             PLO    R5
             LDN    R5
             ANI    0FDH
             LBR    LOOP39     ;BRANCH TO LOOP39
EX129        LDN    R5         ;TEST IF AT STATION 3
             ANI    04H
             LBZ    EX130      ;BRANCH TO 130 IF NOT AT STATION 3
             LDI    3CH        ;DEACTIVATE STATION 3
             PLO    R5
             LDN    R5
             ANI    0FBH
             LBR    LOOP39     ;BRANCH TO LOOP39
EX130        LDN    R5         ;TEST IF AT STATION 4
             ANI    08H
             LBZ    EX131      ;BRANCH TO 131 IF NOT AT STATION 4
             LDI    3CH        ;DEACTIVATE STATION 4
             PLO    R5
             LDN    R5
             ANI    0F7H
             LBR    LOOP39     ;BRANCH TO LOOP39
EX131        LDN    R5         ;TEST IF AT STATION 5
             ANI    10H
             LBZ    EX132      ;BRANCH TO 132 IF NOT AT STATION 5
             LDI    3CH        ;DEACTIVATE STATION 5
             PLO    R5
             LDN    R5
             ANI    0EFH
             LBR    LOOP39     ;BRANCH TO LOOP39
EX132        LDN    R5         ;TEST IF AT STATION 6
             ANI    20H
             LBZ    EX133      ;BRANCH TO 133 IF NOT AT STATION 6
             LDI    3CH        ;DEACTIVATE STATION 6
             PLO    R5
             LDN    R5
```

```
              ANI     7FH
              LBR     LOOP39      ;BRANCH TO LOOP39
EX133         LDN     R5          ;TEST IF AT STATION 7
              ANI     40H
              LBZ     EX134       ;BRANCH TO 134 IF NOT AT STATION 7
              LDI     3DH         ;DEACTIVATE STATION 7
              PLO     R5
              LDN     R5
              ANI     0EH
              LBR     LOOP39      ;BRANCH TO LOOP39
EX134         LDI     3DH         ;DEACTIVATE STATION 8
              PLO     R5
              LDN     R5
              ANI     0DH
              LBR     LOOP39      ;BRANCH TO LOOP39
EX135         DEC     R5          ;TEST IF AT STATION 9
              LDN     R5
              ANI     01H
              LBZ     EX136
              LDI     3DH
              PLO     R5
              LDN     R5
              ANI     0BH
              LBR     LOOP39      ;BRANCH TO LOOP39
EX136         LDI     3DH         ;DEACTIVATE STATION 10
              PLO     R5
              LDN     R5
              ANI     07H
              LBR     LOOP39      ;BRANCH TO LOOP39
EX127         LDI     2CH         ;CHECK IF BT & GT = 00 FF FF FF
              PLO     R5
              LDI     03H
              STR     R5
              LDI     20H
              PHI     R2
              LDI     0FFH
              PLO     R2
LOOP40        LDN     R5
              LBZ     EX137       ;BRANCH TO 137 IF BT BLOCK 20FD-20FF=FF
              LDN     R2
              XRI     0FFH
              LBNZ    ERR         ;BRANCH TO ERR IF BT BLOCK 20FD-20FF NOT FF
              DEC     R2
              LDN     R5
              SMI     01H
              STR     R5
              LBR     LOOP40      ;BRANCH TO LOOP40
EX137         LDN     R2          ;TEST 20FC FOR 00
              LBNZ    ERR         ;BRANCH TO ERR IF BT BLOCK 20FC NOT = 00
              LDI     2CH
              PLO     R5
              LDI     03H
              STR     R5
              LDI     21H
              PHI     R2
              LDI     67H
              PLO     R2
LOOP41        LDN     R5
              LBZ     EX147       ;BRANCH TO 147 IF GT BLOCK 2165-2167=FF
              LDN     R2
              XRI     0FFH
              LBNZ    ERR         ;BRANCH TO ERR IF GT BLOCK 2165-2167 NOT FF
              DEC     R2
              LDN     R5
              SMI     01H
              STR     R5
              LBR     LOOP41      ;BRANCH TO LOOP41
EX147         LDN     R2          ;TEST 2164 FOR 00
              LBNZ    ERR         ;BRANCH TO ERR IF GT BLOCK 2164 NOT = 00
              LDI     0F9H        ;ACTIVATE STATION
              PLO     R2
              LDN     R2
              LBZ     EX138       ;BRANCH TO 138 IF NOT STATION 1-8
              ANI     01H         ;TEST IF AT STATION 1
```

```
              LBZ      EX139         ;BRANCH TO 139 IF NOT AT STATION 1
              LDI      3CH           ;ACTIVATE STATION 1
              PLO      R5
              LDN      R5
              ORI      04H
              LBR      LOOP39        ;BRANCH TO LOOP39
EX139         LDN      R2            ;TEST IF AT STATION 2
              ANI      02H
              LBZ      EX140         ;BRANCH TO 140 IF NOT AT STATION 2
              LDI      3CH           ;ACTIVATE STATION 2
              PLO      R5
              LDN      R5
              ORI      08H
              LBR      LOOP39        ;BRANCH TO LOOP39
EX140         LDN      R2            ;TEST IF AT STATION 3
              ANI      04H
              LBZ      EX141         ;BRANCH TO 141 IF NOT AT STATION 3
              LDI      3CH           ;ACTIVATE STATION 3
              PLO      R5
              LDN      R5
              ORI      10H
              LBR      LOOP39        ;BRANCH TO LOOP39
EX141         LDN      R2            ;TEST IF AT STATION 4
              ANI      08H
              LBZ      EX142         ;BRANCH TO 142 IF NOT AT STATION 4
              LDI      3CH           ;ACTIVATE STATION 4
              PLO      R5
              LDN      R5
              ORI      20H
              LBR      LOOP39        ;BRANCH TO LOOP39
EX142         LDN      R2            ;TEST IF AT STATION 5
              ANI      10H
              LBZ      EX143         ;BRANCH TO 143 IF NOT AT STATION 5
              LDI      3CH           ;ACTIVATE STATION 5
              PLO      R5
              LDN      R5
              ORI      40H
              LBR      LOOP39        ;BRANCH TO LOOP39
EX143         LDN      R2            ;TEST IF AT STATION 6
              ANI      20H
              LBZ      EX144         ;BRANCH TO 144 IF NOT AT STATION 6
              LDI      3CH           ;ACTIVATE STATION 6
              PLO      R5
              LDN      R5
              ORI      80H
              LBR      LOOP39        ;BRANCH TO LOOP39
EX144         LDN      R2            ;TEST IF AT STATION 7
              ANI      40H
              LBZ      EX145         ;BRANCH TO 145 IF NOT AT STATION 7
              LDI      3DH           ;ACTIVATE STATION 7
              PLO      R5
              LDN      R5
              ORI      01H
              LBR      LOOP39        ;BRANCH TO LOOP39
EX145         LDI      3DH           ;ACTIVATE STATION 8
              PLO      R5
              LDN      R5
              ORI      02H
              LBR      LOOP39        ;BRANCH TO LOOP39
EX138         LDI      0FAH          ;TEST IF AT STATION 9
              PLO      R2
              LDN      R2
              ANI      01H
              LBZ      EX146         ;BRANCH TO 146 IF NOT AT STATION 9
              LDI      3DH           ;ACTIVATE STATION 9
              PLO      R5
              ORI      04H
              LBR      LOOP39        ;BRANCH TO LOOP39
EX146         LDI      3DH           ;ACTIVATE STATION 10
              PLO      R5
              LDN      R5
              ORI      08H
              LBR      LOOP39        ;BRANCH TO LOOP39
EX115         LDI      31H           ;TEST TO SEE IF IN BS PRGM MODE
              PLO      R2
```

```
              LDN     R2
              ANI     02H
              LBZ     EX116       ;BRANCH TO 116 IF NOT IN BC PRGM MODE
              LDI     08H         ;ENABLE MASTER/SLAVE COMMUNICATIONS
              PLO     R2
              LDN     R2
              ORI     02H
              STR     R2
              LDI     78H         ;SEND 1 BS BLOCK TO SLAVE
              PLO     R2
              LDN     R2
              ORI     40H
              STR     R2
              LBR     LOOP35      ;BRANCH TO LOOP35
EX116         LDI     31H         ;TEST TO SEE IF IN BS OR ID PRGM MODE
              PLO     R2
              LDN     R2
              ANI     09H
              LBZ     EX91        ;BRANCH TO 91 IF NOT IN BC OR ID PRGM MODE
              LBR     EX88        ;BRANCH TO 88
              LDI     45H         ;SET LOOP COUNTER FOR 7 LOOPS
              PLO     R2
              LDI     07H
              STR     R2
              PLO     R4
LOOP25        LDN     R2          ;SHOULD BE 2704-2707
              LBZ     EX84
              LDN     R4
              XRI     0FFH
              LBN7    EX85
              DEC     R4
              LDI     01H
              SD
              STR     R2
              LBR     LOOP25
EX84          LDN     R4          ;TEST TO SEE IF 10 & 10 = 00
              SEX     R4
              ANI     0FFH
              LBZ     EX86        ;BRANCH TO EX86 IF YES
              LDI     0FH         ;TEST TO SEE IF 10 & 10 = F0
              OR
              XRI     0FFH
              LBN7    EX85        ;BRANCH TO EX85 IF NOT
EX86          LDI     41H         ;PUT ADDR OF CUR MEM BLK INTO R2
              PLO     R6
              LDN     R6
              PLO     R2
              DEC     R6
              LDN     R6
              PHI     R2
              INC     R2
              INC     R2
              LDI     4CH         ;STORE CV BLK CURSOR 7,8,9,10 INTO 274C
              PLO     R3
              SEX     R3
              LDN     R2
              ANI     03H
              SHL
              SHL
              STR     R3
              RSHR
              DEC     R2
              LDN     R2
              ANI     0C0H
              RSHR
              RSHR
              RSHR
              RSHR
              RSHR
              RSHR
              OR
              XRI     0FFH
              STR     R3
              DEC     R3          ;STORE CV BLK CUR. 1-6 TO 274B, BITS 2-7
```

```
        LDN     R2
        SHL
        SHL
        XRI     0FFH
        STR     R3
        LDI     3DH         ;DEACTIVATE APPROP STA WDS 273C,273D
        PLO     R4
        SEX     R4
        INC     R3
        LDN     R3
        AND
        STXD
        DEC     R3
        LDN     R3
        AND
        STR     R4
        LDI     00H         ;CLEAR CURSOR 1-10, OF CV MEM BLK
        STR     R2
        SEX     R2
        INC     R2
        LDI     0FCH
        AND
        STR     R2
        GLO     R2          ;CALC ADDR OF BS BLOCK
        ADI     50H
        PLO     R2
        LDI     0FCH        ;CLEAR CURSOR 9 & 10 OF BS BLK
        AND
        STXD                ;CLEAR CURSOR 1-8 OF BS BLK
        LDI     00H
        STR     R2
        GLO     R2          ;CALC ADDR OF BT BLOCK
        ADI     50H
        PLO     R2
        LDI     00H         ;CLEAR CURSOR 1-8 OF BT BLOCK
        STR     R2
        INC     R2          ;CLEAR CURSOR 9-10 OF BT BLOCK
        LDI     0FCH
        AND
        STR     R2
        GLO     R2          ;CALC. ADDR OF GT BLOCK
        SDI     98H
        PLO     R2
        LDI     21H
        PHI     R2
        LDN     R2          ;CLEAR SURSOR 9, 10, OF GT BLOCK
        ANI     0FCH
        STXD
        LDI     00H         ;CLEAR CURSOR 1-8 OF GT BLOCK
        STR     R2
        GLO     R2          ;CALC ADDR OF BC BLOCK
        ADI     60H
        PLO     R2
        LDI     00H         ;CLEAR CURSOR 1-8 OF BC BLOCK
        STR     R2
        INC     R2          ;CLEAR CURSOR 9, 10, OF BC BLOCK
        LDI     0FCH
        AND
        STR     R2
        LBR     EX87        ;BRANCH TO EX87 TO PUT BT TO DISPL & SET BIT
EX85    LDI     02H         ;TEST TO SEE IF DP/CMA #5 IS SET
        PLO     R2
        LDI     000H
        AND
        LBNZ    EX88        ;BRANCH TO 88 IF DP/CMA 5 ARE SET
        INC     R2          ;TEST TO SEE IF DP/CMA 1-4 ARE SET
        INC     R2
        LDI     0FFH
        AND
        LBNZ    EX88        ;BRANCH TO 88 IF DP/CMA 1-4 ARE SET
        LDI     00H         ;SET # BIT IN 8 X 8 TS
        PLO     R2
        LDI     04H
```

```
              STR      R2
              BR       EX89         ;BRANCH TO EX89
EX88          LDI      00H          ;SET PRGM BIT IN 8X8 TS
              PLO      R2
              SEX      R2
              LDI      08H
              STR      R2
EX89          LDI      0AH          ;SET CONTROL WD OF DT FOR MEM XFER & DISP
              PLO      R2
              LDI      09H
              STR      R2
              LDI      53H          ;LOAD "READ" ADDR OF 8 X 8 TS INTO DT
              PLO      R2
              LDI      27H
              STXD
              LDI      01H
              STXD
              LDI      20H          ;LOAD READ ADDR OF BT MEM BLK INTO DT
              STXD
              LDI      0F8H
              STR      R2
              LDI      5BH          ;LOAD "WRITE" ADDR OF MEM BLK  INTO DT
              PLO      R2
              LDI      40H
              PLO      R6
              LDN      R6
              STXD
              INC      R6
              LDN      R6
              ANI      01H
              STXD
              LDI      27H          ;LOAD "WRITE" ADDR OF DIPL INTO DT
              STXD
              LDI      0F1H
              STR      R2
              LDI      62H          ;LOAD # WDS TO BE XFERRED FROM 8 X 8 TO MEM.
              PLO      R2
              LDI      07H
              STXD
              DEC      R2           ;LOAD # WDS TO BE XFERRED FROM 8X8 TO DISPL
              LDI      08H
              STR      R2
              LBR      EX90         ;BR TO EX90 TO RESET MODE, PB & BIT MASK WDS
EX87          LDI      0AH          ;SET CTL WD OF DT FOR ALT FORMAT, 1 SEQ.
              PLO      R2
              LDI      02H
              STR      R2
              LDI      53H          ;LOAD "READ" ADDR OF BT MEM BLK INTO DT
              PLO      R2
              LDI      20H
              STXD
              LDI      0F8H
              STR      R2
              LDI      5BH          ;LOAD "WRITE" ADDR OF DISP INTO DT
              PLO      R2
              LDI      27H
              STXD
              LDI      0F1H
              STR      R2
              LDI      62H          ;LOAD # WDS TO BE XFERRED FRM BT BLK TO DIS
              PLO      R2
              LDI      08H
              STR      R2
EX90          LDI      0F8H         ;SET ADDR CTR TO T MEM BLK STARTG ADDR
              STR      R6
              DEC      R6
              LDI      20H
              STR      R6
              LDI      34H          ;SET PB & MODE MEM BITS IN 2730-2734
              PLO      R2
              LDI      00H
              STXD
              STXD
              LDI      02H
```

```
        STXD
        LDI     00H
        STXD
        LDI     02H
        STXD
        LDI     29H        ;SET BIT MASKS IN 2725-2729
        PLO     R2
        LDI     0FCH
        STXD
        LDI     00H
        STXD
        STXD
        LDI     04H
        STXD
        LDI     0CH
        STR     R2
        LDI     08H        ;ENABLE DE, DT, KS
        PLO     R2
        LDI     0DH
        OR
        STR     R2
        LBR     EX13       ;BRANCH TO END OF STATUS
EX83    LDI     0BH        ;TEST TO SEE IF IN BS MODE WHN = IS PUSHD
        AND
        LBZ     EX91       ;BRANCH TO EX91 IF NOT IN BC, BS ID MODE
        LBR     EX88       ;BRANCH TO EX88 IF IN BS, BC ID MODE
EX91    LDI     20H        ;TEST TO SEE IF IN SEC. PRGM MODE
        AND
        LBZ     EX13       ;BRANCH TO END OF STATUS IF NOT
        LDI     42H        ;READ MACH. "STATUS" INPUTS
        PLO     R2
        LDI     30H
        STR     R2
        OUT     1
        INP     7
        STR     R2
        LDI     04H        ;TEST TO SEE IF BATT IS LOW OR DISC.
        AND
        LBNZ    EX92       ;BRANCH TO 92 IF BATT IS NOT LOW
        LDI     41H        ;LOAD SEC. BLK ADDR INTO 2740 & 2741
        PLO     R6
        LDI     0E8H
        STR     R6
        DEC     R6
        LDI     27H
        STR     R6
        LDI     40H        ;SET BIT 0 OF SEC. CTL. WD
        PLO     R2
        LDI     01H
        STR     R2
        LBR     EX88       ;BRANCH TO EX88 TO FINISH ROUTINE
EX92    LDI     45H        ;DET. IF DATA IN 8X8 TS IS SAME IN SEC.
        PLO     R4
        LDI     08H
        LDI     07H
        PLO     R3
        LDI     0EFH
        PLO     R2
        LDI     42H
        PLO     R5
        LDI     00H
        STR     R5
LOOP26  LDN     R4
        LRZ     EX92       ;BRANCH TO 92
        LDN     R3
        SD
        LBZ     EX93       ;BRANCH TO 93
        LDI     01H
        STR     R5
EX93    DEC     R2
        DEC     R3
        LDN     R4
        SDI     01H
```

|       |       |        |                                            |
|-------|-------|--------|--------------------------------------------|
|       | STR   | R4     |                                            |
|       | LBR   | LOOP26 | ;BRANCH TO LOOP26                          |
|       | LDN   | R5     |                                            |
|       | LBZ   | EX94   | ;BRANCH TO 94 IF NO ERROR HAS OCCURRED     |
|       | LDI   | 4FH    |                                            |
|       | LDI   | 4FH    | ;SET ERROR FLAG BIT                        |
|       | PLO   | R2     |                                            |
|       | LDN   | R2     |                                            |
|       | ORI   | 02H    |                                            |
|       | STR   | R2     |                                            |
|       | LDI   | 08H    | ;ENABLE ERROR ROUTINE & KS OF 2708         |
|       | PLO   | R2     |                                            |
|       | LDN   | R2     |                                            |
|       | ORI   | 18H    |                                            |
|       | LDI   | 34H    |                                            |
|       | PLO   | R2     |                                            |
|       | LDI   | 00H    |                                            |
|       | STXD  |        |                                            |
|       | STXD  |        |                                            |
|       | STXD  |        |                                            |
|       | LDI   | 40H    |                                            |
|       | STXD  |        |                                            |
|       | LDI   | 00H    | ;WRITE BIT MASKS INTO 2725-2729            |
|       | STXD  |        |                                            |
|       | STXD  |        |                                            |
|       | STXD  |        |                                            |
|       | LDI   | 10H    |                                            |
|       | STXD  |        |                                            |
|       | LDI   | 00H    |                                            |
|       | STR   | R2     |                                            |
|       | LBR   | EX13   | ;BRANCH TO 13                              |
| EX94  | LDI   | 4DH    | ;ENABLE GRAND-C CLEARING OF                |
|       | PLO   | R2     |                                            |
|       | LDI   | 03H    |                                            |
|       | STR   | R2     |                                            |
|       | LBR   | EX88   | ;BRANCH TO EX88 TO FINISH ROUTINE          |
| EX72  | LDN   | R4     | ;TEST TO SEE IF MOTOR PB ENTERED           |
|       | SEX   | R4     |                                            |
|       | LDI   | 08H    |                                            |
|       | AND   |        |                                            |
|       | LBZ   | EX13   | ;BRANCH TO 13 IF MOTOR PB NOT ENTERED      |
|       | LDI   | 47H    | ;CHECK STATUS OF MOTOR                     |
|       | PLO   | R2     |                                            |
|       | LDN   | R2     |                                            |
|       | ANI   | 10H    |                                            |
|       | LBZ   | EX123  | ;BRANCH TO 123 IF MOTOR IS OFF             |
|       | LDI   | 08H    | ;ENABLE MASTER/SLAVE COMMUNICATIONS        |
|       | PLO   | R2     |                                            |
|       | LDN   | R2     |                                            |
|       | ORI   | 02H    |                                            |
|       | LDI   | 78H    | ;SEND MOTOR STOP WORD TO SLAVE             |
|       | PLO   | R2     |                                            |
|       | LDN   | R2     |                                            |
|       | ORI   | 02H    |                                            |
|       | LBR   | EX13   | ;BRANCH TO 13                              |
| EX123 | LDI   | 47H    | ;TURN MOTOR ON                             |
|       | PLO   | R2     |                                            |
|       | LDN   | R2     |                                            |
|       | ORI   | 10H    |                                            |
|       | STR   | R2     |                                            |
|       | LDI   | 78H    |                                            |
|       | PLO   | R2     |                                            |
|       | LDN   | R2     |                                            |
|       | ORI   | 01H    |                                            |
|       | STR   | R2     |                                            |
|       | LBR   | EX13   | ;BRANCH TO 13                              |
| EX122 | LDI   | 2AH    | ;REQUEST/RECEIVE BITS = 0?                 |
|       | PLO   | R2     |                                            |
|       | LDN   | R2     |                                            |
|       | LBNZ  | EX118  | ;BRANCH TO 118 IF REQ./REC. BITS NOT ZERO  |
| LOOP36| LDI   | 01H    | ;SET BT BLOCKS REQUEST BIT                 |
|       | STR   | R2     |                                            |
| LOOP37| LDI   | 08H    | ;ENABLE MASTER/SLAVE COMMUNICATIONS        |

```
                PLO     R2
                LDN     R2
                ORI     02H
                STR     R2
                LDI     78H             ;REQUEST BT BLOCKS FROM SLAVE
                PLO     R2
                LDN     R2
                ORI     08H
                STR     R2
                LBR     EX45            ;BRANCH TO 45
EX118           LDN     R2              ;TEST TO SEE IF REQUEST BIT IS SET
                ANI     01H
                LBZ     EX119           ;BRANCH TO 119 IF BT REQ. BIT NOT SET
                LDI     02H             ;CLEAR BT REQ. BIT, SET BT REC. BIT
                STR     R2
                LDI     68H             ;SET TIMER FOR 250 MS
                PLO     R2
                LDI     0EH
                STR     R2
                LDI     60H             ;ENABLE DT FOR 8 WDS. ALT. FORMAT
                PLO     R2
                LDI     08H
                STR     R2
                LDI     0AH
                PLO     R2
                LDI     01H
                STR     R2
                LDI     09H             ;ENABLE REMOTE BATCH TOTAL DISPLAY ROUTINE
                PLO     R2
                LDN     R2
                ORI     01H
                STR     R2
                LBR     EX45            ;BRANCH TO 45
EX119           LDN     R2              ;TEST TO SEE IF BT RECEIVED BIT SET
                ANI     02H
                LBZ     EX120           ;BRANCH TO 120 IF BT REC. BIT SET
                LDI     68H             ;TEST TO SEE IF TIMER HAS TIMED OUT
                PLO     R2
                LDN     R2
                LBNZ    EX45            ;BRANCH TO 45 IF TIMER NOT TIMED OUT
                LDI     2AH             ;CLEAR BT REC. BIT, SET BC REQ. BIT
                PLO     R2
                LDI     04H
                STR     R2
                LDI     08H             ;ENABLE MASTER/SLAVE COMMUNICATIONS
                PLO     R2
                LDN     R2
                ORI     02H
                STR     R2
                LDI     78H             ;REQUEST BC BLOCKS FROM SLAVE
                PLO     R2
                LDN     R2
                ORI     04H
                STR     R2
                LBR     EX45            ;BRANCH TO 45
EX120           LDN     R2              ;TEST TO SEE IF BC REQ. BIT SET
                ANI     04H
                LBZ     EX121           ;BRANCH TO 121 IF BC REQ. BIT NOT SET
                LDI     08H             ;CLEAR BC REQ. BIT, SET BC REC. BIT
                STR     R2
                LDI     68H             ;SET TIMER FOR 250 MS
                PLO     R2
                LDI     0EH
                STR     R2
                LDI     60H             ;ENABLE DT FOR 8 WDS. ALT. FORMAT
                PLO     R2
                LDI     08H
                STR     R2
                LDI     0AH
                PLO     R2
                LDI     01H
                STR     R2
                LBR     EX45            ;BRANCH TO 45
EX121           LDN     R2              ;TEST TO SEE IF BC REC. BIT SET
```

```
              ANI       08H
              LBZ       LOOP36      ;BRANCH TO LOOP36 IF BC REC. BIT NOT SET
              LDI       68H         ;TEST TO SEE IF TIMER HAS TIMED OUT
              PLO       R2
              LDN       R2
              LBNZ      EX45        ;BRANCH TO 45 IF TIMER NOT TIMED OUT
              LDI       2AH         ;CLEAR BC REC. BIT, SET BT REQ. BIT
              PLO       R2
              LDI       01H
              STR       R2
              LBR       LOOP37      ;BRANCH TO LOOP37
EX13          NOP
EX45          NOP
EX39          NOP
EX43          NOP
EX61          NOP
EX82          NOP
              END
;                   5TH SECTION - COMPLETE
;
;
;
;
;                   COMP          MARCH 29, 1984
;
;
;                   RB = 2790H = OLD KYBD DATA
;                   R7 = 2791H = CHANGED KYBD DATA
;                        276AH = TIMER FOR 1 SEC NO KEY
;
;
              GLOBAL    DTAXFR
              ORG       1100H
COMP          LDI       68H
              PLO       RF
              LDI       21H
              PHI       RF
CKBIT         LDN       RF          ;GET BAG STOP COMPLETE BIT
              ANI       20H
              LBNZ      PRGOUT      ;YES, DO NOT PRINT
              GLO       RF
              ADI       08H         ;INDEX TO NEXT BAG STOP
              PLO       RF
              XRI       0B8H        ;DONE ALL STATIONS?
              BNZ       CKBIT       ;NO
              LDI       90H
              PLO       RB
              LDI       91H
              PLO       R7
              LDI       0A0H
              PLO       RF
              LDI       27H
              PHI       RB          ;RB = 2790H = OLD KEY DATA
              PHI       R7          ;R7 = 2791H = CHANGED DATA
              PHI       RF          ;RF = 27A0H = DEBOUNCE KEY BIT
              LDN       RF
              ANI       10H
              BNZ       KEYRL       ;COMP KEY USED CHECK IF RELEASED
              LDN       RF
              ANI       80H         ;KEY USED?
              BNZ       CHKKEY      ;YES
              LBR       PRGOUT      ;NO
KEYRL         LDN       RF
              ANI       40H         ;KEY WAS RELEASED?
              SEX       RB
              XOR
              STR       R7          ;SAVE CHANGED DATA
              LDN       RF
              STR       RB          ;SAVE NEW KEY DATA
              XRI       0FFH
              SEX       R7
              AND                   ;ANY HI TO LO TRANSITION
              ANI       40H         ;CHECK IF KEY IS OK
```

|          | BNZ  | SETTIME | ;CHECK WHICH KEY |
|----------|------|---------|------------------|
|          | LDI  | 6AH     |                  |
|          | PLO  | R2      |                  |
|          | LDI  | 27H     |                  |
|          | PHI  | R2      | ;ADDRESS TIMER   |
|          | LDN  | R2      |                  |
|          | LBNZ | PRGOUT  | ;NOT TIMED OUT YET GO ON |
|          | BR   | DOPRNT  | ;TIMED OUT, SET UP PRINTER |
| CHKKEY   | LDI  | 21H     |                  |
|          | PLO  | RF      |                  |
|          | LDI  | 27H     |                  |
|          | PHI  | RF      | ;SET RF = 2721H = BATCH KEY LOCATION |
|          | LDN  | RF      |                  |
|          | ANI  | 04H     | ;BATCH KEY USED? |
|          | BNZ  | SETBTCH | ;YES             |
|          | INC  | RF      |                  |
|          | LDN  | RF      |                  |
|          | ANI  | 04H     | ;SUB KEY USED?   |
|          | BNZ  | SETSUB  | ;YES             |
|          | INC  | RF      |                  |
|          | LDN  | RF      |                  |
|          | ANI  | 04H     | ;GRAND COMPLETE KEY USED? |
|          | BNZ  | SETGND  | ;YES             |
|          | LDI  | 4DH     |                  |
|          | PLO  | RF      | ;ADDRESS COMP KEY REG |
|          | LDN  | RF      |                  |
|          | ANI  | OEFH    | ;RESET COMP KEY USED |
|          | STR  | RF      |                  |
|          | LBR  | PRGOUT  | ;NO VALID KEY    |
| SETBTCH  | LDI  | 26H     |                  |
|          | PLO  | RF      | ;RF = BIT MASK FOR BATCH OK NEXT KEYSCAN |
|          | LDI  | 04H     |                  |
|          | STR  | RF      | ;SET BATCH       |
|          | INC  | RF      |                  |
|          | STR  | RF      | ;SET SUB OK ALSO |
|          | LDI  | 35H     |                  |
|          | PLO  | R2      | ;SET LO ADDRESS FOR NO OF PRINTS FOR BATCH |
|          | BR   | PRNTNO  |                  |
| SETSUB   | LDI  | 27H     |                  |
|          | PLO  | RF      | ;SET RF = SUB KEY MASK |
|          | LDI  | 04H     |                  |
|          | STR  | RF      | ;SUB OK FOR NEXT KEY SCAN |
|          | INC  | RF      |                  |
|          | STR  | RF      | ;GRAND OK ALSO   |
|          | LDI  | 36H     |                  |
|          | PLO  | R2      | ;SET LO ADDRESS FOR NO OF SUB PRINTS |
|          | BR   | PRNTNO  |                  |
| SETGND   | LDI  | 28H     |                  |
|          | PLO  | RF      | ;SET RF = BIT MASK FOR GRAND NEXT SCAN |
|          | LDI  | 04H     |                  |
|          | STR  | RF      | ;GRAND ONLY OK   |
|          | LDI  | 37H     |                  |
|          | PLO  | R2      | ;SET R2 = NO. OF GRAND PRINTS |
| PRNTNO   | LDI  | 27H     |                  |
|          | PHI  | R2      |                  |
|          | LDN  | R2      |                  |
|          | ADI  | 01H     | ;ADD 1 COUNT TO NO OF PRINTS |
|          | STR  | R2      |                  |
|          | LDI  | 0A0H    |                  |
|          | PLO  | RF      |                  |
|          | LDN  | RF      |                  |
|          | ORI  | 10H     | ;SET CODE FOR COMP KEY USED |
|          | STR  | RF      |                  |
|          | LBR  | PRGOUT  |                  |
| SETTIME  | LDN  | RF      |                  |
|          | XRI  | 10H     | ;RESET COMP KEY USED CODE |
|          | STR  | RF      |                  |
|          | LBR  | PRGOUT  |                  |
| DOPRNT   | LDI  | 72H     |                  |
|          | PLO  | RB      |                  |
|          | LDI  | 27H     |                  |
|          | PHI  | RA      |                  |
|          | PHI  | RB      | ;RB = 2772H = ADDRESS OF DATA TO BE ADDED TO |

```
                LDI     70H
                PLO     RA          ;RA = 2770H = ADDRESS OF DATA TO ADD
                LDI     0A4H
                STR     RA          ;SET UP ADDRESSES FOR ADD ROUTINE
                INC     RA
                LDI     20H         ;SET UP HI ADDRESS OF ADDER
                STR     RA
                DEC     RA          ;BACK TO INITIAL LO ADDRESS OF ADDER
                LDI     0CH
                STR     RB          ;LO ADDRESS OF ADDED TO DATA
                INC     RB
                LDI     21H
                STR     RB          ;SET HI ADDRESS OF ADDED TO DATA
                DEC     RB          ;SET UP LO ADDRESS OF ADDED TO
                LDI     01H
                PLO     RC
                LDI     13H
                PHI     RC          ;SET RC = 1301H = PROGRAM ADDRESS OF ADD
READ            SEP     RC          ;GO TO ADD ROUTINE
                LDN     RA
                ADI     08H         ;INCREMENT ADDRESS TO NEXT COIN WORD
                STR     RA
                LDN     RB
                ADI     08H
                STR     RB          ;UP ADDED TO BY 8 BYTES
                XRI     6CH         ;END OF ADD?
                BNZ     READ        ;NO
                LDI     0FCH
                STR     RA          ;GET BATCH TOTAL ADDRESS
                LDI     04H
                STR     RB          ;SET RB = SUB TOTAL ADDRESS
                SEP     RC          ;ADD BATCH TOTAL TO SUB TOTAL
XFRBTCH         LDI     0A0H
                PLO     RF
                LDI     20H
                PHI     RF          ;SET RF = 20A0H= START OF BATCH
                LDI     08H
                PLO     RE
                LDI     21H
                PHI     RE          ;SET RE = 2108H = START OF GRAND
MOVDT           LDA     RF
                STR     RE          ;STORE 1ST BYTE
                INC     RE
                LDA     RF
                STR     RE          ;2ND BYTE
                INC     RE
                LDA     RF
                STR     RE          ;3RD BYTE
                INC     RE
                LDA     RF
                STR     RE          ;4TH BYTE
                GLO     RF
                XRI     0FCH        ;END OF BATCH?
                LBZ     SUBFILL     ;YES
                GLO     RF
                ADI     04H         ;UPDATE RF
                PLO     RF
                GLO     RE
                ADI     05H         ;UPDATE RE
                PLO     RE
                LBR     MOVDT
SUBFILL         LDI     0F8H
                PLO     RF
                LDI     00H
                PLO     RE          ;FILL SUB CURSOR, ETC
                LDA     RF
                STR     RE          ;1ST BYTE
                INC     RE
                LDA     RF
                STR     RE          ;2ND BYTE
                INC     RE
                LDA     RF
                STR     RE          ;3RD BYTE
```

```
                INC     RE
                LDA     RF
                STR     RE              ;4TH BYTE
                DEC     RE              ;GO TO TOTAL CURSORS
                LDN     RE
                XRI     18H             ;RESET BATCH, SET SUB TOTAL CURSOR
                STR     RE
GNDSET          LDI     0AH
                PLO     RF              ;SET GRAND TOTAL CURSOR
                LDI     21H
                PHI     RF              ;FOR ALL GRAND TOTALS
STRAGN          LDN     RF
                XRI     28H             ;RESET BATCH, SET GRAND
                STR     RF
                GLO     RF              ;UPDATE ADDRESS
                ADI     08H
                PLO     RF
                XRI     6AH
                BNZ     STRAGN
XFRLOC          LDI     00H
                PLO     RF
                LDI     20H
                PHI     RF
                LDI     21H
                PHI     RE
                LDI     0D0H            ;SET RE = 21D0H = NEW ADDRESS FOR XFR
                PLO     RE
MOVDTA          LDN     RF
                STR     RE              ;MOVE DATA TO PRINT LOCATION
                INC     RF
                INC     RE
                GLO     RF              ;TEST FOR END OF XFR
                XRI     0D0H
                BNZ     MOVDTA          ;NO
                GHI     RF
                XRI     20H             ;20D0H?
                BZ      MOVDTA          ;YES, CONTINUE XFR
                LDI     20H
                PHI     RE
                LDI     0A4H
                PLO     RE
CLRTOT          LDI     00H
                STR     RE
                INC     RE
                LDI     0FFH            ;STORE 00 FF FF FF IN RAM DATA
                STR     RE
                INC     RE
                STR     RE
                INC     RE
                STR     RE              ;DONE 4 BYTES NOW
                GLO     RE
                XRI     0FFH            ;END OF BATCH TOTALS
                LBZ     DOSUB           ;YES
                GLO     RE
                XRI     07H             ;END OF SUB?
                LBZ     CKGND           ;YES
                GLO     RE
                XRI     67H             ;END OF GRAND TOTALS
                LBZ     CLR3ID          ;YES, CLEAR ALL 3 IDS
INCADR          GLO     RE              ;INCREMENT ADDRESS TO NEXT STATION
                ADI     05H
                PLO     RE
                LBR     CLRTOT          ;GO BACK FOR NEXT COIN
CLR3ID          LDI     03H
                PLO     RF              ;SET LOOP CTR = 3 IDS TO CLEAR
                BR      DOID
CLR1ID          LDI     01H
                PLO     RF              ;SET CTR = 1 FOR BATCH ONLY
                BR      CKGND
DOSUB           LDI     36H
                PLO     RC
                LDI     27H
                PHI     RC              ;SET RC = 2736H = NO. OF SUB PRINTS
```

```
                LDN     RC
                BZ      CLR11D          ;NO SUB THEN DO ONLY BTCH
                LDI     02H
                PLO     RF              ;SET CTR = 2 FOR BTCH, SUB
                LDI     21H
                PHI     RE              ;SET RE = 2100S
                LDI     04H
                PLO     RE              ;SET RE = 2104H
                LBR     CLRTOT
CKGND           LDI     37H
                PLO     RC
                LDI     27H
                PHI     RC              ;SET RC = NO. OF GRAND PRINTS
                LDN     RC
                BZ      CLRID           ;CLEAR ONLY BTCH AND SUB
                LDI     21H
                PHI     RE
                LDI     0CH
                PLO     RE
                BR      CLRTOT          ;DO ONLY BTCH AND SUB
CLRID           LDI     02H
                PLO     RF              ;SET LOOP CTR = 2 FOR BTCH AND SUB
DOID            LDI     0BCH
                PLO     RE
CLRAGN          LDI     00H
                STR     RE
                INC     RE
                LDI     0FFH            ;CLEAR ID TO 00 FF FF FF
                STR     RE
                INC     RE
                STR     RE
                INC     RE
                STR     RE
                GLO     RE              ;INCREMENT TO NEXT ID
                ADI     05H
                PLO     RE              ;SAVE ADDRESS
                DEC     RF
                GLO     RF
                BNZ     CLRAGN          ;NO
GOPRNT          LDI     40H
                PLO     RF
                LDI     27H
                PHI     RF
                LDI     20H             ;HI ADDRESS OF DATA TO BE DISPLAYED
                STR     RF
                INC     RF
                LDI     0F8H            ;LO ADDRESS OF BATCH TOTAL TO DISPLAY
                STR     RF
                LDI     30H
                PLO     RF
                LDI     02H             ;RF = 2730H = BATCH DISPLAU ENABLED
                STR     RF
                LDI     50H
                PLO     RF
                LDI     0F8H            ;2750 = LO ADDDRESS OF READ DATA
                STR     RF
                INC     RF
                LDI     20H
                STR     RF
                LDI     58H             ;2758H = WRITE ADDRESS FOR DATA XFR
                PLO     RF
                LDI     0F1H            ;DISPLAY LO ADDRESS
                STR     RF
                INC     RF
                LDI     27H             ;27F1H = WRITE ADDRESS OF DISPLAY WORDS
                STR     RF
                LDI     60H
                PLO     RF              ;2760H = NO OF WORDS TO XFR
                LDI     08H
                STR     RF              ;XFR 8 WORDS
                LDI     0AH
                PLO     RF
                LDI     01H             ;01H = ALTERNATE XFR IN 270AH
```

```
              STR      RF
              LDI      08H
              PLO      RF            ;RF = 2708H = PROGRAM WORD
              LDI      0FH
              STR      RF            ;0FH = KEYSCAN, DISPLAY, DATA XFR, AND COMM
              LDI      78H
              PLO      RF
              LDI      10H           ;DATA COMM WORD CONTROL
              STR      RF
              INC      RF
              LDI      0C2H          ;SEND BATCH COMPLETE WORD TO SLAVE
              STR      RF
              LDI      25H
              PLO      RF            ;RF = BIT MASK
              LDI      0CH
              STR      RF
              LDI      29H
              PLO      RF
              LDI      0FCH          ;RF = BIT MASK FOR AFTER PRINT
              STR      RF
              LDI      09H
              PLO      RF            ;RF = 2709H = PRINTER BUSY
              LDN      RF
              XRI      02H           ;SET BUSY CODE
              STR      RF
              LDI      35H
              PLO      RF
              LDI      00H           ;RESET NO OF PRINTS
              STR      RF
              INC      RF
              STR      RF
              INC      RF
              STR      RF
              LDI      0A0H
              PLO      RF
              LDN      RF            ;GET GRAND CLEAR REG
              ORI      02H           ;SET GRAND CLEAR
              STR      RF
PRGOUT        LBR      DTAXFR
              END
                       SECTION   SEC6
;
;
;
;                      6TH SECTION    ADD ROUTINE
;
;
;
;                      MARCH 29, 1984        ADD
;
;
;
;                      RF = ADDRESS REGISTER FOR DATA TOTALS
;                      RE = ADDRESS REGISTER FOR ADDER INFORMATION
;                      RD = POINTER FOR TEMPORARY STORAGE ADDRESSES
;
;
;
;                      2770/2771H = ADDRESS OF ADDER (LO/HI)
;
;                      2772/2773H = ADDRESS OF DATA TO BE ADDED TO (LO/HI)
;
;
;
;
;
;
;
              ORG      1340H         ;START PROGRAM AT 1340H
EXIT          SEP      R0            ;SET RETURN COUNTER R3 = 401H
TOTAL         LDI      77H
              PLO      RD
              LDI      27H           ;SET TEMP POINTER TO BCD CARRY DIGIT
```

```
              PHI     RD
              LDI     00H         ;SET BCD CARRY DIGIT TO 0
              STR     RD          ;INITIALIZE CARRY DIGIT TO 0
              LDI     70H
              PLO     RD          ;ADDRESS LOCATION OF ADDER ADDRESS
              LDN     RD          ;GET ADDER ADDRESS
              PLO     RE
              INC     RD
              LDN     RD          ;GET HI ADDER ADDRESS
              PHI     RE
              INC     RD
              LDN     RD
              PLO     RF          ;GET LO ADDRESS OF DATA TO BE UPDATED
              INC     RD
              LDN     RD
              PHI     RF          ;GET HI ADDRESS OF DATA
READD         LDI     74H
              PLO     RD
              LDN     RF          ;ADDRESS RF FOR DATA TOTAL
              ANI     0FH         ;MASK HI BITS OFF
              STR     RD          ;STORE IN TEMP MEMORY
              XRI     0FH         ;CHECK IF LO DATA IS 0FH
              BNZ     HIDGT       ;NO, LEAVE STORED VALUE AS IS
              STR     RD          ;STORE 00 FOR 0FH
HIDGT         LDN     RF
              ANI     0F0H        ;MASK LO BITS OFF FOR DATA TOTAL
              INC     RD
              STR     RD          ;STORE HI BITS OF DATA IN RD + 1
              XRI     0F0H        ;HI DIGIT OF DATA = F0H
              BNZ     HIDTA       ;NO
              STR     RD          ;YES, STORE 0 INSTEAD
HIDTA         LDN     RE          ;ADDRESS RE, ADDER INFO
              ANI     0F0H        ;MASK OFF LO BITS OF ADDER DATA
              INC     RD          ;POINT TO NEXT TEMP ADDRESS
              STR     RD          ;SAVE IN TEMP MEMORY
              XRI     0F0H        ;HI DIGIT ADDER = F0H
              BNZ     ADDLO       ;NO
              STR     RD          ;YES, STORE 0 INSTEAD
ADDLO         INC     RD          ;POINT TO BCD CARRY DIGIT
              LDN     RE
              ANI     0FH         ;MASK OFF HI BITS OF ADDER
              XRI     0FH         ;LO DIGIT ADDER = 0FH
              BZ      LDGT1       ;YES, REPLACE WITH 0
              LDN     RE          ;GET LO DIGIT AGAIN
              ANI     0FH
LDGT1         SEX     RD
              ADD                 ;ADD BCD CARRY FROM PREV DIGIT AND ADDER
              INC     RD          ;POINT TO TEMP SUM STORAGE
              STR     RD
              DEC     RD          ;POINT TO BCD CARRY REG
              LDI     00H
              STR     RD          ;RESET CARRY DIGIT
              INC     RD
              LDX                 ;GET TEMP SUM
              DEC     RD
              DEC     RD
              DEC     RD
              DEC     RD          ;POINT TO DATA LO BITS
              ADD
              STR     RD          ;SAVE TOTAL
              ADI     0F6H        ;ADD F6H TO CHECK DECIMAL CARRY
              BNF     NCARRY      ;TOTAL LESS THAN 10 DO NOT ADD CARRY
              STR     RD          ;STORE DECIMAL CORRECTED TOTAL
              INC     RD          ;POINT TO HI BITS DATA
              LDA     RD          ;GET HI BIT DATA AND INC POINTER TO ADDER
              ADI     10H         ;ADD CARRY FROM DECIMAL ADD
              ADD                 ;ADD HI BIT DATA AND ADDER
BIT2          DEC     RD          ;POINT BACK TO 2ND BIT STORE
              STR     RD          ;STORE HI BIT TOTAL IN 1372H
              BDF     CARRY2      ;DIGIT > 15
              ADI     60H         ;ADD 60H TO CHECK FOR DECIMAL CARRY
              BNF     NCARY2      ;NO CARRY, DO NOT PUT DIGIT IN CARRY REGISTER
SVCARY        STR     RD          ;SAVE CORRECTED SUM
```

```
              INC      RD
              INC      RD          ;POINT TO DIGIT CARRY REG
              LDI      01H
              STR      RD          ;STORE FOR NEXT PASS
              DEC      RD
              DEC      RD          ;POINT TO HI DATA BITS
NCARY2        LDX
              DEC      RD          ;POINT TO LO DATA BITS
              ADD
              STR      RF          ;REPLACE OLD TOTAL WITH NEW PACKED BCD
              GLO      RF
              ANI      07H         ;TEST IF ADDRESS IS _7 OR _F
              XRI      07H         ;TEST FOR 4 BYTES DONE
              INC      RF          ;POINT TO NEXT DATA BYTE
              INC      RE          ;POINT TO NEXT ADDER BYTE
              BNZ      READD       ;NOT DONE GO BACK
              GLO      RF
              PLO      R8          ;SAVE INITIAL LO ADDRESS IN R8 LO
              DEC      RF
FFILL         LDN      RF          ;GET MOST SIGNIFICANT DIGIT
              ANI      0F0H        ;DIGIT OTHER THAN ZERO?
              BNZ      VALDGT      ;YES, DO NOT CHANGE TO "F"
              LDN      RF
              ORI      0F0H        ;NO, CHANGE 0 TO F
              STR      RF          ;SAVE HI DIGIT
              ANI      0FH         ;LO DIGIT OTHER THAN ZERO
              BNZ      VALDGT      ;YES, DO NOT CHANGE TO "F"
              LDN      RF
              ORI      0FH         ;NO, CHANGE 0 TO F
              STR      RF          ;SAVE DIGIT
              DEC      RF          ;GO TO NEXT LEAST SIGNIFICANT DIGIT
              GLO      RF
              ANI      0FH         ;DONE 3 WORDS
              XRI      0CH
              BZ       VALDGT      ;YES
              GLO      RF
              ANI      0FH         ;DONE 3 WORDS
              XRI      04H
              BNZ      FFILL       ;NO, GO BACK TO CHECK OTHER DIGITS
VALDGT        GLO      R8          ;GET INITIAL LO ADDRESS OF RF
              ADI      0FCH        ;SET RF ADDRESS BACK TO ORIGINAL ADDRESS
              PLO      RF
              PLO      RE
              BR       EXIT
NCARRY        INC      RD          ;GET HI DATA BITS
              LDA      RD          ;GET ADDER HI BITS
              ADD
              DEC      RD
              STR      RD
              BDF      CARRY2      ;IF A CARRY OCCURED ADD 60H DOF DECIMAL
              ADI      60H         ;DECIMAL ADJUST W/NO CARRY
              BNF      NCARY2      ;DO NOT ADD CARRY TO NEXT DIGIT
              BR       SVCARY      ;YES, ADD CARRY BIT FOR NEXT ADD
CARRY2        ADI      60H         ;CORRECT BCD DIGIT TO DECIMAL
              BR       SVCARY
              END
              SECTION  SEC7

;
;
;             7TH SECTION    DATA COMMUNICATIONS
;
;
;             MARCH 28, 1984      COMM
;
;
;             RD = CONTROL WORD TO BE SENT TO SLAVE
;
;
;
;                  2778H = WORD FROM PROGRAM FOR TYPE OF COMMUNICATIONS
;                  2779H = CONTROL WORD TO BE SENT TO SLAVE
;             277A/277BH = START ADDRESS OF DATA TO BE SENT LOW-HIGH
;                  277CH = HARDWARE CODE FOR I/O = 30H
```

```
;                   277DH = MOTOR STOPPED WORD = 01
;                   277EH = BAG STOP CLEAR WORD = 01H (ADDRESS OF COIN IN 277A/277BH)
;                   274EH = ERROR WORD LOCATION
;               2780/2787H = TEMPORARY STORAGE
;
;
;
;
;                   PROGRAM WORD = D7 D6 D5 D4 D3 D2 D1 D0 = 2778H
;
;                                  D0 = 1 = START MOTOR
;                                  D1 = 1 = STOP MOTOR
;                                  D2 = 1 = RECEIVE PARTIAL COUNTS
;                                  D3 = 1 = RECEIVE BATCH TOTALS
;                                  D4 = 1 = BATCH COMPLETE
;                                  D5 = 1 = SEND COIN VALUES
;                                  D6 = 1 = SEND BAG STOP VALUES
;                                  D7 = 1 = SEND 10 WORDS OF COIN/BAG VALUES
;
;
;
;                       COMM
PC          EQU         R0
            GLOBAL      DTAXFR
            GLOBAL      ERR
;
            ORG         1400H
COMM        LDI         08H
            PLO         R9
            LDI         27H
            PHI         R9          ;R9 = PROGRAM WORD FOR EXECUTING THIS ROUTINE
            PHI         RB          ;RB = TIMER
            PHI         RC          ;RC = TEMPORARY STORAGE FOR 0 - F CONVERSION
            PHI         RD          ;RD = CONTROL WORD ADDRESS
            PHI         RE          ;RE = TEMPORARY POINTER
            PHI         RF          ;RF = MOTOR STOPPED REG AND LOOP CTR
            LDI         80H         ;TEMP STORAGE
            PLO         RE
            LDN         R9          ;GET PROGRAM WORD
            ANI         02H         ;DO THIS ROUTINE?
            BNZ         DORTN       ;YES
EXITRT      LBR         DTAXFR      ;NO, GO TO NEXT ONE
DORTN       LDN         R9
            XRI         02H         ;RESET ENABLE WORD
            STR         R9
CHKFLAG     B4          CHKWRD      ;NO DATA FROM SLAVE, CHECK PROGRAM WORD
            SEX         PC
            OUT         1,08H       ;READ PORT
            SEX         RE
            INP         6
            XRI         0C0H        ;MOTOR STOPPED BY SLAVE?
            BNZ         CHKWRD      ;NO
            LDI         47H
            PLO         RF
            LDN         RF          ;GET MOTOR STOPPED REG
            ANI         0EFH        ;RESET MOTOR RUNNING BIT
            STR         RF
CHKWRD      LDI         78H
            PLO         RD          ;SET RD = COMM WORD
CHKPRT      B3          CHKPRT      ;CHECK IF PORT READY
OK          LDN         RD          ;GET COMM WORD FROM PROGRAM
            LBZ         EXITRT      ;ALL COMM FUNCTIONS DONE, EXIT ROUTINE
            ANI         01H         ;START MOTOR WORD?
            BNZ         STRTMTR     ;YES
            LDN         RD
            ANI         02H         ;STOP MOTOR?
            BNZ         STOPMTR     ;YES
            LDN         RD
            ANI         04H         ;GET PARTIAL COUNT FROM SLAVE
            BNZ         GETPRTL
            LDN         RD
            ANI         08H         ;GET BATCH TOTALS FROM SLAVE
            LBNZ        GETBTCH
            LDN         RD
            ANI         10H         ;RESET BATCH TOTALS IN SLAVE
```

```
                BNZ       RSTBTCH
                LDN       RD
                ANI       20H           ;SEND COIN VALUES TO SLAVE
                LBNZ      SENDCOIN
                LDN       RD
                ANI       40H           ;SEND BAG STOP VLUES TO SLAVE
                LBNZ      SENDBS
                LDI       7EH
                PLO       RD            ;GET BAG STOP CLEAR REG
                LDN       RD
                ANI       01H           ;CLEAR CODE SET?
                LBNZ      STOPCLR       ;YES
                LBR       EXITRT        ;CODE WRONG GO ON
STRTMTR         LDN       RD
                XRI       01H           ;RESET PROGRAM WORD
                STR       RD
                INC       RD
                LDI       0C1H          ;STORE CONTROL WORD
                STR       RD
                BR        XMIT
STOPMTR         LDN       RD
                XRI       02H
                STR       RD
                INC       RD
                LDI       0C0H
                STR       RD
                BR        XMIT
RSTBTCH         LDN       RD
                XRI       10H
                STR       RD
                INC       RD
                LDI       0C2H
                STR       RD
XMIT            SEX       PC            ;GET HARDWARE CODE
                OUT       1,08H         ;SELECT PORT
                SEX       RD            ;GET CONTROL WORD TO BE SENT
                OUT       4             ;SEND CONTROL WORD
                BR        CHKFLAG       ;CHECK IF SLAVE HAS INFO OR MORE FOR MASTER TO SEND
GETPRTL         LDN       RD
                XRI       04H
                STR       RD            ;RESET PROGRAM WORD
                INC       RD
                LDI       0C4H          ;CONTROL WORD FOR PARTIAL COUNTS TO BE SENT
                STR       RD
                SEX       PC            ;POINT TO HARDWARE CODE
                OUT       1,08H         ;SELECT I/O PORT
                SEX       RD            ;SET UP CONTROL WORD FOR OUTPUT
                OUT       4             ;SEND WORD TO SLAVE
                DEC       RD
                LDI       68H
                PLO       RA
                LDI       21H
                PHI       RA            ;SET RA = PARTIAL COUNT START ADDRESS
CKPORT          B4        CKPORT        ;CHECK IF SLAVE SENT INFO
RECVOK          LDI       80H
                PLO       RC            ;SET RC = START ADDRESS OF STORAGE
RECAGN          SEX       PC
                OUT       1,08H
                SEX       RC            ;POINT TO STORAGE
                INP       6             ;GET BYTE OF DATA FROM SLAVE
                INC       RC
                GLO       RC
                XRI       88H           ;DONE 8 BYTES?
                BZ        CHKF          ;YES
RDFLAG          B4        RDFLAG        ;PORT HAS INFO
                BR        RECAGN
CHKF            LDI       87H
                PLO       RC            ;GO TO HIGHEST DIGIT
REFILL          LDN       RC
                ANI       0F0H          ;MASK OFF LO BYTE
                BNZ       DGTOK         ;DIGIT OTHER THAN 0 DO NOT CHANGE TO "F"
                LDN       RC
                ORI       0F0H          ;YES, CHANGE 0 TO "F"
```

```
                STR     RC
                ANI     0FH         ;MASK OFF HI BYTE
                BNZ     DGTOK       ;NOT 0 THEN DO NOT CHANGE TO "F"
                LDN     RC
                ORI     0FH         ;YES, CHANGE 0 TO "F"
                STR     RC
                DEC     RC
                GLO     RC
                XRI     84H         ;DONE ALL 3 BYTES OF DATA
                BNZ     REFILL      ;NO, GO BACK FOR MORE
DGTOK           LDI     80H         ;GO TO START OF STORAGE
                PLO     RC
                SEX     RC          ;ADDRESS STORAGE LOCATION
AGNXFR          LDXA                ;GET BYTE OF CORRECTED DATA
                STR     RA          ;STORE IN MEMORY
                INC     RA
                GLO     RC
                XRI     88H         ;DONE 8 BYTES?
                LBNZ    AGNXFR      ;NO
                GLO     RA
                XRI     00H         ;END OF BATCH TOTALS?
                LBZ     CHKWRD      ;YES
                GHI     RA
                XRI     20H         ;COIN VALUES?
                BZ      SETUP       ;YES, SET UP FOR MORE DATA
                GLO     RA
                XRI     0B8H        ;END OF PARTIAL COUNTS?
                BNZ     SETUP       ;NO SET UP FOR MORE DATA
                LBR     CHKWRD
SETUP           LDI     80H
                PLO     RC
                LBR     RDFLAG      ;GO BACK FOR MORE DATA
GETBTCH         LDN     RD
                XRI     08H
                STR     RD          ;RESET PROGRAM WORD
                INC     RD
                LDI     0C3H        ;CONTROL WORD FOR SEND BATCH INFO
                STR     RD
                SEX     PC
                OUT     1,08H
                SEX     RD
                OUT     4           ;SEND CONTROL WORD TO SLAVE
                DEC     RD
                LDI     0A0H
                PLO     RA
                LDI     20H
                PHI     RA          ;SET RA = INITIAL ADDRESS OF BATCH TOTALS
                LBR     CKPORT      ;CHECK IF SLAVE READ CONTROL WORD
COIN1           LDI     7FH
                PLO     RD          ;SET RD = 277FH = LOOP CTR FOR NO. OF COINS
                LDI     00H
                STR     RD          ;ONLY 1 PASS FOR 1 COIN
                BR      COINX
SENDCOIN        LDN     RD
                XRI     20H
                STR     RD          ;RESET PROGRAM WORD
                INC     RD
                LDI     0D0H
                STR     RD          ;SAVE CONTROL WORD FOR COIN VALUES TO SLAVE
                SEX     PC
                OUT     1,08H
                SEX     RD
                OUT     4           ;SEND CONTROL WORD
                DEC     RD
                DEC     RD
                LDN     RD
                ANI     80H         ;SEND ALL 10 COIN VALUES?
                BZ      COIN1       ;NO ONLY ONE COIN
COIN10          LDN     RD
                XRI     80H
                STR     RD          ;RESET WORD
                LDI     7FH
                PLO     RD          ;POINT TO 10 COIN WORD AT 277FH
```

```
               LDI     09H         ;SET LOOP COUNTER FOR 10 COINS
               STR     RD
COINX          LDI     80H         ;INITIAL ADDRESS OF TEMP STORAGE
               PLO     RC
               LDI     7AH
               PLO     RB
               LDN     RB          ;GET LO ADDRESS OF DATA TO BE SENT
               PLO     RA          ;SET RA = ADDRESS OF DATA
               INC     RB
               LDN     RB          ;GET HI ADDRESS OF DATA
               PHI     RA          ;SET RA = DATA
XFRAGN         SEX     RA
               LDXA                ;GET DATA
               STR     RC          ;STORE IN TEMP LOCATION
               INC     RC
               GLO     RC
               XRI     88H         ;DONE 8 BYTES?
               BNZ     XFRAGN      ;NO
               LDI     87H
               PLO     RC          ;ADDRESS HI ORDER DIGIT
OFILL          LDN     RC
               ANI     0F0H        ;MASK OFF LO BITS
               XRI     0F0H        ;"F"
               LBNZ    OKDGT       ;NOT "F" LEAVE AS IS
               LDN     RC
               XRI     0F0H        ;SET DIGIT TO 0
               STR     RC
               ANI     0FH         ;MASK OFF HI BITS
               XRI     0FH         ;"F"?
               BNZ     OKDGT       ;NO, LEAVE AS IS
               LDN     RC
               XRI     0FH         ;SET F TO 0
               STR     RC
               DEC     RC
               GLO     RC
               XRI     83H         ;DONE 4 BYTES?
               LBNZ    OFILL       ;NO
OKDGT          LDI     80H         ;INITIAL ADDRESS OF CORRECTED DATA
               PLO     RC
NXTWRD         LDI     0FFH
               PLO     RB
               PLO     RF          ;SET 2ND TIMER
CXPRT          BN3     PRTOK       ;PORT READY FOR XMISSION
               DEC     RB
               GLO     RB
               BNZ     CXPRT
               DEC     RF
               GLO     RF          ;2ND TIMER = 0?
               BNZ     CXPRT       ;NO
               BR      ERROUT      ;PORT NOT AVAILABLE
PRTOK          SEX     PC
               OUT     1,08H
               SEX     RC
               OUT     4
               GLO     RC
               XRI     88H
               BNZ     NXTWRD      ;NO, DO MORE
DNS            LDI     7FH
               PLO     RF          ;RF = NO. OF COINS TO SEND
               LDN     RD          ;GET 1 OR 10 COINS?
               LBZ     CHKWRD      ;YES, ONLY 1 COIN
               ADI     0FFH        ;DEC COIN COUNTER
               STR     RD
               LDI     80H
               PLO     RC          ;INITIALIZE STORAGE ADDRESS
               LBR     XFRAGN      ;DO OTHER COINS
SENDBS         LDN     RD
               XRI     40H
               STR     RD          ;RESET WORD
               INC     RD
               LDI     0D1H        ;CONTROL WORD TO SEND BAG STOP VALUES TO SLAVE
               STR     RD
               SEX     PC
```

```
                OUT     1,08H
                SEX     RD
                OUT     4           ;SEND CONTROL WORD
                DEC     RD
                DEC     RD
                LDN     RD          ;CHECK FOR 1 OR 10 BS TO BE SENT
                ANI     80H         ;10 BAG STOPS?
                LBZ     COIN1       ;NO
                LBR     COIN10      ;YES, DO 10 BS
STOPCLR         LDN     RD
                XRI     01H         ;RESET CLEAR CODE
                STR     RD
                LDI     79H
                PLO     RD          ;GET WORD TO BE SENT
                LDI     0C5H        ;SET CLEAR WORD FOR SLAVE
                STR     RD
                SEX     PC
                OUT     1,08H
                SEX     RD
                OUT     4           ;SEND WORD TO SLAVE
                DEC     RD
                DEC     RD
                LBR     COIN1       ;SET RD TO COMM WORD AND SEND DATA
ERROUT          LDI     4EH
                PLO     RE
                LDI     27H
                PHI     RE          ;SET RE = ERROR ADDRESS
                LDI     10H
                STR     RE          ;SAVE PORT NOT AVAILABLE ERROR
                LDI     08H
                PLO     RE          ;SET PROGRAM WORD FOR ERROR AND COMM ENABLE
                LDN     RE
                ORI     12H         ;SET ERROR AND RESET COMM ENABLE CODE
                STR     RE
                LDI     0D8H
                PLO     RE
                LDI     01H         ;SET UP POINTER FOR ERROR CHECKING
                STR     RE
                LBR     ERR         ;ERROR SO GO TO ERROR ROUTINE
                END
                SECTION SEC8
;
;
;
;
;                       ERROR DISPLAY ROUTINE
;
;
;                       ERR         MARCH 23, 1984
;
;
;                                   274E/274FH = ERROR WORD LOCATION
;
;                                   27D0/27D7H = ERROR DISPLAY ADDRESS
;
                GLOBAL  DTAXFR
                GLOBAL  DISP
                ORG     1600H
ERROR           LDI     27H
                PHI     RE
                PHI     RF
                PHI     RD
                PHI     RC
                LDI     08H
                PLO     RF          ;RF = 2708H = ROUTINE ENABLE WORD
                LDN     RF
                ANI     10H         ;ENABLE ERROR
                BNZ     DOERR       ;YES, DO ERROR ROUTINE
EXITOUT         LBR     DTAXFR      ;NO GO TO NEXT ROUTINE
DOERR           LDI     0D8H
                PLO     RD          ;RD = 27D8H = POINTER FOR ERROR CODE
                SEX     RD
                LDI     4EH
                PLO     RC
                LDI     0D4H
                PLO     RE          ;RE = 27D4H = ERROR DISPLAY WORDS
```

```
CXERR     LDN      RC
          BZ       CKH1         ;NO ERROR 1ST WORD CHECK OTHER WORD
          LDN      RE
          ADI      01H          ;ADD 1 COUNT TO ERROR WORD
          STR      RE
          LDN      RC
          AND
          BNZ      ERRRST       ;YES ERROR, GO TO RESET ERROR BIT
          LDN      RD
          SHL                   ;SET UP POINTER TO NEXT ERROR CODE
          STR      RD
          BR       CXERR        ;GO TO CHECK NEXT ERROR CODE
ERRRST    LDN      RC           ;GET ERROR REG
          XOR                   ;RESET THIS ERROR BIT
          STR      RC
          LDN      RD
          SHL
          STR      RD           ;RESET POINTER TO NEXT ERROR BIT
SETEXIT   LDN      RC
          BNZ      DOEXIT       ;STILL HAS MORE ERRORS, LEAVE ERROR ENABLED
          INC      RC           ;GET NEXT ERROR REG
          LDN      RC
          BNZ      DOEXIT       ;ERROR LEFT YET, LEAVE ERROR ENABLED
          LDN      RF           ;GET PROGRAM WORD
          XRI      10H          ;RESET ERROR ENABLE
          LDI      27H          ;WRITE ADDRESS = 27F1H
          STR      RF
          LDI      60H          ;NO. OF WORDS TO XFR
          PLO      RF
          LDI      08H
          STR      RF
          LDI      0AH
          PLO      RF
          LDI      01H          ;SET XFR = ALTERNATE XFR
          STR      RF
          LDI      29H          ;SET
          PLO      RF
          SEX      RF
          LDI      00H          ;BIT
          STXD
          STXD                  ;MASK
          STXD
          LDI      10H          ;FOR CLEAR
          STXD                  ;KEY
          LDI      00H
          STXD                  ;ONLY IN KEYSCAN
          LBR      DTAXFR       ;LEAVE ROUTINE TO DISPLAY CURRENT ERROR
EXOUT     LDN      RF           ;GET PROGRAM WORD
          XRI      10H          ;RESET ERROR ENABLE WORD
          STR      RF
          BR       EXITOUT      ;LEAVE ROUTINE
CKH1      INC      RC
          LDN      RC
          ANI      01H          ;ERROR NO 9?
          BNZ      NOTHOME      ;YES
          LDN      RC
          ANI      02H          ;ILLEGAL ENTRY?
          BZ       EXOUT        ;NO ERRORS LEAVE ROUTINE
          LDI      10H
          STR      RE           ;STORE ERROR NO. 10 BCD
          LDN      RC
          XRI      02H          ;RESET THIS ERROR BIT
          STR      RC           ;SAVE ERROR REG
          DEC      RC           ;GO TO 1ST ERROR REG
          BR       SETEXIT
NOTHOME   LDI      09H
          STR      RE           ;STORE ERROR NO. 9 BCD
          LDN      RC
          XRI      01H          ;RESET THIS ERROR BIT
          STR      RC
          DEC      RC           ;RESET RC BACK TO ORIGINAL ERROR REG
          BR       SETEXIT
```

```
POINTR   LDN    RD
         SHL
         STR    RD
         BR     CXERR
         END
;                      DATA TRANSFER ROUTINE - 4 PASSES
;
;              9TH SECTION
;
;
;              RC = TEMPORARY ADDRESS OF READ DATA
;              RD = TEMPORARY ADDRESS OF WRITE DATA
;              RE = CONTROL WORD = 270A/270B
;              RF = READ ADDRESS = 2750/2751 - 2756/2757 (LOW/HIGH)
;              RA = WRITE ADDRESS = 2758/2759 - 275E/275F (LOW/HIGH)
;              RB = WORD XFER COUNTER = 2760/2761 - 2766/2767 (LOW/HIGH)
;
;
;                     2700 - 27FF = SCRATCH
;                     2000 - 26FF = DATA TO BE HELD
;                            2708 = PROGRAM ENABLE WORD
;
;              MARCH 1, 1984            DTAXFR1
;
;
;
         ORG    1300H           ;START PROGRAM AT 1300H
;
;
;
         LDI    27H
         PHI    RF
         PHI    RE
         PHI    RA
         PHI    RB
         LDI    08H
         PLO    RF              ;SET RF = PROGRAM ENABLE WORD
         LDN    RF
         ANI    04H             ;DATA XFR SHOULD BE ENABLED?
         BZ     PRGRET          ;NO, GO TO NEXT ROUTINE
         LDI    0AH
         PLO    RE              ;RE = 270AH = CONTROL WORD ADDRESS
         LDI    50H
         PLO    RF              ;RF = 2750H = LOW/HIGH READ ADDRESS
         LDI    58H
         PLO    RA              ;RA = 2758/2759H = LOW/HIGH WRITE ADDRESS
         LDI    60H
         PLO    RB              ;RB = 2760/2761 = WORD XFER CTR (2 BYTES)
PASSAGN  LDN    RE              ;GET CONTROL WORD
         ANI    03H             ;ANY CODE?
         BZ     PRGRET          ;NO CODE SET, FINISHED WITH DATA XFER
         LDA    RF
         PLO    RC
         LDA    RF
         PHI    RC
         LDA    RA
         PLO    RD
         LDA    RA
         PHI    RD
LOOP1    LDN    RB
         BNZ    BR2
         INC    RB
         LDN    RB
         BZ     BR0             ;DONE WITH THIS PASS CHECK FOR MORE PASSES
         LDN    RB
         SMI    01H             ;DECREMENT WORD COUNTER BY 1
         STR    RB
         DEC    RB
BR2      LDA    RC
         STR    RD
```

```
              LDN       RB
              SMI       01H        ;DECREMENT WORD CTR BY 1
              STR       RB
              INC       RD
              LDN       RE
              ANI       02H        ;SEQUENTIAL OR ALTERNATE TRANSFER
              BNZ       LOOP1      ;SEQUENTIAL TRANSFER
              INC       RD
              BR        LOOP1      ;ALTERNATE TRANSFER
BRO           INC       RB         ;SET-UP FOR NEXT PASS
              LDN       RE
              SHR
              SHR                  ;GET NEXT TWO BITS
              STR       RE         ;SAVE CONTROL WORD
              BR        PASSAGN
PRGRET        NOP
              END
```

10TH SECTION - DISPLAY

```
                                   ;
                                   ;
                                   ;THIS IS A TEST PROGRAM FOR THE DISPLAY ONLY.
                                   ;
                                   ;REV 1
              GLOBAL    BTCHDSP
                                   ;3-23-84
                                   ;
              ORG       1700H      ;START PROGRAM AT ADDRESS 1700H
              LDI       27H
              PHI       R8
              LDI       08H
              PLO       R8         ;SET R8 = 2708H = PROGRAM ENABLE WORD
              LDN       R8         ;GET PROGRAM WORD
              ANI       01H        ;DISPLAY ENABLED?
              BNZ       DODISP     ;YES, DO DISPLAY ROUTINE
EXIT          LBR       BTCHDSP    ;NO, GO TO NEXT ROUTINE
DODISP        LDN       R8
              XRI       01H        ;RESET ENABLE BIT
              STR       R8
              LDI       0F0H
              PLO       R8         ;SET R8 = BEGINNING OF DISPLAY WORDS
              SEX       R8
              OUT       1
              OUT       4
              OUT       1
              OUT       6
              OUT       1
              OUT       5
              OUT       1
              OUT       5
              OUT       1
              OUT       5
              OUT       1
              OUT       4
              OUT       1
              OUT       6
              OUT       1
              OUT       5
              BR        EXIT       ;DONE WITH DISPLAY WORK
              END
```

Appendix L
FIRMWARE LISTINGS - PERIPHERAL PROGRAM MEMORY
©1984 Brandt, Inc.

```
              SECTION   SEC1

1ST SECTION    COIN POLL
```

```
;                     MARCH 28, 1984        S1R8
;
;
;                     R3 = ADDRESS OF ADD SUBROUTINE
;                     R4 = ADDRESS OF DATA TRANSFER SUBROUTINE
;                     R5 = HARDWARE CODE FOR I/O TO MASTER
;                     R6 = HARDWARE CODE FOR COIN PORTS
;                     R7 = ADDRESS OF CHANGED BITS FOR COINS
;                     R8 = ADDRESS OF ADDRESS CORRECTION SUM
;                     RA = ADDRESS OF COUNTED COIN BITS
;                     RB = ADDRESS OF OLD COIN BITS
;                     RC = ADDRESS OF NEW COIN DATA
;                     RD = TEMP POINTER
;                     RE = ADDER ADDRESS
;                     RF = REG TO BE ADDED TO
;
PC          EQU       R0
;
;
;
            ORG       000H          ;BEGIN PROGRAM AT 0
            REQ                     ;RESET MOTOR FLAG
            LDI       10H
            PHI       R2
            LDI       00H
            PLO       R1
            PLO       R2            ;R2 = 1000H = CHECK SUM ADDRESS
            PHI       R1            ;START AT BEGINNING OF ROM
            STR       R2            ;SET R2 = 00 = INITIAL CHECK SUM
            SEX       R1
READD       LDN       R2            ;GET CHECK SUM
            ADD                     ;ADD R1 ADDRESS TO CHECK SUM
            STR       R2            ;SAVE NEW SUM
            INC       R1
            GHI       R1            ;CHECK IF DONE ADDING TO 800H
            XRI       08H
            BNZ       READD         ;NO, GO BACK FOR BYTES TO 7FFH
            LDN       R2            ;GET CHECK SUM TOTAL
            BNZ       ROMERR        ;NOT 0, THEN ROM ERROR
STRTPASS    LDI       10H
            PHI       R1
            LDI       01H
            PLO       R1            ;R1 = 1001H = START OF RAM CHECK
            STR       R2            ;R2 = 1000H = 01H FOR RAM TEST CODE
            PLO       R3            ;SAVE INITIAL VALUE IN R3 LO
GETDTA      LDN       R2
            STR       R1
            INC       R1            ;POINT TO NEXT RAM ADDRESS
            SHL                     ;CHANGE CODE FOR NEXT RAM ADDRESS
            BNZ       STR4          ;SHIFTED 8 TIMES? NO
            LDI       01H           ;YES, RELOAD RAM TEST CODE
STR4        STR       R2            ;SAVE NEW CODE
            GHI       R1            ;TEST IF DONE TESTING W 1ST CODE
            XRI       14H           ;TESTED TO 13FFH?
            BNZ       GETDTA        ;NO
TESTDTA     LDI       10H
            PHI       R1
            LDI       01H
            PLO       R1            ;SET R1 = 1001H = START OF RAM READ
            GLO       R3            ;GET TEST CODE
            STR       R2            ;SAVE 01H IN R2 FOR RAM TEST CODE
            SEX       R1
NEXTRD      LDN       R2
            XOR                     ;COMPARE READ BACK DATA
            BNZ       RAMERR        ;NOT 0 THEN RAM ERROR
            INC       R1
            LDN       R2
            SHL                     ;CHANGE TEST CODE FOR NEXT RAM BYTE
            BNZ       SVDATA
            LDI       01H           ;DONE 8 BYTES, RESET TEST CODE
SVDATA      STR       R2
DATAOK      GHI       R1
```

```
                XRI      14H           ;TESTED TO 13FFH?
                BNZ      NEXTRD        ;NO
                GLO      R3            ;GET OLD TEST CODE
                SHL                    ;SET TEST CODE TO NEXT VALUE
                PLO      R3            ;SAVE NEW CODE
                STR      R2
                LDI      10H
                PHI      R1            ;ZERO RAM FROM 1000H
                LDI      01H
                PLO      R1            ;START AT 1001H
                LDN      R2            ;GET BIT TEST CODE
                BNZ      GETDTA        ;NOT DONE 8 TIMES
STRZERO         LDI      00H
                STR      R2            ;R2 = 1000H = 00H FOR CLEAR
ZEROFL          LDN      R2
                STR      R1            ;STORE 00 IN R1 ADDRESS
                INC      R1
                GHI      R1
                XRI      14H           ;TESTED TO 13FFH?
                BNZ      ZEROFL        ;NO
                DEC      R1            ;SET R1 = 13FFH = TEMP PORT READ STORAGE
                SEX      PC
                OUT      1,08H
                SEX      R1
                INP      4             ;READ PORT 0 FOR COIN FAILURE
                XRI      0FFH          ;LOOK FOR HI LEVEL
                BNZ      INERR         ;YES, ERROR IN INPUT CKT
                SEX      PC
                OUT      1,08H         ;READ 2ND PORT
                SEX      R1
                INP      5
                ANI      03H           ;CHECK 9, 10 COINS
                XRI      03H           ;CHECK FOR HI LEVEL
                BNZ      INERR         ;YES ERROR IN COIN INPUT CKT
                BR       OKCOIN
ROMERR          BN4      ROMERR        ;MASTER READY?
XMTDTA          SEX      PC
                OUT      1,08H
                OUT      2,0B0H        ;SEND ROM ERROR CODE
                BR       STRTPASS
RAMERR          BN4      RAMERR        ;MASTER READY?
XDTA            SEX      PC
                OUT      1,08H
                OUT      2,0B1H        ;ERROR CODE FOR ROM ERROR
                BR       STRZERO       ;YES, GO TO NEXT ERROR CHECK
INERR           BN4      INERR         ;MASTER READY?
XMDATA          SEX      PC
                OUT      1,08H
                OUT      2,0B2H        ;SEND INPUT ERROR CODE
OKCOIN          BN4      OKCOIN        ;MASTER READY?
XMDTA           SEX      PC
                OUT      1,08H
                OUT      2,0B3H        ;SEND NO ERROR CODE TO MASTER
                LDI      13H           ;SET REG ADDRESS TO 1300H
                PHI      R5
                PHI      R6
                PHI      R7
                PHI      R8
                PHI      RA
                PHI      RB
                PHI      RC            ;ALL REGISTERS AT 1300H +
                PHI      RD
                LDI      0A3H
                PLO      RD            ;RD = COIN VALUE = 1 FOR TOKEN/PARTIAL COUNT
                SEX      RD
                LDI      00H
                STXD
                STXD
                STXD                   ;VALUE = 00 00 00 01
                LDI      01H
                STR      RD
                PLO      R3
                PLO      R4
```

```
                LDI       04H
                PHI       R3           ;SET R3 = 401H = ADD ROUTINE ADDRESS
                LDI       06H
                PHI       R4           ;SET R4 = 601H = TRANSFER ROUTINE ADDRESS
                LDI       90H
                PLO       RD           ;SET RD = 1390H = STATION NO CODE
                LDI       01H
                PLO       RB           ;SET RB = 1ST ADDRESS FOR STATION NO
                STR       RD           ;SAVE STAT NO CODE
                LDI       10H
                PHI       RB           ;RB = 1001H = 1ST BATCH COIN TOTAL
STATNO          LDN       RD           ;GET STATION NO CODE
                STR       RB
                SHL                    ;SET CODE FOR NEXT COIN
                STR       RD
                GLO       RB
                ADI       08H          ;GO TO NEXT COIN ADDRESS
                PLO       RB
                LDN       RD           ;END OF 8 COINS?
                BZ        CHKPTL       ;YES, CHECK IF DONE W/PARTIAL COINS ALSO
                LBR       STATNO       ;NO
CHKPTL          GHI       RB
                XRI       13H          ;DONE PARTIAL?
                BZ        DO9          ;YES, DO COINS 9 AND 10
                LDI       13H
                PHI       RB           ;NO GO BACK TO ASSIGN NO
                LDI       01H          ;SET CODE BACK
                PLO       RB           ;START OF PARTIAL COINS
                STR       RD           ;SAVE STAT NO CODE
                LBR       STATNO
DO9             INC       RB           ;GO TO NEXT STATION NO
                LDI       05H
                STR       RB           ;SET PARTIAL COUNT AND COIN 9
                GLO       RB
                ADI       08H          ;GO TO NEXT COIN
                PLO       RB
                LDI       06H
                STR       RB           ;SET PARTIAL AND COIN 10
                LDI       10H
                PHI       RB           ;GO TO BATCH COINS
                LDI       0AH
                STR       RB           ;SET BATCH AND COIN 10
                GLO       RB
                SMI       08H          ;GO TO COIN 9
                PLO       RB
                LDI       09H
                STR       RB           ;SET BATCH AND COIN 9
                LDI       11H
                PHI       RB
                LDI       04H
                PLO       RB           ;SET RB = 1104H = COIN VALUE
SETUNIT         LDI       01H          ;SET COIN VALUE TO UNIT
                STR       RB
                GLO       RB
                ADI       08H          ;GO TO NEXT COIN VALUE
                PLO       RB
                XRI       54H          ;END OF COIN VALUES
                LBNZ      SETUNIT      ;NO
                LDI       10H
                PHI       RB
                LDI       50H
                PLO       RB           ;SET RB = M+
                LDI       80H          ;SET M+
                STR       RB
                INC       RB
                INC       RB
                LDI       08H          ;SET BATCH CURSOR
                STR       RB           ;FOR M+ TOTAL
                GLO       RB
                ADI       06H
                PLO       RB           ;SET ADDRESS TO BATCH TOTAL
                LDI       40H
                STR       RB           ;SET T
                INC       RB
```

```
          INC     RB
          LDI     08H         ;SET BATCH TOTAL
          STR     RB
          LDI     02H
          PLO     RB          ;SET ADDRESS TO BATCH CURSOR FOR COINS
STRBTCH   LDI     08H
          STR     RB          ;SET BATCH CURSOR FOR BATCH COINS
          GLO     RB
          ADI     08H         ;NEXT COIN ADDRESS
          PLO     RB
          XRI     42H         ;DONE W/8 COINS
          BNZ     STRBTCH     ;NO
          LDI     13H
          PHI     RB          ;SET RB = 1300 = PARTIAL COINS
          LDI     02H
          PLO     RB
STRPTL    LDI     04H         ;SET PARTIAL CURSOR
          STR     RB
          GLO     RB
          ADI     08H         ;NEXT PARTIAL COUNT
          PLO     RB
          XRI     42H         ;DONE 8 COINS?
          BNZ     STRPTL      ;NO
          LDI     7AH
          PLO     RB          ;RB = 137AH
          LDI     7CH
          PLO     RA          ;RA = 137CH
          LDI     80H
          PLO     R8          ;R8 = 1380H
          LDI     7EH
          PLO     R7          ;R7 = 137EH
          LDI     77H
          PLO     RC          ;RC = 1377H
          LDI     88H
          PLO     R5
          LDI     0C0H        ;SET CODE FOR MOTOR STOPPED
          STR     R5          ;SAVE CODE AT 1388H
          DEC     R5          ;SET R5 = 1387H
          LDI     10H
          STR     R5          ;SET R5 = 10H = HARDWARE CODE FOR MASTER I/O
CNPOLL    SEX     PC          ;POINT TO HARDWARE CODE
          OUT     1,08H       ;SELECT COIN PORT
          SEX     RC          ;STORE INPUT 0-7 COIN PORT INFO AT 1377H
          INP     4           ;READ 4RD LINE OF PORT 1 (0-7 COIN LINES)
          INC     RC
          SEX     PC
          OUT     1,08H       ;SELECT 2ND COIN PORT
          SEX     RC
          INP     5           ;READ SECOND PORT FOR 8,9 COINS
PORTAGN   LDN     RC
          SEX     RB          ;POINT TO OLD COIN DATA
          XOR                 ;TEST FOR CHANGED COIN LINES
          STR     R7
          LDN     RC          ;GET COIN LINE DATA
          STR     RB          ;REPLACE OLD COIN LINE DATA
          XRI     0FFH        ;COMPLEMENT DATA
          SEX     R7
          AND                 ;TEST FOR HI - LO CHANGE
          STR     RA          ;SAVE IN RA FOR VALID COIN COUNT
          GLO     RA
          XRI     7BH         ;DONE 2ND COIN PORT
          BZ      DNPORT      ;YES
          DEC     RC
          DEC     RB
          DEC     R7
          DEC     RA          ;SET ALL REGS TO OTHER COIN PORT
          BR      PORTAGN     ;DO OTHER PORT
DNPORT    LDI     00H
          STR     R8          ;INITIALIZE ADDRESS ADDER REG
          INC     RB          ;CORRECT BACK TO INITIAL ADDRESS
          INC     R7          ;DITTO
CKCOIN    LDN     RA          ;GET 0-7 DATA
          SHR
```

```
                STR         RA              ;SAVE REST OF COIN INFO
                LBDF        COIN            ;DENOM WAS VALID COIN COUNT
                LBZ         COIN9           ;ALL COINS ARE COUNTED 1-8
CNRET           LDN         R8              ;POINT TO ADDRESS ADDER REG
                ADI         08H             ;INCREMENT ADDRESS ADDER BY 8 BYTES
                STR         R8              ;SAVE NEW SUM FOR ADDRESS ADDER
                GLO         RA
                XRI         7CH             ;DONE 9TH COIN?
                BZ          COIN10          ;YES
                LBR         CKCOIN          ;NOT DONE 8 BITS, CHECK OTHER BITS
COIN9           LDI         40H
                STR         R8              ;SET COIN INITIAL ADDRESS TO 9TH COIN
                INC         RA              ;GET 9,10 COIN DATA
COIN10          LDN         RA
                SHR
                STR         RA
                BDF         COIN            ;WAS VALID COIN, COUNT 11
                LBNZ        CNRET           ;CHECK 10TH COIN
CHKTRF          B3          DOWN1           ;FLAG STATES TRANSFER OR MASTER INFO
                BN4         COINCNT         ;MASTER NOT READY COUNT COINS
                GLO         R4
                XRI         9FH             ;TRANSFERRING INFO TO MASTER?
                BZ          DOWN1           ;YES, GO BACK TO DATA COMMUNICATIONS
COINCNT         LBR         CNPOLL          ;NO, GO BACK AND READ COINS
DOWN1           SEP         R4              ;GO TO TRANSFER SUBROUTINE
                LBR         CNPOLL          ;RETURN ADDRESS FROM DATA XFER
COIN            LDI         0AOH            ;SET TEMP POINTER TO PRTL CNT = 1
                PLO         RE
                LDI         13H             ;SET HI RE AND RF TO 1300H
                PHI         RE
                PHI         RF
                LDI         04H             ;INITIAL PARTIAL COUNT ADDRESS
                SEX         R8              ;POINT TO ADDRESS ADJUSTER
                ADD                         ;ADD TO RF LOW ADDRESS
                PLO         RF              ;RF = PRTL CNT ADDR, RE = 1 COUNT
                SEP         R3              ;JUMP TO ADD ROUTINE FOR PARTIAL COUNTS
                LDI         12H
                PHI         RE              ;RE = BAG STOP ADDRESS
BSCHK           LDA         RF
                SEX         RE
                SM                          ;COMPARE RE TO RF
                LBNZ        VALAD           ;NOT THE SAME THEN GO ON
                GLO         RE
                ANI         07H             ;TEST FOR _7 OR _F FOR 4 BYTES
                XRI         07H
                INC         RE              ;GO TO NEXT BYTE
                LBNZ        BSCHK           ;NOT DONE 4 BYTES
                REQ                         ;SET Q = MOTOR STOPPED
                DEC         RF              ;POINT TO HI ADDRESS OF PARTIAL COUNT
                LDI         00H
                SEX         RF
                STXD
                STXD                        ;RESET PARTIAL COUNT TO 0
                STXD
                STXD
                DEC         RF
                DEC         RF
                DEC         RF
                LDN         RF              ;POINT TO BAG STOP COMPLETE WORD
                ORI         20H             ;SET FLAG FOR STOP COMPLETE
                STR         RF
                LDI         0FFH
                PLO         RD              ;SET 1ST LOOP CTR
                LDI         0FFH
                PLO         R5              ;SET 2ND LOOP CTR
CPORT           B4          XMIT            ;PORT READY
                DEC         RD
                GLO         RD              ;CHECK IF 1ST TIMER = 0?
                BNZ         CPORT           ;NO
                DEC         R5
                GLO         R5              ;2ND TIMER = 0?
                BNZ         CPORT           ;NO
XMIT            SEX         PC
```

```
                OUT         1,08H
                OUT         4,0C0H      ;SEND MOTOR STOPPED FLAG TO MASTER
                DEC         R5
                DEC         R5          ;REINITIALIZE R5
VALAD           LDI         04H
                SEX         R8
                ADD                     ;ADJUST ADDRESS FOR COIN TOTAL
                PLO         RF
                ADI         0FCH        ;ADJUST BACK TO TOKEN FLAG WORD
                PLO         RD
                LDI         11H
                PHI         RD
                LDN         RD          ;GET WORD W/TOKEN FLAG BIT
                ANI         04H         ;TEST FOR TOKEN FLAG
                BNZ         TOKCNT      ;YES, GO TO TOKEN COUNT
                GLO         RF
                PLO         RE          ;SET RE = RF = COIN ADDRESS LO
                LDI         10H         ;SET RF = 1000H COIN TOTAL ADDRESS
                PHI         RF          ;LO  ADDRESS IS AT CORRECT COIN
                LDI         11H
                PHI         RE          ;SET RE = COIN VALUE ADDRESS
                SEP         R3          ;ADD COIN VALUE TO COIN TOTAL
                LDI         5CH         ;ADDRESS BATCH TOTAL
                PLO         RF
                SEP         R3          ;ADD COIN VALUE TO BATCH TOTAL
                LBR         CNRET       ;DONE
TOKCNT          LDI         0A0H
                PLO         RE          ;ADDER = 1 FOR TOKEN COUNT
                LDI         13H
                PHI         RE
                LDI         10H
                PHI         RF          ;SET HI RF = COIN TOTAL
                SEP         R3          ;ADD 1 TO COIN TOTAL FOR TOKEN
                LBR         CNRET       ;DONE
                END

;
                            SECTION     SEC2
;
;
;
;                           2ND SECTION    ADD ROUTINE
;
;
;
;                           JANUARY 20, 1984      S2R1
;
;
;
;                           RF = ADDRESS REGISTER FOR DATA TOTALS
;                           RE = ADDRESS REGISTER FOR ADDER INFORMATION
;                           RD = POINTER FOR TEMPORARY STORAGE ADDRESSES
;
;                           GLOBAL      TOTAL
;
;
;
                ORG         400H        ;START PROGRAM AT 400H
EXIT            SEP         R0          ;SET RETURN COUNTER R3 = 401H
TOTAL           LDI         70H
                PLO         RD
                LDI         13H         ;SET TEMP POINTER TO 1300H
                PHI         RD
                LDI         04H         ;SET BYTE COUNTER TO 4 BYTES
                STR         RD          ;STORE AT 1370H
                LDI         74H
                PLO         RD          ;SET RD = 1374
                LDI         00H
                STR         RD          ;INITIALIZE CARRY DIGIT TO 0
                LDI         70H
                PLO         RD          ;SET RD = 1370H
READD           LDN         RF          ;ADDRESS RF FOR DATA TOTAL
                ANI         0FH         ;MASK HI BITS OFF
```

|   |   |   |   |
|---|---|---|---|
|        | INC   | RD       |                                            |
|        | STR   | RD       | ;STORE IN TEMP MEMORY                      |
|        | LDN   | RF       |                                            |
|        | ANI   | OFOH     | ;MASK LO BITS OFF FOR DATA TOTAL           |
|        | INC   | RD       |                                            |
|        | STR   | RD       | ;STORE HI BITS OF DATA IN RD + 1           |
|        | LDN   | RE       | ;ADDRESS RE, ADDER DATA                    |
|        | ANI   | OFOH     | ;MASK OFF LO BITS OF ADDER DATA            |
|        | INC   | RD       | ;POINT TO NEXT TEMP ADDRESS                |
|        | STR   | RD       | ;SAVE IN TEMP MEMORY                       |
|        | INC   | RD       | ;POINT TO BCD CARRY REG                    |
|        | LDN   | RE       |                                            |
|        | ANI   | OFH      | ;MASK OFF HI BITS OF ADDER                 |
|        | SEX   | RD       |                                            |
|        | ADD   |          | ;ADD BCD CARRY FROM PREV DIGIT AND ADDER   |
|        | INC   | RD       | ;POINT TO TEMP SUM STORAGE                 |
|        | STR   | RD       |                                            |
|        | DEC   | RD       | ;POINT TO BCD CARRY REG                    |
|        | LDI   | 00H      |                                            |
|        | STR   | RD       | ;RESET CARRY DIGIT                         |
|        | INC   | RD       |                                            |
|        | LDX   |          | ;GET TEMP SUM                              |
|        | DEC   | RD       |                                            |
|        | DEC   | RD       |                                            |
|        | DEC   | RD       |                                            |
|        | DEC   | RD       | ;POINT TO DATA LO BITS                     |
|        | ADD   |          |                                            |
|        | STR   | RD       | ;SAVE TOTAL                                |
|        | ADI   | OF6H     | ;ADD F6H TO CHECK DECIMAL CARRY            |
|        | BNF   | NCARRY   | ;TOTAL LESS THAN 10 DO NOT ADD CARRY       |
|        | STR   | RD       | ;STORE DECIMAL CORRECTED TOTAL             |
|        | INC   | RD       | ;POINT TO HI BITS DATA                     |
|        | LDA   | RD       | ;GET HI BIT DATA AND INC POINTER TO ADDER  |
|        | ADI   | 10H      | ;ADD CARRY FROM DECIMAL ADD                |
|        | ADD   |          | ;ADD HI BIT DATA AND ADDER                 |
| BIT2   | DEC   | RD       | ;POINT BACK TO 2ND BIT STORE               |
|        | STR   | RD       | ;STORE HI BIT TOTAL IN 1372H               |
|        | BDF   | CARRY2   | ;DIGIT > 15                                |
|        | ADI   | 60H      | ;ADD 60H TO CHECK FOR DECIMAL CARRY        |
|        | BNF   | NCARY2   | ;NO CARRY, DO NOT PUT DIGIT IN CARRY REGISTER |
| SVCARY | STR   | RD       | ;SAVE CORRECTED SUM                        |
|        | INC   | RD       |                                            |
|        | INC   | RD       | ;POINT TO 1374H, DIGIT CARRY REGISTER      |
|        | LDI   | 01H      |                                            |
|        | STR   | RD       | ;STORE FOR NEXT PASS                       |
|        | DEC   | RD       |                                            |
|        | DEC   | RD       | ;POINT TO HI DATA BITS                     |
| NCARY2 | LDX   |          |                                            |
|        | DEC   | RD       | ;POINT TO LO DATA BITS                     |
|        | ADD   |          |                                            |
|        | STR   | RF       | ;REPLACE OLD TOTAL WITH NEW PACKED BCD     |
|        | INC   | RF       | ;POINT TO NEXT DATA BYTE                   |
|        | INC   | RE       | ;POINT TO NEXT ADDER BYTE                  |
|        | LDI   | 70H      |                                            |
|        | PLO   | RD       | ;SET POINTER TO BYTE COUNTER ADDRESS       |
|        | LDX   |          |                                            |
|        | ADI   | OFFH     | ;DECREMENT BYTE COUNTER                    |
|        | STR   | RD       | ;SAVE DECREMENTED TOTAL                    |
|        | LBNZ  | READD    | ;NOT DONE WITH 4 BYTES GO BACK TO READD    |
|        | GLO   | RF       | ;GET NEW RF ADDRESS                        |
|        | ADI   | OFCH     | ;SET RF ADDRESS BACK TO ORIGINAL ADDRESS   |
|        | PLO   | RF       |                                            |
|        | GLO   | RE       |                                            |
|        | ADI   | OFCH     | ;SET RE ADDRESS BACK TO INITIAL ADDRESS    |
|        | PLO   | RE       |                                            |
|        | BR    | EXIT     |                                            |
| NCARRY | INC   | RD       | ;GET HI DATA BITS                          |
|        | LDA   | RD       | ;GET ADDER HI BITS                         |
|        | ADD   |          |                                            |
|        | DEC   | RD       |                                            |
|        | STR   | RD       |                                            |
|        | BDF   | CARRY2   | ;IF A CARRY OCCURED ADD 60H DOF DECIMAL    |
|        | ADI   | 60H      | ;DECIMAL ADJUST W/NO CARRY                 |

```
                BNF     NCARY2          ;DO NOT ADD CARRY TO NEXT DIGIT
                BR      SVCARY          ;YES, ADD CARRY BIT FOR NEXT ADD
CARRY2          ADI     60H             ;CORRECT BCD DIGIT TO DECIMAL
                BR      SVCARY
                END
                SECTION SEC3
;
;
;
;
;               3RD SECTION      DATA COMMUNICATION
;
;
;
;
;               MARCH 28, 1984          S3R8
;
;
;
;               R9 = POINTER AND ADDRESS OF DATA TO BE SENT OR RECEIVED
;               R1 = ADDRESS OF TEMPORARY STORAGE FOR TRANSFER
;               RD = ADDRESS POINTER - TEMPORARY
;
;
PC              EQU     R4
;
                ORG     600H            ;START PROGRAM AT 600H
EXRET           SEP     R0
CHKPRT          LDI     13H
                PHI     R9              ;SET R9 = CONTROL WORD STORAGE
                LDI     83H
                PLO     R9              ;SET R9 = 1383H = CONTROL STORAGE WORD
                SEX     PC
                OUT     1,08H           ;SET UP PORT
                SEX     R9              ;STORE CONTROL WORD
                INP     2
                ANI     0F0H            ;MASK OFF LO BITS OF CONTROL WORD
                XRI     0D0H            ;"D" CONTROL WORD?
                BZ      RECDTA          ;YES GO TO RECEIVE DATA FROM MASTER
                LDN     R9              ;GET CONTROL WORD
                XRI     0C0H            ;STOP MOTOR?
                BZ      STPMTR          ;YES
                LDN     R9
                XRI     0C1H            ;START MOTOR?
                BZ      STRTMTR         ;YES
                LDN     R9
                XRI     0C2H            ;CLEAR BATCH INFO?
                BZ      RSTBCH          ;YES
                LDN     R9
                XRI     0C3H            ;SEND BATCH INFO TO MASTER?
                BZ      SENBTCH         ;YES
                LDN     R9
                XRI     0C4H            ;SEND PARTIAL COUNT INFO?
                BZ      SENPRTL         ;YES
                LDN     R9
                XRI     0C5H            ;CLEAR BAGSTO, COMPLETE FLAG
                LBZ     RECDTA          ;YES
                BR      EXRET           ;COMPLETED PORT READ
STPMTR          !REQ                    ;RESET Q OUTPUT
                BR      EXRET           ;MISSION ACCOMPLISHED
STRTMTR         SEQ                     ;START MOTOR VIA Q OUTPUT
                BR      EXRET           ;MISSION DONE
RSTBCH          LDI     84H
                PLO     RD
                LDI     60H             ;DO 60H BYTES OF RESET
                STR     RD
                LDI     85H
                PLO     R1
                LDI     13H
                PHI     R1              ;SET R1 = 00 =ALTERNATE 4 BYTES OF RESET
                LDI     00H
                STR     R1
                LDI     60H             ;ADDRESS END OF DATA TO BE RESET
```

|          | PLO     | R9      |                                              |
|----------|---------|---------|----------------------------------------------|
|          | LDI     | 10H     | ;SET R9 = 1060H = PRESET END OF BATCH INFO   |
|          | PHI     | R9      |                                              |
| RSTAGN   | DEC     | R9      |                                              |
|          | LDI     | 00H     | ;CLEAR USING 00H                             |
|          | STR     | R9      | ;SET R9 ADDRESS = 00                         |
|          | LDN     | R1      | ;GET OLD DATA NO OF RESET BYTES              |
|          | ADI     | 01H     |                                              |
|          | STR     | R1      |                                              |
|          | XRI     | 04H     | ;DONE 4 BYTES OF RESET?                      |
|          | BNZ     | RSTAGN  | ;NO RESET THIS BYTE ALSO                     |
| NORST    | DEC     | R9      |                                              |
|          | LDN     | R1      |                                              |
|          | ADI     | 0FFH    | ;DECREMENT BY 1                              |
|          | STR     | R1      | ;SAVE RESULT                                 |
|          | BNZ     | NORST   | ;DONE 4 BYTES                                |
|          | GLO     | R9      | ;DONE ALL 60 BYTES                           |
|          | BNZ     | RSTAGN  | ;NO, START BACK BY RESETTING 4 BYTES         |
|          | BR      | EXRET   | ;YES, DONE 60 BYTES GO BACK TO COIN POLL     |
| SENBTCH  | LDI     | 10H     |                                              |
|          | PHI     | R9      |                                              |
|          | LDI     | 00H     |                                              |
|          | PLO     | R9      | ;SET R9 POINTER = 1000H = BATCH INFO TO SEND |
|          | BR      | DTAOUT  | ;GO TO SEND BATCH INFO                       |
| SENPRTL  | LDI     | 13H     |                                              |
|          | PHI     | R9      |                                              |
|          | LDI     | 00H     |                                              |
|          | PLO     | R9      | ;SET R9 = 1300H = PARTIAL COUNT INFO TO SEND |
| DTAOUT   | LDI     | 70H     |                                              |
|          | PLO     | R1      |                                              |
|          | LDI     | 10H     |                                              |
|          | PHI     | R1      | ;SET R1 = 1070H = TEMPORARY TRFR STORAGE     |
| RETRFR   | LDA     | R9      | ;GET 1ST BYTE OF DATA TO BE TEMP STORED      |
|          | STR     | R1      | ;STORE AT R1                                 |
|          | GLO     | R1      |                                              |
|          | SMI     | 77H     | ;DONE 8 BYTES?                               |
|          | INC     | R1      |                                              |
|          | BNZ     | RETRFR  | ;NO                                          |
|          | LDI     | 70H     |                                              |
|          | PLO     | R1      | ;SAVE R1 = 1070H                             |
|          | BR      | EXTDTA  | ;GO TO COIN POLL TO CHECK EF4 FLAG           |
| NXTSBYT  | GLO     | R9      |                                              |
|          | SMI     | 50H     | ;END OF PARTIAL COUNTS                       |
|          | BNZ     | CKBTCH  | ;NO CHECK END OF BATCH                       |
|          | GHI     | R9      |                                              |
|          | XRI     | 13H     | ;PARTIAL COUNTS?                             |
|          | BZ      | EXRET   | ;YES END OF PARTIAL COUNTS, EXIT ROUTINE     |
| CKBTCH   | GLO     | R9      |                                              |
|          | SMI     | 60H     | ;DONE ALL 60 BTYES TO BE TRANSFERRED         |
|          | BZ      | EXRET   | ;YES, GO BACK TO COIN POLL                   |
|          | LDI     | 70H     |                                              |
|          | PLO     | R1      |                                              |
|          | LDI     | 10H     | ;SET R1 = 1070H = TEMPORARY STORAGE ADDRESS  |
|          | PHI     | R1      |                                              |
|          | BR      | RETRFR  |                                              |
| EXTDTA   | SEP     | R0      |                                              |
| SENDWRD  | SEX     | PC      |                                              |
|          | OUT     | 1,08H   | ;SELECT PORT                                 |
|          | SEX     | R1      | ;ADDRESS BYTE TO BE SENT OUT                 |
|          | OUT     | 2       |                                              |
|          | GLO     | R1      |                                              |
|          | SMI     | 78H     | ;END OF 8 BYTES?                             |
|          | BZ      | NXTSBYT | ;YES, GO GET NEXT 8 BYTES                    |
|          | BR      | EXTDTA  | ;GO TO COIN POLL AND CHECK COINS             |
| RECDTA   | LDI     | 80H     |                                              |
|          | PLO     | R1      |                                              |
|          | LDI     | 10H     |                                              |
|          | PHI     | R1      | ;ADDRESS TEMP STORAGE                        |
| GETWRD   | B3      | SVWRD   | ;CHECK FOR NEW DATA                          |
|          | SEP     | R0      | ;NO, GO BACK TO CHECK FOR COIN COUNTS        |
| SVWRD    | SEX     | PC      |                                              |
|          | OUT     | 1,08H   | ;SELECT DATA PORT                            |
|          | SEX     | R1      | ;POINTER TO TEMP STORAGE                     |
|          | INP     | 2       | ;READ DATA PORT                              |

|        |        |         |                                          |
|--------|--------|---------|------------------------------------------|
|        | GLO    | R1      |                                          |
|        | XRI    | 87H     | ;READ 8 BYTES?                           |
|        | INC    | R1      | ;GO TO NEXT STORAGE ADDRESS              |
|        | BNZ    | GETWRD  | ;NO, GO BACK FOR MORE BYTES              |
|        | LDI    | 81H     | ;ADDRESS COIN 1-8                        |
|        | PLO    | R1      |                                          |
|        | LDI    | 88H     | ;TEMP STORE OF 1-8 COIN DATA             |
|        | PLO    | RD      |                                          |
|        | LDI    | 10H     |                                          |
|        | PHI    | RD      |                                          |
|        | LDA    | R1      |                                          |
|        | STR    | RD      | ;SAVE 2ND WORD AT 1088H                  |
|        | LDI    | 11H     |                                          |
|        | PHI    | RD      | ;SET UP PERM ADDRESS                     |
|        | LDN    | R9      | ;GET CONTROL WORD                        |
|        | XRI    | 0D0H    | ;COIN ADDER INFO?                        |
|        | LBZ    | CNTADR  | ;YES                                     |
|        | LDI    | 12H     | ;SET UP PERM ADDRESS FOR BAG STOP        |
|        | PHI    | RD      |                                          |
|        | LDN    | R9      | ;GET CONTROL WORD                        |
|        | XRI    | 0D1H    | ;BAG STOP?                               |
|        | BZ     | CNTADR  | ;YES                                     |
|        | LDI    | 13H     |                                          |
|        | PHI    | RD      | ;SET UP PARTIAL COUNT ADDRESS            |
|        | LDN    | R9      |                                          |
|        | XRI    | 0D2H    |                                          |
|        | BZ     | CNTADR  | ;YES, PARTIAL COUNT                      |
|        | LDN    | R9      |                                          |
|        | XRI    | 0C5H    | ;CLEAR BAG STOP COMPLETE FLAG            |
|        | BZ     | CNTADR  | ;YES                                     |
|        | LBR    | EXRET   | ;WRONG CODE, RETURN TO POLL              |
| CNTADR | LDI    | 86H     |                                          |
|        | PLO    | R2      |                                          |
|        | LDI    | 13H     |                                          |
|        | PHI    | R2      | ;SET R2 = ADDRESS ADJUSTER               |
|        | LDI    | 40H     |                                          |
|        | PLO    | RD      | ;SET INITIAL ADDRESS FOR 9TH COIN        |
|        | STR    | R2      | ;SAVE 9TH COIN ADDRESS                   |
|        | LDN    | R1      | ;GET 3RD WORD FOR COIN DATA              |
|        | SHR    |         |                                          |
|        | LBDF   | REPLADR | ;WAS 9TH COIN, STORE PERM                |
|        | LDI    | 48H     |                                          |
|        | PLO    | RD      | ;SET INITIAL ADDRESS FOR 10TH COIN       |
|        | STR    | R2      | ;SAVE 10TH COIN ADDRESS                  |
|        | LDN    | R1      |                                          |
|        | SHR    |         |                                          |
|        | SHR    |         |                                          |
|        | LBDF   | REPLADR | ;YES, DO 10TH COIN                       |
|        | LDI    | 00H     | ;SET INITIAL ADDRESS                     |
|        | PLO    | RD      |                                          |
|        | LDI    | 00H     |                                          |
|        | STR    | R2      | ;START INITIAL ADDRESS = 00H             |
|        | LDI    | 88H     | ;GET COIN DATA                           |
|        | PLO    | R1      |                                          |
| SHIFTR | LDN    | R1      | ;GET COIN DATA 2ND WORD                  |
|        | SHR    |         | ;TEST FOR WHICH COIN                     |
|        | STR    | R1      |                                          |
|        | BDF    | REPLADR | ;ADDRESS FOR COIN                        |
|        | LDN    | R2      |                                          |
|        | ADI    | 08H     | ;INCREMENT TO NEXT COIN ADDRESS          |
|        | STR    | R2      |                                          |
|        | BR     | SHIFTR  | ;TEST NEXT COIN                          |
| REPLADR| LDN    | R9      |                                          |
|        | XRI    | 0C5H    | ;CLEAR BAG COMPLETE FLAG?                |
|        | BZ     | CLRFLG  | ;YES, DO NOT HAVE TO STORE REC DATA      |
|        | LDN    | R2      |                                          |
|        | PLO    | RD      | ;ADJUST PERM ADDRESS BY R2               |
| SETADR | LDI    | 80H     |                                          |
|        | PLO    | R1      |                                          |
| NXTDTA | LDN    | R1      | ;GET BEGINNING OF DATA - 8 WORDS         |
|        | STR    | RD      | ;STORE AT ADJUSTED ADDRESS               |
|        | GLO    | R1      |                                          |

```
              XRI      87H        ;DONE 8 BYTES?
              INC      R1
              INC      RD         ;POINT TO NEXT BYTE
              BNZ      NXTDTA     ;NO, GO BACK TO DO MORE
              LDN      R9
              XRI      0D0H       ;COIN ADDER?
              BNZ      JEXRET     ;NO, GO TO COIN POLL
              LDI      83H
              PLO      R1         ;CHECK FOR DEC PT PLACEMENT
              LDI      5BH        ;ADDRESS BATCH TOTAL DEC PT LOCATION
              PLO      RD
              LDI      10H
              PHI      RD         ;SET RD = BATCH TOTAL ADDRESS
              LDN      R1         ;GET NEW DEC PT INFO
              STR      RD         ;SAVE AT BATCH TOTAL
              LDI      58H
              PLO      RD         ;ADDRESS BATCH TOTAL 1ST WORD
              LDI      40H        ;SET CODE FOR BATCH TOTAL
              STR      RD
              INC      RD         ;ADDRESS 2ND WORD
              LDI      00H        ;SET CODE = 00 FOR 2ND WORD OF BATCH TOTAL
              STR      RD
              INC      RD         ;POINT TO 3RD WORD OF BATCH TOTAL
              LDI      08H
              STR      RD         ;STORE CODE 3RD WORD BATCH TOTAL
              LDN      R2         ;GET ADDRESS ADJUSTER
              PLO      RD
              LDI      10H        ;SET HI ADDRESS TO 1000H
              PHI      R1
              PHI      RD         ;RD = ADDRESS OF BATCH COIN TOTAL
              LDI      80H        ;BEGINNING OF STORAGE DATA FOR COIN
              PLO      R1         ;SET R1 = DATA STORAGE ADDRESS
BYT4          LDA      R1         ;GET 1ST WORD
              STR      RD         ;STORE 1ST WORD
              GLO      R1
              XRI      84H        ;DONE 4TH BYTE
              INC      RD
              BNZ      BYT4       ;NO, GO BACK FOR NEXT BYTE
.JEXRET       LBR      EXRET      ;DONE, GO TO COIN POLL
              LDN      R2         ;GET ADDRESS ADJUST FACTOR
              PLO      RD         ;PUT IN PERM ADDRESS REG
              INC      RD
              INC      RD
              LDN      RD         ;GET OLD PARTIAL COUNT WORD
              XRI      20H        ;RESET BAG COMPLETE FLAG
              STR      RD
              BR       JEXRET     ;DONE, GO TO COIN POLL
              END
```

We claim:

1. An electronic device for totaling and displaying monetary values by denomination from a batch of coins in one of a plurality of national monetary systems, the electronic device being connectable to a coin sorter of a type having a plurality of coin slots for receiving a plurality of denominations in the batch of coins and of a type having signal generating means reponsive to coins passing into the coin slots for generating signals indicative of the number of coins in a respective denomination passing into each of the respective slots, wherein the electronic device comprises:

user-operable input means operable at some times for entering individual values for respective denominations of a selected national monetary system, said user-operable input means also being operable at other times for entering commands to display accumulated monetary values for the respective denominations in the batch of coins;

arithmetic means connectable to detect the signals from the signal generating means, said arithmetic means being responsive to such signals and to the individual values entered through the user-operable input means for calculating accumulated monetary values for the respective denominations in the batch of coins based on the individual values entered through the user-operable input means;

display means for displaying accumulated monetary values for the respective denominations in the batch of coins; and communication means coupled to the user-operable input means for receiving the individual values of the respective denominations, said communication means also being coupled for transmitting the individual values to the arithmetic means and being coupled for receiving the accumulated monetary values from the arithmetic means, said communication means being responsive to one of the commands entered through the user-operable input means for selecting an accumulated monetary value for one of the respective denominations in the batch of coins for display on the display means.

2. The electronic device of claim 1, wherein the individual values for the respective denominations are decimal fractions.

3. The electronic device of claim 1, wherein:
the display means includes a means for displaying digits that is integrated with a cursor means for pointing to the respective denomination to which the digits pertain; and
wherein the communication means includes means for storing digit data and cursor data in a data structure; and
wherein the communication means is further responsive to one of the commands entered through the user-operable input means to couple data from the data structure to the display means to display the digits together with the cursor means.

4. The electronic device of claim 3, further comprising a legend positioned proximate the cursor means to associate the cursor means with respective individual values for the denominations.

5. The electronic device of claim 1, wherein:
the communication means includes means for storing the accumulated monetary values for the respective denominations in a data table in locations corresponding to the respective denominations;
wherein the accumulated monetary values are each stored as data in a respective display data structure; and
wherein the communication means is responsive to one of the commands entered through the user-operable input means to select one of the display data structures and couple data in the selected one of the display data structures to the display means to show the accumulated monetary value for a corresponding denomination.

6. The electronic device of claim 1, wherein:
the communication means includes means for storing individual values, accumulated monetary values, accumulated coin counts and bag counts limits for the respective denominations in a data table in locations corresponding to the respective denominations;
wherein the individual values, accumulated monetary values, accumulated coin counts and bag count limits for the respective denominations are each stored in a respective display data structure in the data table; and
wherein the communication means is responsive to display commands from the keyboard to select a particular display data structure from the data table and couple its data to the display means.

7. The electronic device of claim 1, wherein:
the communication means includes means for storing batch monetary values and grand monetary values for the respective denominations in a data table in locations corresponding to the respective denominations;
wherein each of the batch monetary values and each of the grand monetary values is stored in a respective display data structure that includes digit data and cursor data;
wherein the display means includes a means for displaying digits that is integrated with a cursor means for distinguishing batch monetary values from grand monetary values that are displayed; and
wherein the communication means includes means responsive to a display command entered through the user-operable input means to couple data from the data structure to the display means to actuate the cursor means according to which of the monetary values is selected for display.

8. An electronic device for electrical connection to a coin sorter of a type having a plurality of coin sensing stations for generating signals indicative of numbers of coins of respective denominations sorted through the plurality of coin sensing stations, wherein the electronic device comprises:
keyboard input means operable at one time for assigning denominations to respective coin sensing stations, said keyboard input means also being operable at another time for entering commands to display accumulated monetary values based on the assigned denominations;
display means for displaying accumulated monetary values for the respective denominations;
first processor means for detection of the signals from the coin sensing stations, said first processor means being responsive to such signals and to the assigning of denominations through the keyboard input means for calculating accumulated monetary values by denomination for the coins sorted through the plurality of coin sensing stations; and
second processor means coupled to the keyboard input means for communicating the assigned denominations to the first processor means, said second processor means also being coupled for receiving the accumulated monetary values from the first processor means, and said second processor means being responsive to one of the commands entered through the keyboard input means for selecting an accumulated monetary value for one of the respective denominations for display on the display means.

9. The electronic device of claim 8, wherein,
said display means includes means for identifying by denomination accumulated monetary values that are displayed; and
wherein said second processor means is further responsive to one of the commands entered through the keyboard input means for causing the selected accumulated monetary value to be identified by denomination when displayed.

10. The electronic device of claim 8, wherein the first processor means and the second processor means are included in two respective microelectronic processing circuits.

11. An electronic device for electrical connection to a coin sorter of a type having a plurality of coin sensing stations for generating signals indicative of numbers of coins of respective denominations sorted through the plurality of coin sensing stations, wherein the electronic device comprises:
keyboard input means operable at some times for assigning denominations to respective coin sensing stations, said keyboard input means also being operable at other times for entering commands to display accumulated monetary values based on the assigned denominations;
display means for displaying accumulated monetary values for the respective denominations;
first processor means for detection of the signals from the coin sensing stations, said first processor means being responsive to such signals and to the assigning of denominations through the keyboard input means for calculating accumulated monetary values by denomination of the coins sorted through the plurality of coin sensing stations; and second processor means including:
  means coupled to the keyboard input means for receiving the assigned denominations,
  means for communicating the assigned denominations to the first processor means,
  means for receiving the accumulated monetary values from the first processor means,
  means for storing the accumulated monetary values in denominational display data structures, and
  means responsive to one of the commands entered through the keyboard input means for selecting one of the denominational display data structures for coupling to the display means to show a selected one of the accumulate monetary values.

12. The electronic device of claim 11, wherein the first processor means and the second processor means are included in two respective microelectronic processing circuits.

* * * * *